(12) United States Patent
Yoshikawa et al.

(10) Patent No.: US 7,046,892 B2
(45) Date of Patent: May 16, 2006

(54) OPTICAL WAVEGUIDE, HOLOGRAPHIC MEDIUM, HOLOGRAPHIC STORAGE AND RETRIEVAL METHOD AND SYSTEM

(75) Inventors: Hiroshi Yoshikawa, Tokyo (JP); Yasuko Andoh, Sagamihara (JP); Keiichiro Itoh, Iruma (JP); Masakatsu Senda, Mito (JP); Yoshiaki Kurokawa, Chiba (JP); Takaya Tanabe, Tokorozawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 7 days.

(21) Appl. No.: 10/184,686

(22) Filed: Jun. 19, 2002

(65) Prior Publication Data

US 2003/0026542 A1 Feb. 6, 2003

(30) Foreign Application Priority Data

| Jun. 22, 2001 | (JP) | ............................. 2001-190228 |
| Dec. 10, 2001 | (JP) | ............................. 2001-376231 |
| Dec. 20, 2001 | (JP) | ............................. 2001-388472 |

(51) Int. Cl.
*G02B 6/10* (2006.01)

(52) U.S. Cl. .................................................... 385/129

(58) Field of Classification Search .................. 385/37, 385/129–132; 369/103, 286, 275.1; 359/34, 359/35

See application file for complete search history.

(56) References Cited

U.S. PATENT DOCUMENTS

| 4,729,641 | A | * | 3/1988 | Matsuoka et al. ........... 349/200 |
| 5,295,208 | A | * | 3/1994 | Caulfield et al. ............. 385/27 |
| 5,418,631 | A | * | 5/1995 | Tedesco ....................... 359/15 |
| 5,452,385 | A | * | 9/1995 | Izumi et al. ................... 385/37 |
| 5,535,055 | A | * | 7/1996 | Ono et al. .................... 359/495 |
| 5,594,560 | A | * | 1/1997 | Jelley et al. .................. 359/15 |
| 5,877,875 | A | * | 3/1999 | Reis et al. ..................... 359/22 |
| 5,894,465 | A | * | 4/1999 | Ja ............................. 369/103 |
| 6,284,437 | B1 | * | 9/2001 | Kashyap ...................... 430/321 |
| 6,307,679 | B1 | * | 10/2001 | Kashyap ...................... 359/569 |
| 6,452,698 | B1 | * | 9/2002 | Vlcek et al. .................... 359/3 |

(Continued)

FOREIGN PATENT DOCUMENTS

JP     63-164035 A     7/1988

(Continued)

OTHER PUBLICATIONS

J.F. Heanue et al., "Volume Holographic Storage and Retrieval of Digital Data", Science, vol. 265, pp. 749-752, 1994.

(Continued)

*Primary Examiner*—Joseph Williams
*Assistant Examiner*—Dalei Dong
(74) *Attorney, Agent, or Firm*—Darby & Darby

(57) ABSTRACT

A holographic medium is formed of an optical waveguide including at least one core layer positioned between at least one portion of a material having a lower refractive index, a diffraction grating layer formed at a boundary between the core layer and the material of lower refractive index or in the core layer, and a storage layer outside the optical waveguide. Upon storing information in the storage layer a reference beam and an object are input into the optical waveguide and in retrieving stored information the reference beam is emitted to an end face of the core layer and transmitted through the core layer to be transformed into a diffracted beam in a diffraction grating layer that is emitted outside the core layer and transmitted through the storage layer, where the object beam is retrieved as a retrieved beam.

12 Claims, 69 Drawing Sheets

U.S. PATENT DOCUMENTS

| | | | |
|---|---|---|---|
| 6,556,531 B1 * | 4/2003 | Yagi et al. | 369/103 |
| 6,560,259 B1 * | 5/2003 | Hwang | 372/45 |
| 6,594,042 B1 * | 7/2003 | Asada et al. | 359/15 |
| 6,654,532 B1 * | 11/2003 | Tomaru et al. | 385/129 |
| 6,699,407 B1 * | 3/2004 | Sutehrland et al. | 252/582 |
| 6,750,996 B1 * | 6/2004 | Jagt et al. | 359/34 |
| 6,801,348 B1 * | 10/2004 | Ramapujam et al. | 359/34 |

FOREIGN PATENT DOCUMENTS

| | | |
|---|---|---|
| JP | 1-107214 A | 4/1989 |
| JP | 4-40404 A | 2/1992 |
| JP | 6-94939 A | 4/1994 |
| JP | 6-110367 A | 4/1994 |
| JP | 9-101735 | 4/1997 |
| JP | 11-337756 | 12/1999 |
| JP | 2000-123108 | 4/2000 |
| JP | 2001-210088 | 8/2001 |

OTHER PUBLICATIONS

T. Suhara et al., "Waveguide Holograms", the proceedings of the IEICE (Institute of Electronics, Information and Communication Engineers), vol. J60-C, No. 4, pp. 197-204, 1977.

S. Yagi et al., "Multilayered Waveguide Holographic ROM Card", the proceedings of the IEICE (Institute of Electronics, Information and Communication Engineers), vol. J84-C, No. 8, pp. 635-643, 2001.

T. Kose et al., "Hikarikougaku Handobukku (Optical Engineering Handbook)", Asakurashoten (Asakura Publishing Company), pp. 226-227, 1986.

* cited by examiner

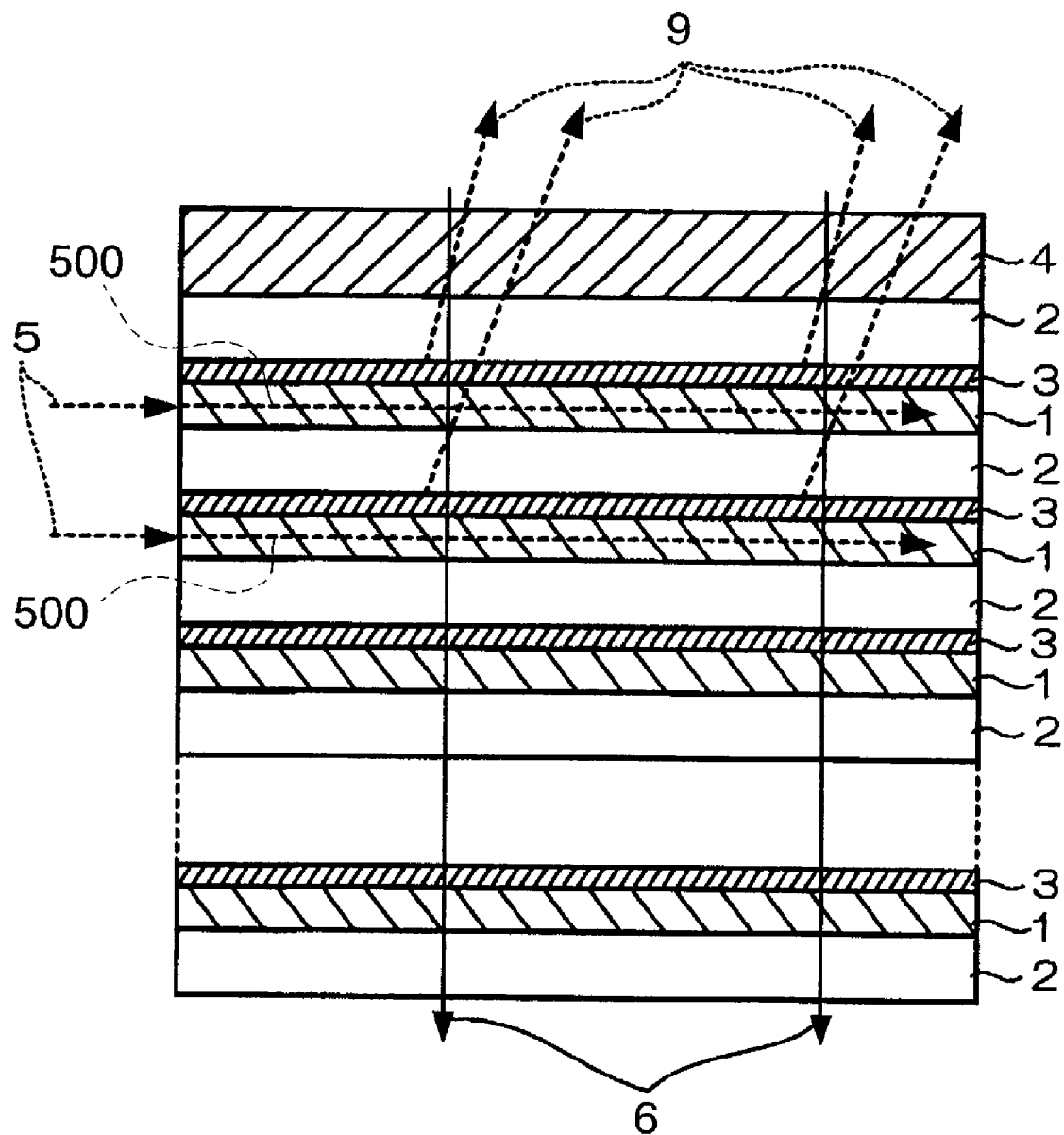

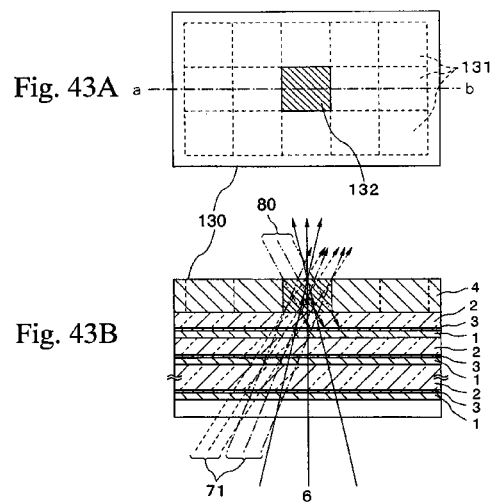
Fig. 43A
Fig. 43B
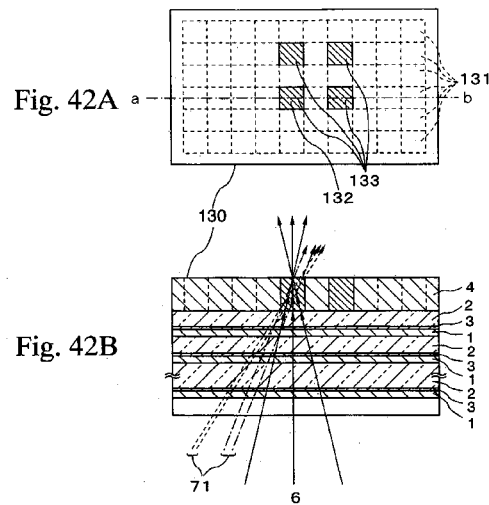
Fig. 42A
Fig. 42B

REFERENCE BEAM 71,
OR SUPERIMPOSED
REFERENCE BEAM 71 AND
EXCITATION BEAM 80

OBJECT BEAM 6,
OR SUPERIMPOSED
OBJECT BEAM 6 AND
EXCITATION BEAM 80

Fig. 46A
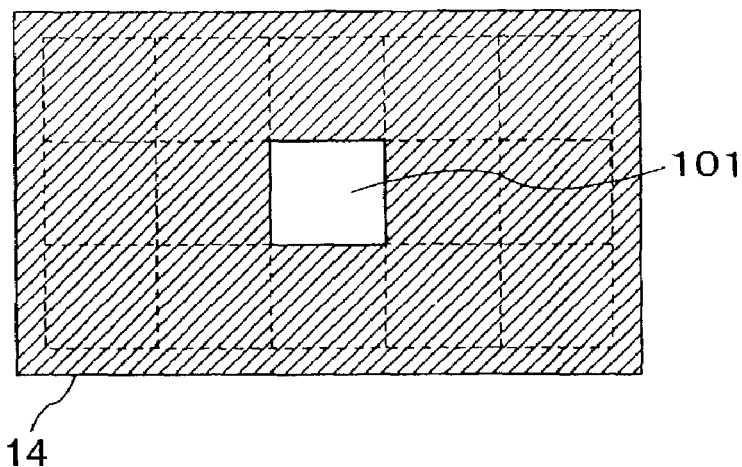
Fig. 46B
Fig. 46C
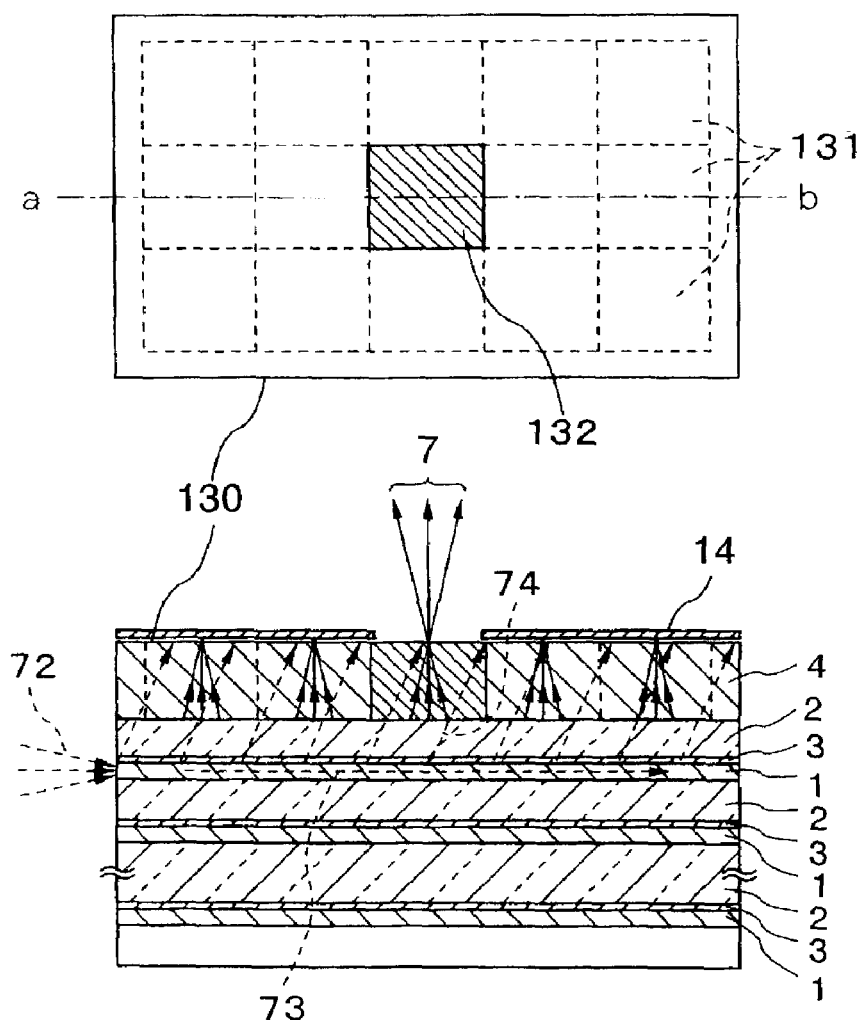

Fig. 49A
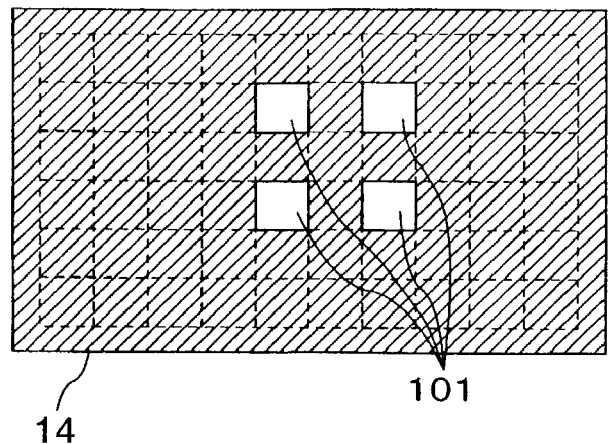
Fig. 49B
Fig. 49C
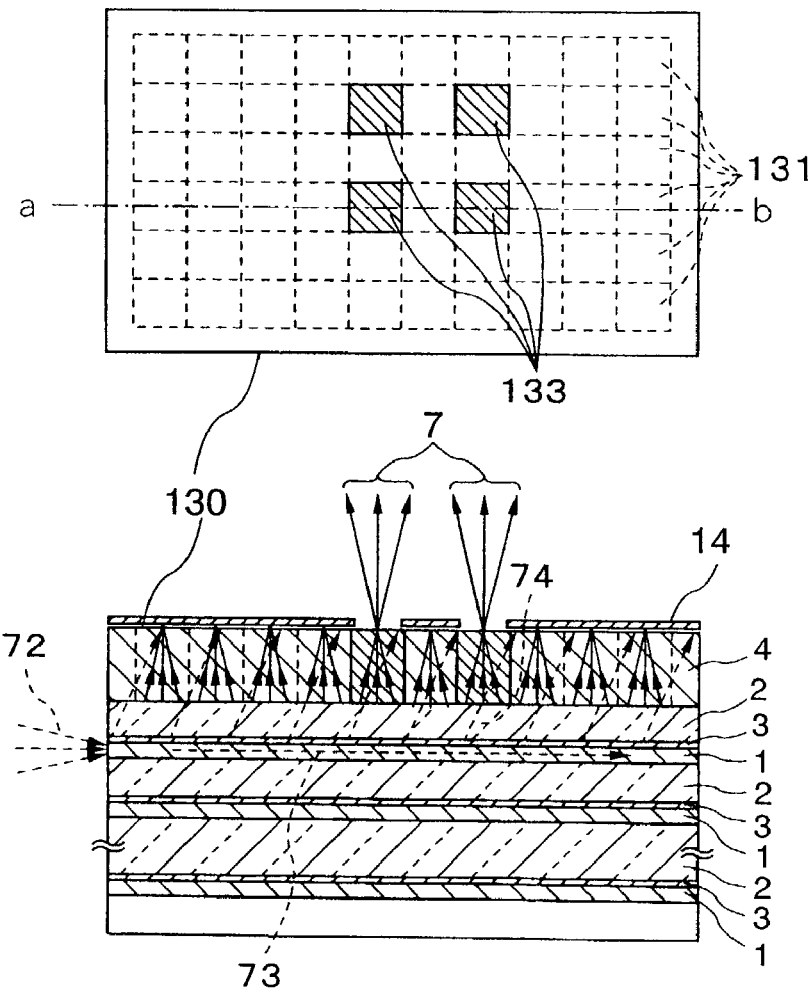

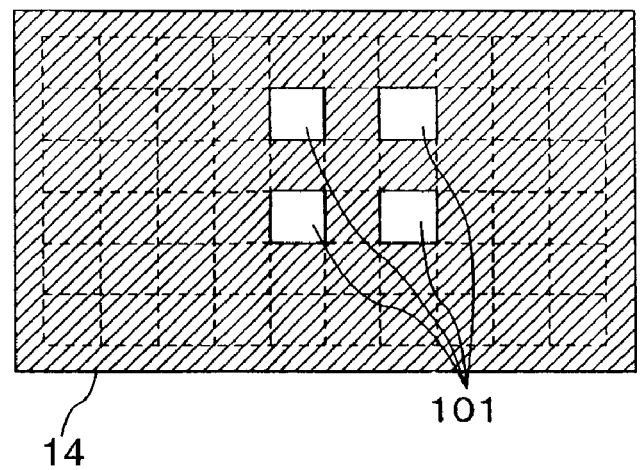
Fig. 51A
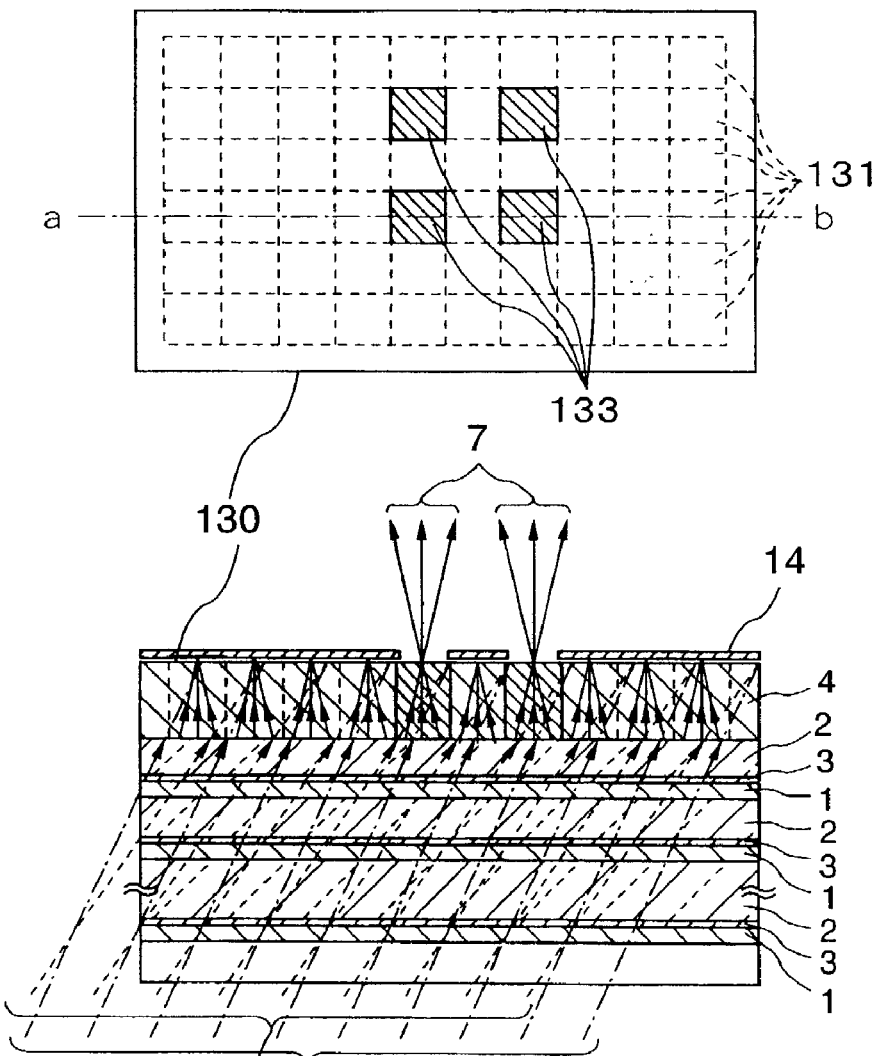
Fig. 51B
Fig. 51C

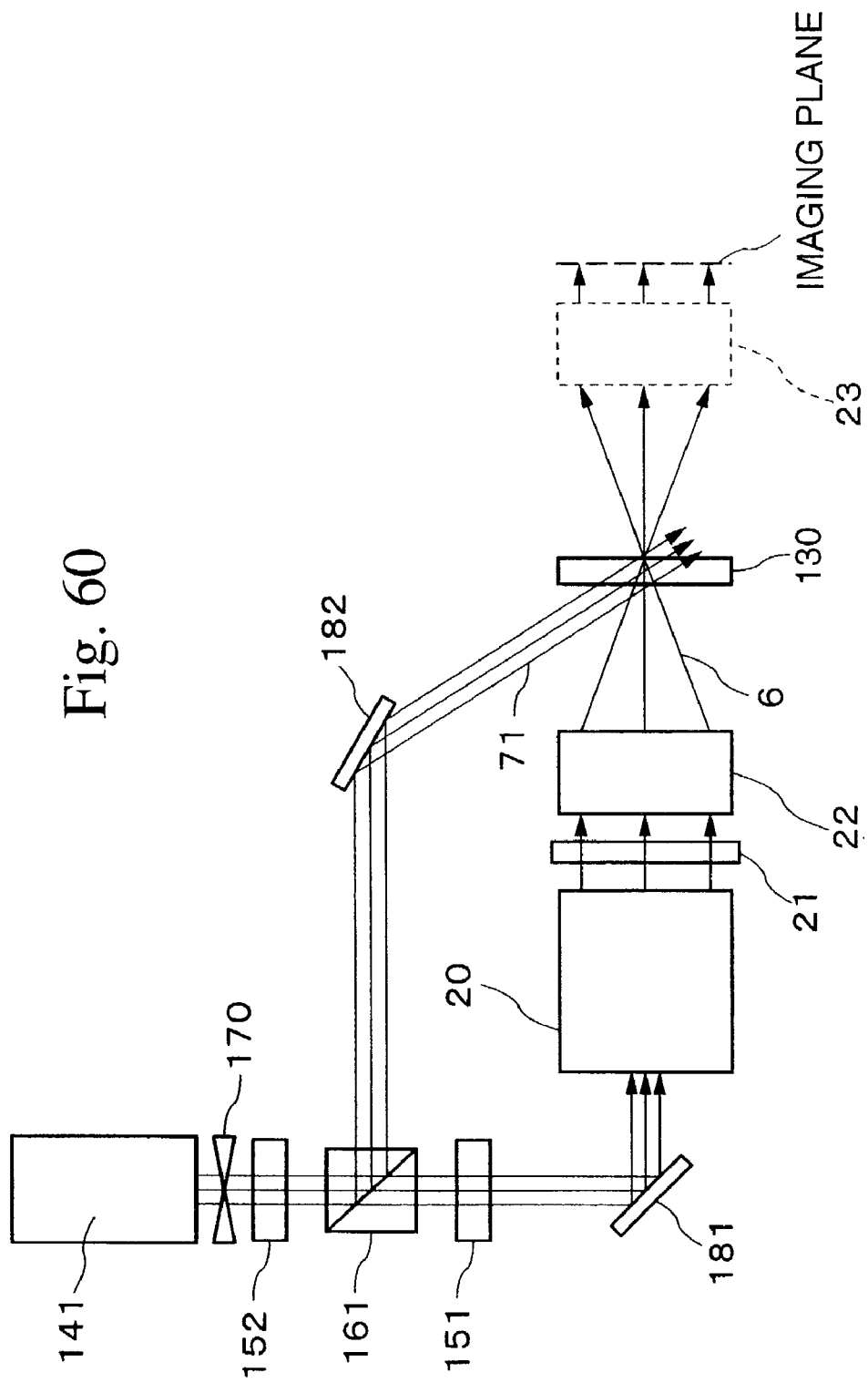

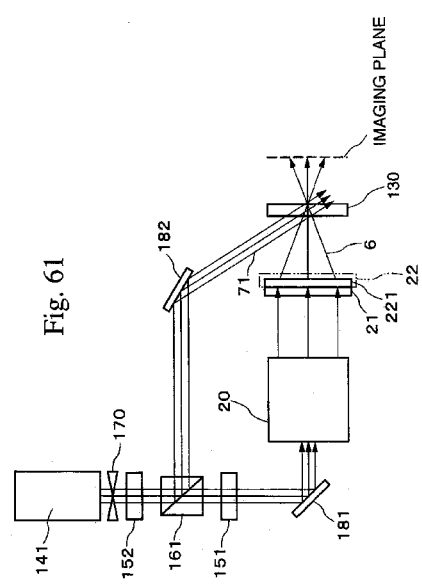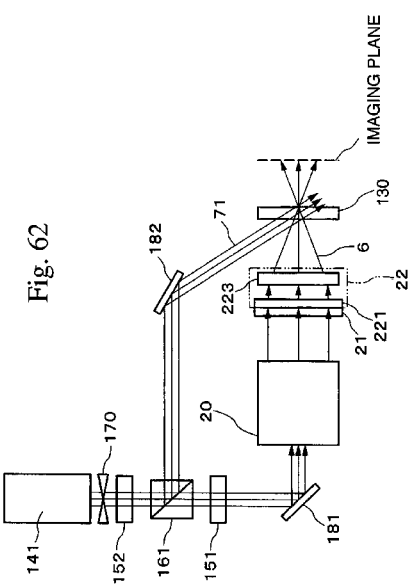

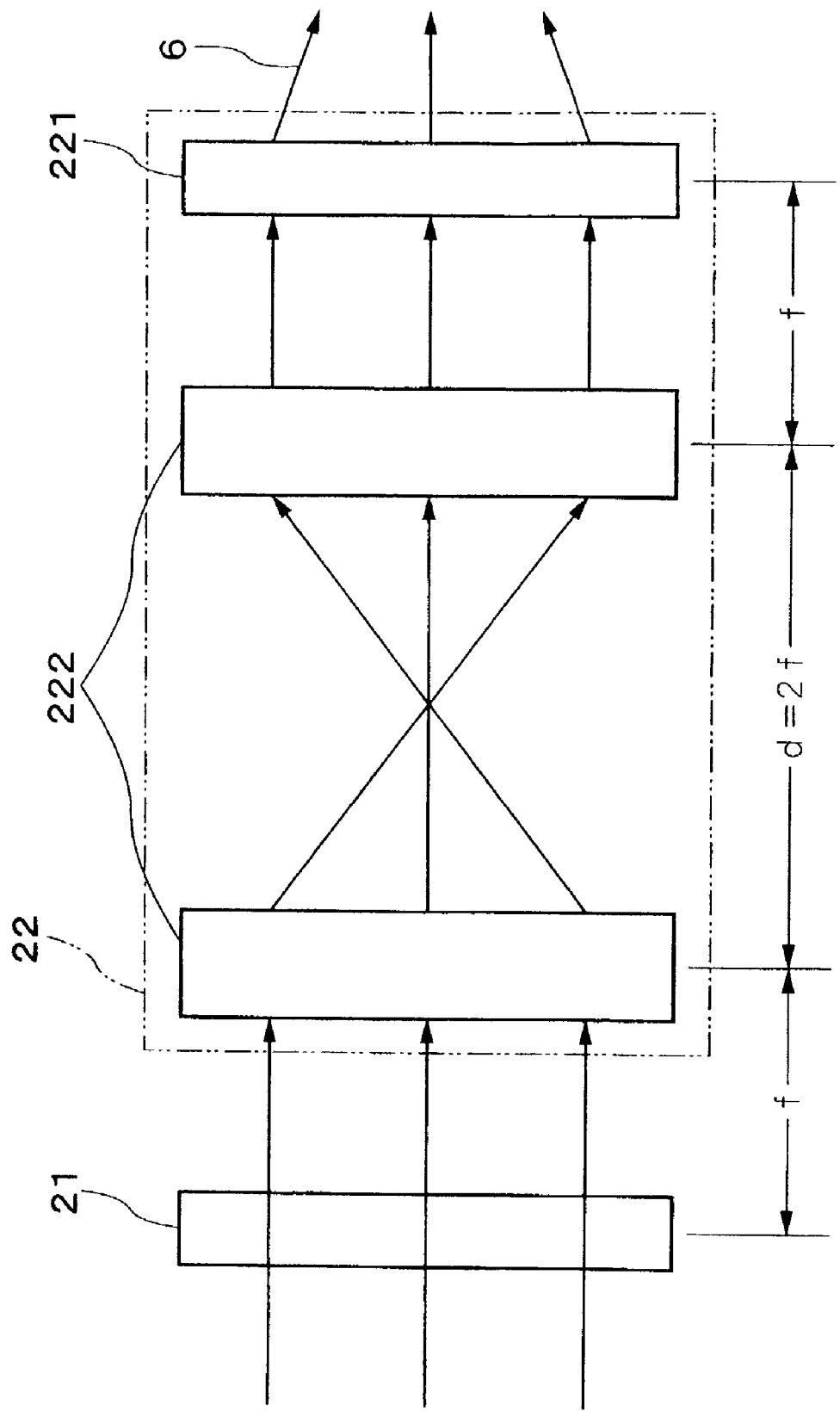

OPTICAL WAVEGUIDE, HOLOGRAPHIC MEDIUM, HOLOGRAPHIC STORAGE AND RETRIEVAL METHOD AND SYSTEM

BACKGROUND OF THE INVENTION

1. Field of the Invention

The present invention relates to an optical waveguide, a holographic medium using an optical waveguide, a method and system for controlling the angle of an incident beam onto such an optical device, and a holographic storage and retrieval method and system.

2. Description of the Related Art

Recently, holographic storage has become a focus of attention because of its capability of providing multiple data storage in a single medium, which produces high-density storage.

A known concrete example of holographic multiple data storage methods is a so-called volume holographic method using multiple angles (refer to J. F. Heanue et al., "Volume Holographic Storage and Retrieval of Digital Data", Science, vol. 265, pp. 749–752, 1994).

FIG. 73 shows an example of a conventional volume holographic storage and retrieval method. In the figure, reference numeral 400 indicates a holographic medium made of an optical storage material, reference numeral 6 indicates an object beam, reference numeral 71 indicates a reference beam, and reference numeral 7 indicates a retrieved beam. The reference beam 71 and the object beam 6 have the same wavelength which sensitizes the holographic medium 400.

In order to perform the storage process in FIG. 73, an object beam 6 which carries data to be stored in the medium 400 and a reference beam 71 which has a specific wavefront are simultaneously emitted onto the medium 400. Accordingly, an interference fringe pattern produced by the object beam 6 and the reference beam 71 is stored in the medium 400. That is, the data carried by the object beam 6 is stored as a hologram.

In the retrieval process, a reference beam 71 which has the same wavefront as that employed in the storage process is emitted onto the medium 400. Accordingly, the reference beam 71 is diffracted by the interference fringe pattern stored in the medium 400, and the diffracted beam is observed as a retrieved beam 7. In this process, the wavefront of the retrieved beam 7 indicates the wavefront of the object beam 6 which was used in the storage process; thus, the data which was carried by the object beam 6 can also be retrieved by the retrieved beam 7.

If the reference beam 71 has a plane wave and is made incident on the medium 400 multiple times while the incident angle is changed for each time, each produced interference fringe pattern stored in the medium 400 is different and independent according to each incident angle, thereby realizing multiple angle storage.

In the retrieval process, a reference beam 71, which has the same incident angle as one of the incident angles used in the storage process, is made incident onto the medium 400 so that a retrieved beam 7 which corresponds only to that incident angle is obtained. Therefore, only desired data among the data which were stored using multiple angles can be independently retrieved.

The holographic storage has a very high angular resolution; thus, data having a very slight incident-angle difference can be independently stored. This feature realizes improved multiple storage and high-density recording.

However, when data is stored using multiple angles in the system shown in FIG. 73, the incident angle of the reference beam 71, which is incident on the medium 400 from an external device, should be accurately controlled in the storage and retrieval processes; thus, an optical system (having a mirror or the like) for emitting the reference beam 71 must be driven with sufficiently high accuracy. Therefore, a large and expensive mechanism is necessary.

As another conventional example, a so-called optical waveguide holographic medium is shown in FIG. 74 (refer to T. Suhara et al., "Waveguide Holograms", the proceedings of the IEICE (Institute of Electronics, Information and Communication Engineers), Vol. J60-C, No. 4, pp. 197–204, 1977). This optical waveguide holographic medium has a core layer 1, a storage layer (made of an optical storage material) stacked on the core layer 1, and a cladding layer 2.

As shown in FIG. 75, a reference beam 5 is input from an end face of the core layer 1, so as to transmit a transmitted beam 500 through the core layer 1. An object beam 6 is also input into the holographic medium in a direction perpendicular to the plane of the core layer 1. Accordingly, an interference fringe pattern is produced by the object beam 6 and evanescent light 520 which is produced by the reference beam 5, and the interference fringe pattern is stored as a hologram in the storage layer 4.

In the retrieval process, as shown in FIG. 75, when a reference beam 5 is emitted onto the core layer 1, evanescent light 520 is produced by the reference beam 5 and is leaked towards the outside of the core layer 1. This leaked evanescent light 520 passes through the storage layer 4 and is diffracted by the stored interference fringe pattern so that a retrieved beam 7, which corresponds to the object beam 6 in the storage process, is produced.

Another method is known in which optical waveguides are multilayered so as to have a multilayered optical waveguide holographic medium (refer to Japanese Unexamined Patent Application, First Publication No. Hei 9-101735, or the like).

FIG. 76 shows an example of such a multilayered optical waveguide holographic medium. In FIG. 76, each storage layer 4 is positioned between a pair of the core layer 1 and the cladding layer 2.

In order to store a hologram in the medium shown in FIG. 76, a reference beam 5 is input from an end face of a core layer 1 via a lens 44, and an object beam 6 is simultaneously input into the medium in a direction perpendicular to the waveguide plane of the planar optical waveguide, thereby storing a hologram in the storage layer 4 provided between the core layer 1 and the cladding layer 2.

In order to retrieve the hologram stored in the multilayered optical waveguide holographic medium shown in FIG. 76, the reference beam 5 is input from the end face of the core layer 1, so as to obtain a retrieved beam 7 based on the same principle as that applied to the structure shown in FIG. 75.

Another conventional example for obtaining a retrieval-only multiple storage holographic medium by forming multilayered optical waveguides, each having a scattering factor, is known (refer to Japanese Unexamined Patent Application, First Publication No. Hei 11-337756 or the like).

FIG. 77 shows an example of such a retrieval-only multiple storage holographic medium having multilayered optical waveguides which have scattering factors. In FIG. 77, reference numeral 325 indicates a scattering factor formed in a boundary surface of one of the core layer 1 and the cladding layer 2, where the scattering factor is provided for retrieving a hologram. More specifically, the scattering factor is a concavo-convex shape or the like formed on the above boundary surface. That is, in this case, the scattering factor, which is formed in advance, corresponds to an interference fringe pattern stored as a hologram.

In order to retrieve a hologram stored in the medium shown in FIG. 77, a reference beam 5 is input from an end face of a core layer 1, so that light scattered by the scattering factor 32 (formed on the boundary surface of the core layer 1) is detected as a retrieved beam 7.

However, in the media shown in FIGS. 74 and 76, the above-explained evanescent light generally has a low light intensity; thus, data may not be sufficiently stored in the storage layer. In addition, the core layer 1 and the storage layer 4 are close to each other so that the reference beam emitted onto the core layer is also easily incident on the storage layer 4. As a result, the holographic storage and retrieval operation cannot be performed under preferable conditions. Furthermore, even if the retrieved beam 5 is incident only on the core layer 1, an evanescent light component included in the reference beam is absorbed into the storage layer 4. Therefore, the intensity of the reference beam (i.e., the evanescent light) attenuates while the input beam proceeds from the input face, thereby producing insufficient data storage in the storage layer 4.

Additionally, in the medium shown in FIG. 76, the storage layer 4 should be provided for each core layer 1; thus, the entire structure and manufacturing processes are complicated, thereby increasing the manufacturing cost.

In addition, the medium shown in FIG. 77 is a retrieval-only medium; thus, additional data storage or revision of stored data is impossible.

An another example of the optical waveguide is shown in FIG. 78, which is used as a grating optical coupler (refer to T. Kose et al., "Hikarikougaku Handobukku (Optical Engineering Handbook)", Asakurashoten (Asakura Publishing Company), pp. 226–227, 1986). The optical coupler is used for coupling a light beam in the optical waveguide and a light beam transmitted through free space.

In FIG. 78, a core layer 1 is formed on a substrate 1010, and a diffraction grating layer 102 is further formed on the core layer 1. When an incident beam 103 (which may be called a reference beam) is input from an end face of the core layer 1, a transmitted beam 104 transmitted through the core layer 1 is diffracted by the diffraction grating layer 102, so that a diffracted beam 105 is output to free space at an output angle dependent on the diffraction grating layer 102. On the other hand, when a beam is input from free space into the core layer 1 at an incident angle dependent on the diffraction grating layer 102, a transmitted beam 104 can be transmitted through the core layer 1 (i.e., in the waveguide).

As shown in FIG. 78, when a transmitted beam 104, input from the left end of the core layer 1 of the optical waveguide, is transmitted in the core layer 1 from the left to the right side, the intensity of the transmitted beam 104 in the core layer 1 gradually attenuates due to absorption in the core layer 1 and diffraction by the diffraction grating layer 102. The intensity of the diffracted beam 105 is calculated by multiplication between intensity of the transmitted beam 104 and diffraction efficiency.

In such conventional optical waveguides, the diffraction efficiency of the diffraction grating layer 102 is uniform and has no specific distribution through the layer. Therefore, the diffracted beam 105 has a light intensity profile which is in proportion to the light intensity profile of the transmitted beam 104. That is, in the light intensity profile of the diffracted beam 105 (see FIG. 79), the left end has the largest value, and it gradually decreases to the right end.

Generally, in the above-explained conventional structure of the optical waveguide, a light beam transmitted through free space preferably has a light intensity profile which is as uniform as possible. However, in the conventional optical waveguide, a light beam in free space, that is, the diffracted beam 105 diffracted by the diffraction grating layer 102 has a light intensity profile which is not uniform through the layer; thus, it is difficult to handle this kind of optical waveguide as an optical component.

SUMMARY OF THE INVENTION

In consideration of the above circumstances, an object of the present invention is to provide a holographic storage and retrieval method and system for easily and highly-accurately controlling the incident angle of a reference beam, where the reference beam is input from the outside of a holographic medium in both the storage and retrieval processes which employ multiple angles.

Another object of the present invention is to provide a small and thin holographic storage and retrieval system (or device) for inputting a reference beam or a diffracted beam into a storage layer via an optical waveguide, where this system can have a surface-mounted structure.

The present invention has another object to provide a holographic storage and retrieval method and system which require no highly accurate control of the incident angle of a reference beam or the like and which is also suitable for high-density data storage.

Further, another object of the present invention is to perform preferable holographic storage and retrieval operation for a holographic medium using an optical waveguide.

The present invention also has an object to provide an optical waveguide having an diffraction grating layer which has a light intensity profile (of the diffracted beam) which is uniform or nearly uniform through the layer, where all diffracted beams output from each diffraction grating layer towards the outside of the optical waveguide can have (almost) the same light intensity, and thus the optical waveguide can be easily handled as an optical component.

Therefore, the present invention provides a holographic medium comprising:

an optical waveguide having:
at least one core layer for transmitting light, each such core layer being positioned between portions which have a refractive index lower than that of the core layer, and
at least one diffraction grating layer formed at a boundary between the core layer and the portions having a lower refractive index or in the core layer; and
at least one storage layer which is provided outside the optical waveguide in a manner such that a reference beam for holographic storage and retrieval is emittable onto the storage layer via the optical waveguide.

In this structure, the storage layer is positioned away from the core layer. Therefore, when a light beam is input from an end face of the core layer, this beam is not simultaneously incident on the storage layer, thereby performing preferable holographic storage and retrieval.

When the holographic medium has a multilayered structure including a plurality of core layers, the diffraction grating layer corresponding to each core layer may have a different shape, so that each diffracted beam produced from each core layer can have a different wavefront. Accordingly, various kinds of holograms can be stored and retrieved in a single holographic medium, thereby performing multifunctional holographic storage and retrieval.

In addition, it is unnecessary to provide a storage layer to each core layer; thus, the structure and manufacturing process of the holographic medium can be simplified, thereby reducing the manufacturing cost.

Typically, the portions having a lower refractive index include at least one cladding layer.

As a preferable example, the diffraction grating layer is formed by varying the refractive index. Accordingly, the holographic medium may function as a phase hologram whose logical diffraction efficiency is approximately 100% and which has higher sensitivity in comparison with ordinary amplitude holograms.

As a typical example, the diffraction grating layer has a concavo-convex shape. In this case, it is possible to perform holographic storage and retrieval having high diffraction efficiency and high sensitivity.

According to the above preferable and typical examples, it is unnecessary to provide a mirror, a device for driving the mirror, or the like so as to accurately adjust the direction of a reference beam for holographic storage and retrieval, and highly accurate holographic storage and retrieval can be performed using a simple method.

The present invention also provides an optical waveguide comprising:

at least one core layer for transmitting light, each such core layer being positioned between portions which have a refractive index lower than that of the core layer, and at least one diffraction grating layer formed at a boundary between the core layer and the portions having a lower refractive index or in the core layer, wherein:

each diffraction grating layer has a diffraction efficiency having a predetermined distribution through the layer, so as to provide a desired intensity to a light beam diffracted by the diffraction grating layer.

Typically, the portions having a lower refractive index include at least one cladding layer.

Preferably, the diffraction efficiency of each diffraction grating layer has a distribution for gradually increasing the diffraction efficiency along a transmission direction of a beam transmitted through the corresponding core layer.

According to the above structure, the light intensity profile of the diffracted beam from each diffraction grating layer can be uniform or nearly uniform through the layer; thus, it is easy to handle the optical waveguide as an optical component.

The present invention also provides an optical waveguide comprising:

at least two core layers for transmitting light, each such core layer being positioned between portions which have a refractive index lower than that of the core layer, and at least two diffraction grating layers, each formed at a boundary between each core layer and the portions having a lower refractive index or in each core layer, wherein:

the diffraction efficiencies of the diffraction grating layers have a predetermined distribution in a stacking direction of the layers, so as to provide a desired intensity to a light beam diffracted by each diffraction grating layer.

As a preferable example, the diffraction efficiencies of the diffraction grating layers have a distribution for gradually decreasing the diffraction efficiency along an emission direction of beams diffracted by the diffraction grating layers.

In addition, the diffraction efficiency of each diffraction grating layer may have a distribution for gradually increasing the diffraction efficiency along a transmission direction of a beam transmitted through the corresponding core layer.

Therefore, the light intensity of the diffracted beam emitted from every diffraction grating layer can be uniform or nearly uniform; thus, it is easy to handle the optical waveguide as an optical component.

The present invention also provides a holographic storage method for storing a hologram in a holographic medium as explained above, where the layers of the optical waveguide of the holographic medium are stacked from a lower side to an upper side, the method comprising the steps of:

emitting an object beam from one of the upper and lower sides of the holographic medium;

inputting a reference beam into a target core layer from an end face of this core layer; and storing data as a hologram in the storage layer by the object beam and a beam which is diffracted by the diffraction grating layer corresponding to the target core layer and which is emitted onto the storage layer.

The present invention also provides a holographic storage method for storing a hologram in a holographic medium as explained above, where the layers of the optical waveguide of the holographic medium are stacked from a lower side to an upper side, the method comprising the steps of:

emitting an object beam from one of the upper and lower sides of the holographic medium;

emitting a reference beam from one of the upper and lower sides of the holographic medium; and storing data as a hologram in the storage layer by the object beam and the reference beam.

If the storage layer requires an excitation beam in the storage process, the holographic storage method may include (i) emitting an excitation beam from one of the upper and lower sides of the holographic medium onto the storage layer, or (ii) inputting an excitation beam into a predetermined core layer from an end face of this core layer and emitting a beam, diffracted by the diffraction grating layer corresponding to the predetermined core layer, as an excitation beam to the storage layer.

The present invention also provides a holographic retrieval method for retrieving a hologram stored in a holographic medium as explained above, comprising the step of:

inputting a reference beam into a target core layer from an end face of this core layer and retrieving the hologram by a beam which is diffracted by the diffraction grating layer corresponding to the target core layer and which is emitted onto the storage layer.

The present invention also provides a holographic retrieval method for retrieving a hologram stored in a holographic medium as explained above, where the layers of the optical waveguide of the holographic medium are stacked from a lower side to an upper side, the method comprising the steps of:

retrieving the hologram by emitting an object beam from one of the upper and lower sides of the holographic medium.

The present invention also provides a holographic storage system for storing a hologram in a holographic medium as explained above, where the layers of the optical waveguide of the holographic medium are stacked from a lower side to an upper side, the system comprising:

a light source for emitting a light beam;

a beam splitting section for splitting the light beam emitted from the light source into first and second beams;

an object beam emitting section for emitting an object beam, which is obtained by spatially and optically modulating the first beam, from one of the upper and lower sides of the holographic medium; and a reference beam emitting section for inputting the second beam as a reference beam into a target core layer from an end face of this core layer, wherein data is stored as a hologram in the storage layer by the object beam and a beam which is diffracted by the diffraction grating layer corresponding to the target core layer and which is emitted onto the storage layer.

The present invention also provides a holographic storage system for storing a hologram in a holographic medium as explained above, where the layers of the optical waveguide of the holographic medium are stacked from a lower side to an upper side, the system comprising:

a light source for emitting a light beam;

a beam splitting section for splitting the light beam emitted from the light source into first and second beams;

an object beam emitting section for emitting an object beam, which is obtained by spatially and optically modulating the first beam, from one of the upper and lower sides of the holographic medium; and a reference beam emitting section for emitting the second beam as a reference beam from one of the upper and lower sides of the holographic medium, wherein data is stored as a hologram in the storage layer by the object beam and the reference beam.

If the storage layer requires an excitation beam in the storage process, each holographic storage system may further comprise:

a light source for emitting a third beam; and one of (i) an excitation beam emitting section for emitting the third beam as an excitation beam onto the storage layer from one of the upper and lower sides of the holographic medium during the storage process, and (ii) an excitation beam emitting section for inputting the third beam as an excitation beam into a predetermined core layer from an end face of this core layer and emitting a beam, diffracted by the diffraction grating layer corresponding to the predetermined core layer, as an excitation beam to the storage layer during the storage process.

The present invention also provides a holographic storage system for storing a hologram in a holographic medium as explained above, where the layers of the optical waveguide of the holographic medium are stacked from a lower side to an upper side, the system comprising:

a light source for emitting a light beam;

a beam splitting section for splitting the light beam emitted from the light source into first, second, and third beams;

an object beam emitting section for emitting an object beam, which is obtained by spatially and optically modulating the first beam, from one of the upper and lower sides of the holographic medium;

a first reference beam emitting section for inputting the second beam as a reference beam into a target core layer from an end face of this core layer;

a second reference beam emitting section for emitting the third beam as a reference beam from one of the upper and lower sides of the holographic medium; and a beam shuttering section for shutting one of the second-hand third beams so as to make one of the first and second reference beam emitting sections active, wherein:

if the first reference beam emitting section is made active, then data is stored as a hologram in the storage layer by the object beam and a beam which is diffracted by the diffraction grating layer corresponding to the target core layer and which is emitted onto the storage layer; and if the second reference beam emitting section is made active, then data is stored as a hologram in the storage layer by the object beam and the reference beam emitted by the second reference beam emitting section.

If the storage layer requires an excitation beam in the storage process, this holographic storage system may further comprise:

a light source for emitting a fourth beam; and one of (i) an excitation beam emitting section for emitting the fourth beam as an excitation beam onto the storage layer from one of the upper and lower sides of the holographic medium during the storage process, and (ii) an excitation beam emitting section for inputting the fourth beam as an excitation beam into a predetermined core layer from an end face of this core layer and emitting a beam, diffracted by the diffraction grating layer corresponding to the predetermined core layer, as an excitation beam to the storage layer during the storage process.

The present invention also provides a holographic retrieval system for retrieving a hologram stored in a holographic medium as explained above, a light source for emitting a light beam; and a reference beam emitting section for inputting at least a portion of the emitted light beam as a reference beam into a target core layer from an end face of this core layer, wherein data stored as the hologram is retrieved as a retrieved beam by using a beam which is diffracted by the diffraction grating layer corresponding to the target core layer and which is emitted onto the storage layer.

The present invention also provides a holographic retrieval system for retrieving a hologram stored in a holographic medium as explained above, where the layers of the optical waveguide of the holographic medium are stacked from a lower side to an upper side, the system comprising:

a light source for emitting a light beam; and a reference beam emitting section for emitting at least a portion of the emitted light beam as a reference beam from one of the upper or lower sides of the holographic medium, wherein data stored as the hologram is retrieved as a retrieved beam by using the reference beam.

The present invention also provides a holographic retrieval system for retrieving a hologram stored in a holographic medium as explained above, where the layers of the optical waveguide of the holographic medium are stacked from a lower side to an upper side, the system comprising:

a light source for emitting a light beam;

a beam splitting section for splitting at least a portion of the emitted light beam into first and second beams;

a first reference beam emitting section for inputting the first beam as a reference beam into a target core layer from an end face of this core layer;

a second reference beam emitting section for emitting the second beam as a reference beam from one of the upper or lower sides of the holographic medium; and a beam shuttering section for shutting one of the first and second beams so as to make one of the first and second reference beam emitting sections active, wherein:

if the first reference beam emitting section is made active, then data stored as the hologram is retrieved as a retrieved beam by using a beam which is diffracted by the diffraction grating layer corresponding to the target core layer and which is emitted onto the storage layer; and if the second reference beam emitting section is made active, then the data is retrieved as a retrieved beam by using the reference beam emitted by the second reference beam emitting section.

Each holographic retrieval system may further comprise a photodetector for detecting the retrieved beam. In this case, the system may further comprise an imaging device for imaging the retrieved beam onto the photodetector.

The present invention also provides a holographic storage and retrieval system comprising:

a holographic storage system as explained above; and an object beam shutting section for enabling shutting of the first beam, wherein data stored as the hologram is retrieved by shuttering the object beam by using the object beam shutting section and emitting only the reference beam or the diffracted beam onto the storage layer.

According to the above-explained holographic storage or retrieval method, holographic storage or retrieval system, and holographic storage and retrieval system, the incident angle of the reference beam emitted onto the holographic medium can be easily controlled in the storage and retrieval processes.

The present invention also provides an incident angle control method using an optical waveguide, wherein:

the optical waveguide comprises at least one core layer for transmitting light, each being positioned between portions which have a refractive index lower than that of the core layer; and at least one diffraction grating layer formed at a boundary between the core layer and the portions having a lower refractive index or in the core layer, where the layers of the optical waveguide of the holographic medium are stacked from a lower side to an upper side; and the incident angle of a reference beam emitted from the upper or lower side of the optical waveguide is controlled by at least one of shifting and rotating one or both of the reference beam and the optical waveguide so as to make the reference beam couple only with a predetermined one of said at least one diffraction grating layer, and make the coupled beam pass only through the core layer corresponding to the predetermined diffraction grating layer as a transmitted beam and be output only from an end face of this core layer.

If at least one storage layer is provided outside the optical waveguide in a manner such that the reference beam is emittable onto the storage layer via the optical waveguide, then the reference beam may have a wavelength $\lambda a$ for sensitizing the storage layer and may be emitted through a spatial optical selector having a small hole or slit.

In addition, if at least one storage layer is provided outside the optical waveguide in a manner such that the reference beam is emittable onto the storage layer via the optical waveguide, so as to make a holographic medium, then the incident angle control method may include:

emitting the reference beam having a wavelength $\lambda b$ by which the storage layer is not exposed, and controlling the incident angle of this reference beam at angle $\theta b$; and changing the wavelength of the reference beam from the wavelength $\lambda b$ to a wavelength $\lambda a$ for sensitizing the storage layer, and controlling the incident angle of the reference beam by at least one of shifting and rotating one or both of the reference beam and the holographic medium while using the angle $\theta b$ as a reference for adjusting the angle.

The present invention also provides an incident angle control method using a similar optical waveguide, wherein:

the incident angle of a first reference beam emitted from the upper or lower side of the optical waveguide is controlled by:

inputting a second reference beam into a predetermined core layer from an end face of this core layer, making this input beam pass through the predetermined core layer as a transmitted beam, and producing a diffracted beam diffracted by the diffraction grating layer corresponding to the predetermined core layer; and at least one of shifting and rotating one or both of the first reference beam and the optical waveguide so as to make the diffracted beam and the first reference beam substantially parallel to each other.

If at least one storage layer is provided outside the optical waveguide in a manner such that the first reference beam is emittable onto the storage layer via the optical waveguide, then the first reference beam may have a wavelength $\lambda a$ for sensitizing the storage layer and may be emitted through a spatial optical selector having a small hole or slit.

In addition, if at least one storage layer is provided outside the optical waveguide in a manner such that the first reference beam is emittable onto the storage layer via the optical waveguide, so as to make a holographic medium, then the incident angle control method may include:

emitting the first reference beam having a wavelength $\lambda b$ by which the storage layer is not exposed, and controlling the incident angle of this reference beam at angle $\theta b$; and changing the wavelength of the first reference beam from the wavelength $\lambda b$ to a wavelength $\lambda a$ for sensitizing the storage layer, and controlling the incident angle of the first reference beam by at least one of shifting and rotating one or both of the first reference beam and the holographic medium while using the angle $\theta b$ as a reference for adjusting the angle.

The present invention also provides an incident angle control system using an optical waveguide, wherein:

the optical waveguide comprises at least one core layer for transmitting light, each being positioned between portions which have a refractive index lower than that of the core layer; and at least one diffraction grating layer formed at a boundary between the core layer and the portions having a lower refractive index or in the core layer, where the layers of the optical waveguide of the holographic medium are stacked from a lower side to an upper side; and the incident angle of a reference beam, which is emitted from the upper or lower side of the optical waveguide is controlled by the incident angle control system which comprises:

a photodetecting section for detecting a beam emitted from an end face of the core layer through which a transmitted beam, produced from the reference beam, is transmitted; and a control section for at least one of shifting and rotating one or both of the reference beam and the optical waveguide based on detection results detected by the photodetecting section, so as to make the reference beam couple only with a predetermined one of said at least one diffraction grating layer and be output only from an end face of the core layer which corresponds to the predetermined diffraction grating layer.

The incident angle control system may comprise a reflector for emitting the reference beam onto the optical waveguide;

a first shifting and rotating section for at least one of shifting and rotating the reflector; and a drive control section for driving the first shifting and rotating section based on the detection results from the photodetecting section.

In this case, the system may further comprise:

a second shifting and rotating section for at least one of shifting and rotating the optical waveguide, wherein the drive control section drives the second shifting and rotating section based on the detection results from the photodetecting section.

The present invention also provides an incident angle control system using an optical waveguide, wherein:

the optical waveguide comprises at least one core layer for transmitting light, each being positioned between portions which have a refractive index lower than that of the core layer; and at least one diffraction grating layer formed at a boundary between the core layer and the portions having a lower refractive index or in the core layer, where the layers of the optical waveguide of the holographic medium are stacked from a lower side to an upper side; and a first reference beam is emitted from the upper or lower side of the optical waveguide, and a second reference beam is input into a predetermined core layer from an end face of this core layer and is transmitted through this core layer as a transmitted beam, wherein the incident angle of the first reference beam is controlled by the incident angle control system which comprises:

a photodetecting section for detecting the first reference beam and a diffracted beam produced from the transmitted beam which is diffracted by the diffraction grating layer corresponding to the predetermined core layer; and a control section for at least one of shifting and rotating one or both of the first reference beam and the optical waveguide based on detection results detected by the photodetecting section, so as to make the first reference beam and the diffracted beam substantially parallel to each other.

This incident angle control system may comprise:

a reflector for emitting the first reference beam onto the optical waveguide;

a first shifting and rotating section for at least one of shifting and rotating the reflector; and a drive control section for driving the first shifting and rotating section based on the detection results from the photodetecting section.

In this case, the system may further comprise:

a second shifting and rotating section for at least one of shifting and rotating the optical waveguide, wherein the drive control section drives the second shifting and rotating section based on the detection results from the photodetecting section.

Additionally, this system may further comprise:

a condenser for focusing the second reference beam onto the end face of the predetermined core layer; and a third shifting and rotating section for at least one of shifting and rotating the condenser, wherein the drive control section drives the third shifting and rotating section based on the detection results from the photodetecting section.

According to the above-explained incident angle control method and system, the incident angle of the reference beam can be controlled with high accuracy in the holographic storage and retrieval processes, thereby accurately retrieving the stored data.

In the above-explained holographic storage method, the object beam may be focused and emitted onto at least one small area in the storage layer of the holographic medium; and the reference beam may be emitted to an area which includes the small area.

In this case, the method may include (i) emitting an excitation beam from one of the upper and lower sides of the holographic medium onto the small area of the storage layer, or (ii) inputting an excitation beam into a predetermined core layer from an end face of this core layer and emitting a beam, diffracted by the diffraction grating layer corresponding to the predetermined core layer, as an excitation beam emitted to the small area of the storage layer.

The holographic storage method using the focused object beam may further include emitting another object beam to a shifted position in a manner such that emission areas of the two object beams partially overlap with each other.

In the above-explained retrieval method, when data is stored in at least one small area in the storage layer of the holographic medium, the method may further comprise the step of partially shuttering a retrieved beam emitted from the storage layer in a manner such that the retrieved beam is concentratedly emitted from the small area of the storage layer.

Also when data is stored in at least one small area in the storage layer of the holographic medium, the reference beam may be selectively emitted so that a retrieved beam is concentratedly emitted from the small area of the storage layer.

Also in the above-explained retrieval method, when a plurality of data are multiply stored in at least one small area in the storage layer of the holographic medium, one of the data may be selectively retrieved by shuttering retrieved beams which correspond to the other data.

In the above-explained holographic storage system, the object beam emitting section may have a focusing section for focusing and emitting the object beam onto at least one small area in the storage layer of the holographic medium; and the reference beam emitting section may emit the reference beam to an area which includes the small area.

In this case, the system may further comprise (i) an excitation beam emitting section for emitting an excitation beam from one of the upper and lower sides of the holographic medium onto the small area of the storage layer, or (ii) an excitation beam emitting section for inputting an excitation beam into a predetermined core layer from an end face of this core layer and emitting a beam, diffracted by the diffraction grating layer corresponding to the predetermined core layer, as an excitation beam emitted to the small area of the storage layer.

Typically, the focusing section has either or both of an optical imaging system including a lens, and a spatial optical phase modulator. Also typically, the spatial optical phase modulator includes a transparent dielectric plate or a liquid crystal panel.

In the above-explained holographic retrieval system, when data is stored in at least one small area in the storage layer of the holographic medium, (i) the system may further comprise a spatial optical selector for partially shuttering a retrieved beam emitted from the storage layer in a manner such that the retrieved beam is concentratedly emitted from the small area of the storage layer, or (ii) the reference beam emitting section (or the second reference beam emitting section) may selectively emit the reference beam so that a retrieved beam is concentratedly emitted from the small area of the storage layer.

According to the above holographic storage and retrieval methods and holographic storage and retrieval systems in which the holographic medium is divided into a plurality of areas, each of the object beam, the reference beam, and the excitation beam can be selectively or concentratedly emitted onto each area, so that high-density multiple data storage can be efficiently performed.

The present invention also provides a holographic storage method comprising the steps of:

emitting a focused object beam onto a small area in a storage layer of a holographic medium;

emitting another object beam to a shifted position in a manner such that emission areas of the two object beams partially overlap with each other; and emitting a reference beam to the emission area of each object beam so as to store a plurality of data.

This method may further comprise the step of:

emitting an excitation beam from one of the upper and lower sides of the holographic medium to the emission area of each object beam in the storage layer.

The present invention also provides a holographic retrieval method for retrieving data stored in a holographic medium by using the above holographic storage method for shifting the object beam, the retrieval method comprising the step of selectively retrieving one of the stored data by shuttering retrieved beams which correspond to the other data.

BRIEF DESCRIPTION OF THE DRAWINGS

FIG. 18 is a sectional view showing another example of the structure of a holographic medium to which the holographic storage and retrieval method of the ninth embodiment is applied.

FIGS. 42A and 42B are diagrams for explaining a holographic storage method for storing data portions divided from a single piece of data.

FIGS. 43A and 43B are diagrams for explaining a holographic storage method as the fourteenth embodiment of the present invention, which show an example for independently emitting an excitation beam.

FIGS. 46A to 46C are diagrams for explaining a holographic retrieval method as the sixteenth embodiment of the present invention.

FIGS. 49A to 49C are diagrams for explaining an example for simultaneously retrieving divided data in the sixteenth embodiment.

FIGS. 51A to 51C are diagrams for explaining an example for simultaneously retrieving divided data in the seventeenth embodiment.

FIG. 60 is a diagram showing the structure of a holographic storage system as the twentieth embodiment of the present invention.

FIG. 61 is a diagram showing the structure of a holographic storage system as the twenty-first embodiment of the present invention, which shows an example for using a spatial optical phase modulator as the optical imaging system.

FIG. 62 is a diagram showing an example structure which includes a spatial optical phase modulator and a lens which function as the optical imaging system.

FIG. 63 is a diagram showing an example structure which includes a spatial optical phase modulator and a 4f lens system which function as the optical imaging system.

DESCRIPTION OF THE PREFERRED EMBODIMENTS

Figure 1:
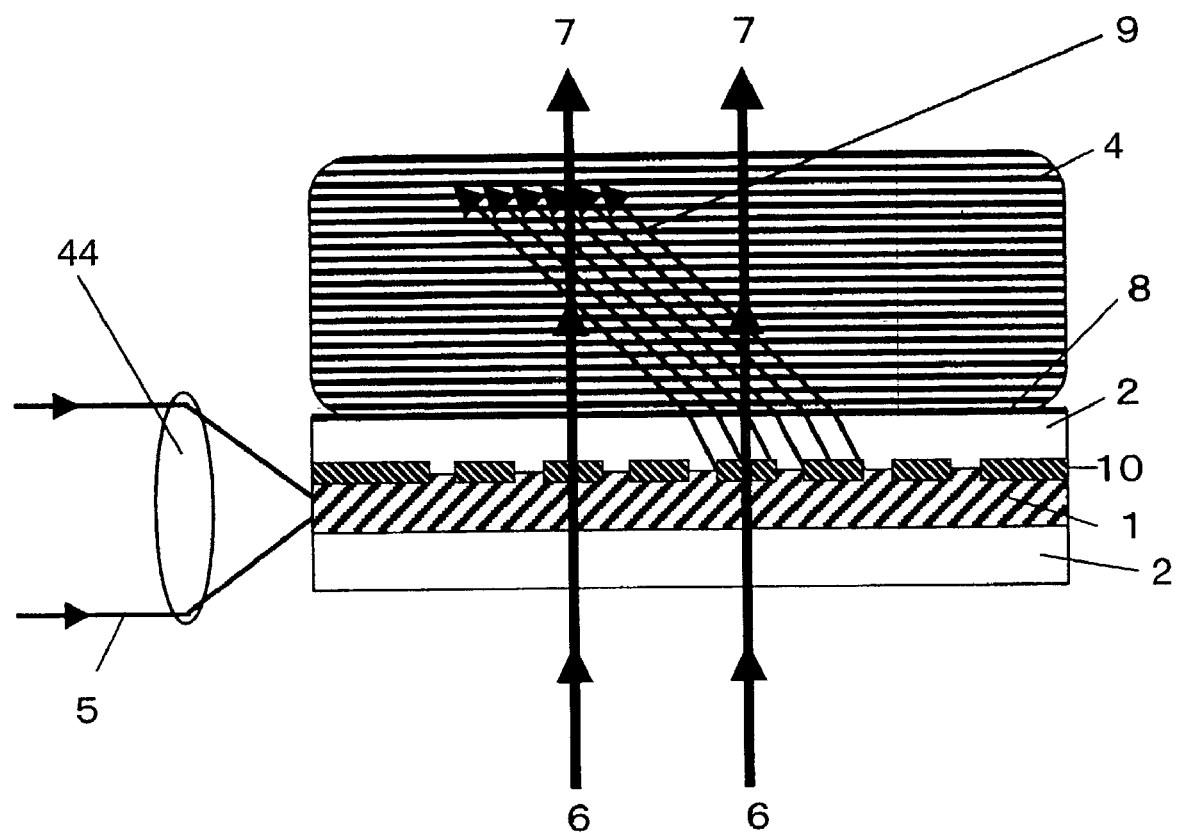
FIG. 1 shows a holographic medium as the first embodiment of the present invention.

Hereinafter, embodiments according to the present invention will be explained in detail with reference to the drawings. In the figures related to the embodiments, portions identical to each other may be given identical reference numerals and duplicate explanations are omitted or may be simplified.

FIRST EMBODIMENT

FIG. 1 shows a holographic medium as the first embodiment of the present invention.

In FIG. 1, reference numeral 10 indicates a diffraction grating layer formed at the boundary between a pair of a core layer 1 and an upper cladding layer 2, and reference numeral 4 indicates a storage layer.

The diffraction grating layer 10 may be formed at a boundary between the core layer 1 and a lower cladding layer 2 or at both boundaries, and may be formed in the core layer 1. This condition may also be applied to embodiments explained below which have a similar structure.

The storage layer 4 made of an optical storage material is further stacked on an optical waveguide which illustratively consists of the stacked lower cladding layer 2, core layer 1, and upper cladding layer 2 (see FIG. 1) in a manner such that (the plane of) the storage layer 4 is normal to the waveguide plane of the optical waveguide.

Reference numeral 8 indicates an adhesive layer for adhering the storage layer 4 to the optical waveguide. However, the adhesive layer 8 may be omitted if the optical waveguide and the storage layer 4 adhere to each other by another method. In addition, an arrangement in which the optical waveguide and the storage layer 4 do not contact each other is also possible. These conditions can also be applied to relevant embodiments (i.e., having an optical waveguide and a storage layer) explained below.

The holographic storage and retrieval medium shown in FIG. 1 is fabricated by, for example, the following process.

First, a core layer 1 is formed on a lower cladding layer 2 by spin coating or the like. In the next step, the core layer 1 is coated with a resist for forming the diffraction grating layer 10 on the core layer 1 by spin coating or the like. The resist formed on the core layer 1 is irradiated by a light or electron beam so as to pattern a diffraction grating layer 10 by double beam interference exposure or electron beam patterning. An upper cladding layer 2 is further formed on the diffraction grating layer 10.

In the process of forming the lower cladding layer 2 and the core layer 1, a support substrate may be used. However, if the optical waveguide consisting of the cladding and core layers is a sufficient thickness, such a support substrate may be omitted and the core and cladding layers themselves can realize the optical waveguide.

An optical storage material, which functions as the storage layer 4, is then placed on the optical waveguide formed as explained above. The optical storage material may be an optical storage material used in normal holographic storage, for example, a photopolymer material such as a photopolymer which produces photopolymerization due to a change of the cyclic structure caused by light irradiation, a photo-crosslinking material such as an ammonium dichromate-poly(vinyl alcohol) material, a photochromic material, a photoanisotropic material such as a material obtained by doping PMMA (poly(methyl methacrylate)) with azo dye, a photorefractive material such as $LiNbO_3$, $BaTiO_3$, $Ba_{12}SiO_{20}$(BSO) which have inorganic dielectric crystals, and a polymer photorefractive material. These typical examples for the storage layer can also be applied to the following embodiments using a storage layer.

As a concrete example of the shape of the holographic medium, a card, chip, disk, tape, or drum shape or the like is possible; that is, the present invention can be applied to a holographic medium having any of the above shapes.

In addition, it is not always necessary for the area of the waveguide plane of the optical waveguide to match the area of the storage layer 4, that is, the area of the waveguide plane may be larger or smaller than the area of the storage layer 4. If the area of the waveguide plane is larger than the area of the storage layer 4, the optical waveguide may be driven by one, two, or three-dimensional control, thereby making the area of the waveguide plane correspond to a larger area of the storage layer 4.

Below, the data storage and retrieval method for the holographic medium shown in FIG. 1 will be explained.

In the storage process, a reference beam 5 is input from a side face (i.e., end face) of the core layer 1 via a lens 44 and an object beam 6 is simultaneously input into the optical waveguide from the upper or lower side of the optical waveguide. The incident reference beam 5 is transmitted through the core layer 1 and is transformed in an area (of the core layer 1) where the diffraction grating layer 10 is formed, into a diffracted beam 9 having a specific wavefront. The diffracted beam 9 is emitted outside the core layer 1 while passing through the storage layer 4.

The incident object beam 6 is transmitted through the optical waveguide, that is, the lower cladding layer 2, the core layer 1 and the upper cladding layer 2, and then transmitted through the storage layer 4. Accordingly, in the storage layer 4, the diffracted beam 9 produced from the reference beam 5 interferes with the object beam 6, so that an interference fringe pattern is stored in the storage layer 4 as a hologram.

In the retrieval process, a reference beam 5 is emitted to an end face of the core layer 1. The emitted reference beam 5 is transmitted through the core layer 1 and is transformed into a diffracted beam 9 having the same wavefront as that in the storage process. The diffracted beam 9 is emitted outside the core layer 1 and is transmitted through the storage layer 4. In the transmission through the storage layer 4, the object beam 6 can be retrieved as a retrieved beam 7 due to diffraction by the interference fringe pattern.

In the holographic medium of the present embodiment, the storage layer 4 is isolated and positioned far from the core layer 1; thus, when the reference beam 5 is input from the end face of the core layer 1, this beam is not incident on the storage layer 4, thereby performing a preferable holographic storage and retrieval operation. In addition, such a simple structure having a storage layer 4 isolated from the core layer 1, the entire structure and manufacturing process can be simplified, thereby decreasing the manufacturing cost.

The diffracted beam 9 which passes through the storage layer 4 can have any desired wavefront by suitably designing the diffraction grating layer 10. For example, a uniform wavefront (such as a plane or spherical wave) over the area where the diffraction grating layer 10 is formed may be produced.

Figure 2:
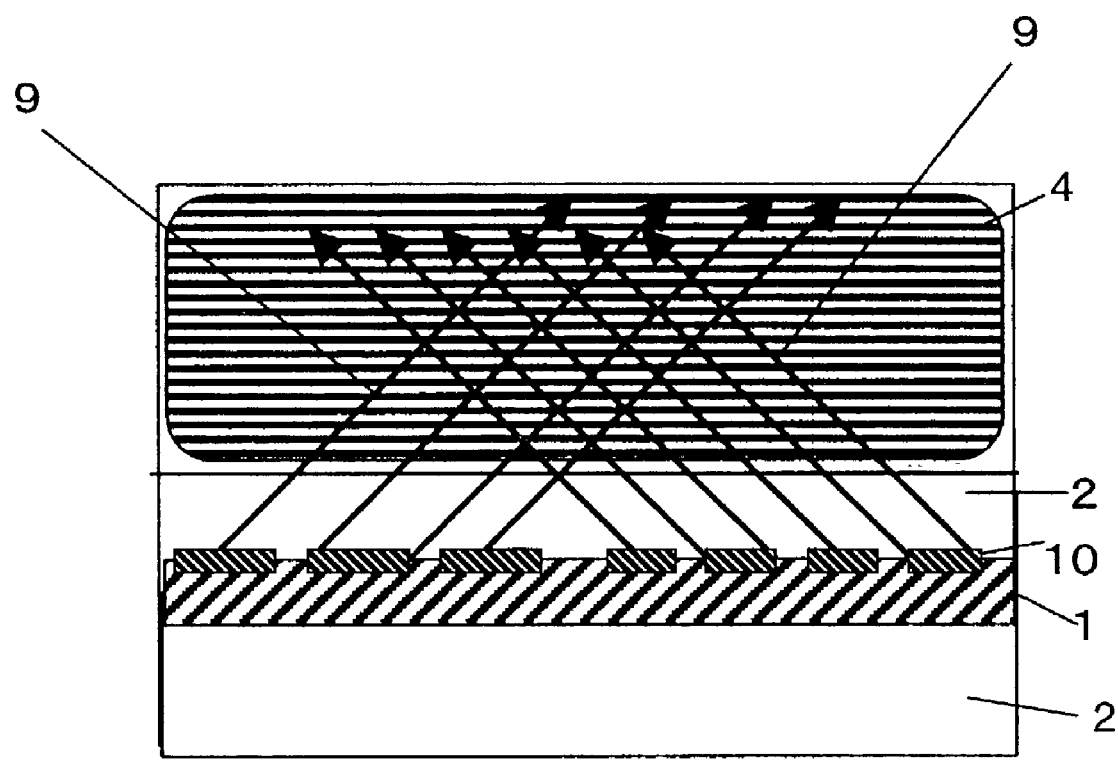
FIG. 2 is a diagram showing an example of the diffraction grating layer of the holographic medium in the first embodiment.

Additionally, as shown in FIG. 2, two areas having different characteristics (i.e., left and right areas in the figure) may be provided in the area where the diffraction grating layer 10 is formed, and the pitch and angle of grooves of the diffraction grating layer 10 in the left area may be different from that in the right area, thereby producing a diffracted beam 9 which is a parallel beam (having a plane wave) emitted in a different direction. Similarly, it is possible to realize multifunctional holographic storage and retrieval using an optical waveguide which has two or more divided areas.

Figure 3:
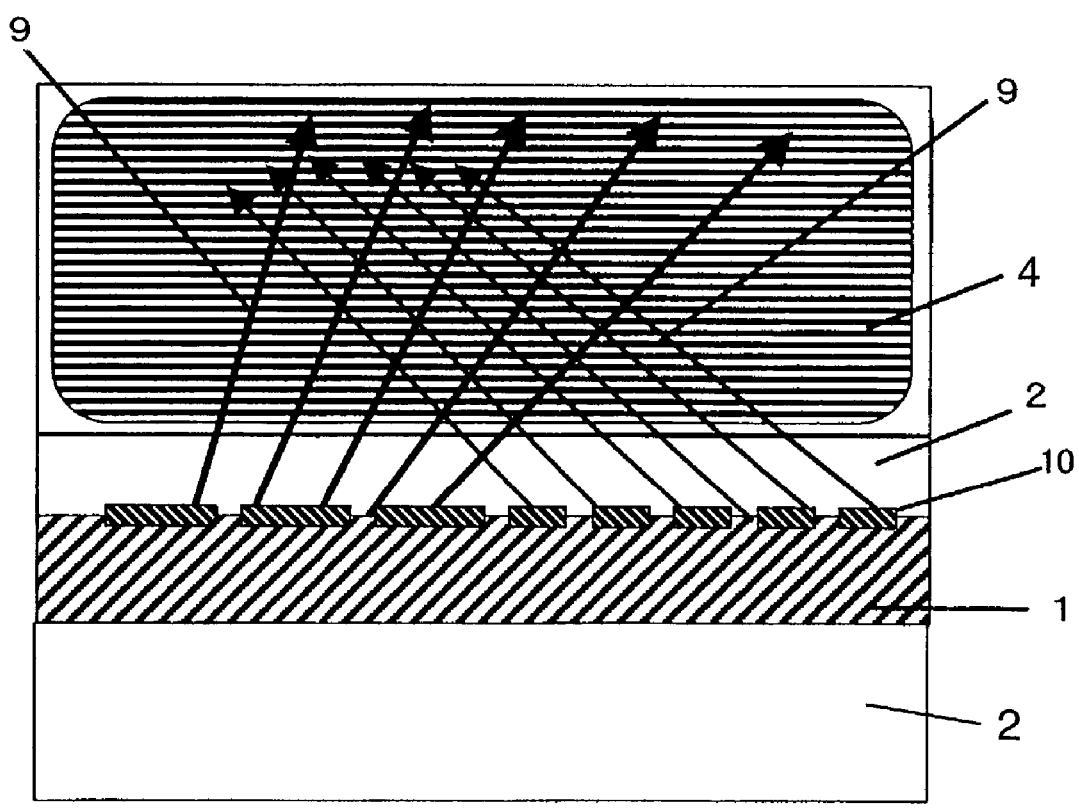
FIG. 3 is a diagram showing another example of the diffraction grating layer of the holographic medium in the first embodiment.

For example, see FIG. 3. In the area where the diffraction grating layer 10 is formed, the pitch of the grooves of the diffraction grating layer 10 may be changed and different angles may be respectively assigned to the grooves, so that the produced diffracted beam 9 can include different kinds of converging or diverging beams. As explained above, multifunctional holographic storage and retrieval using an optical waveguide can be realized by using various wavefronts obtained by the diffraction grating layer 10.

In addition, the diffracted beam 9 is produced inside the optical waveguide and thus can function as a reference beam for holographic storage and retrieval. Accordingly, it is unnecessary to provide a mirror, a device for driving the mirror, or the like so as to accurately adjust the direction of the reference beam for holographic storage and retrieval, and highly accurate holographic storage and retrieval can be performed using a simple method.

SECOND EMBODIMENT

Figure 4:
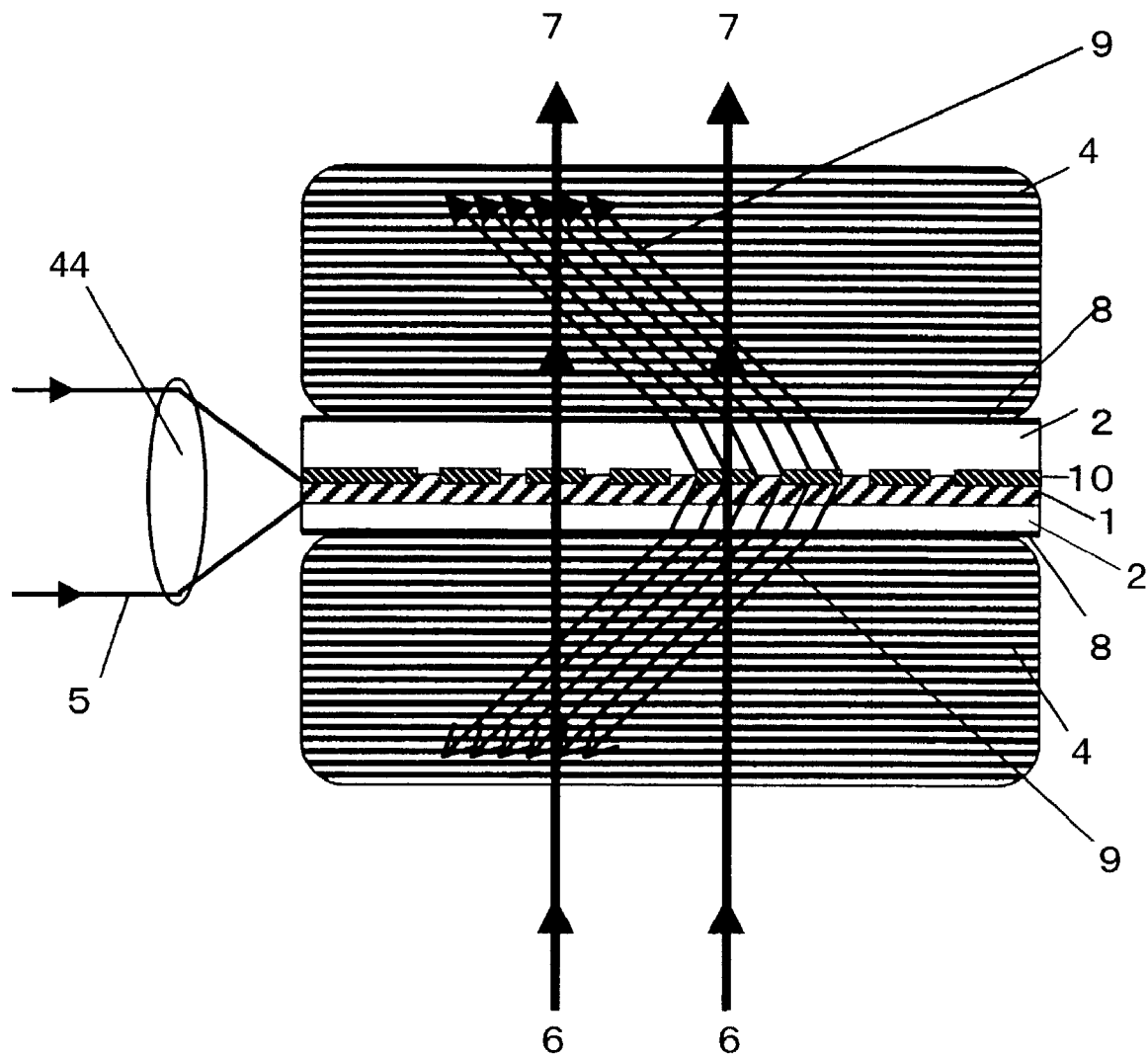
FIG. 4 shows a holographic medium as the second embodiment of the present invention.

FIG. 4 shows a holographic medium as the second embodiment of the present invention.

As shown in FIG. 4, in the present embodiment, two storage layers 4 are arranged at either side (i.e., upper and lower sides) of the optical waveguide, in parallel to the plane of the waveguide.

The principle of the function of the holographic medium and the storage and retrieval method applied to the holographic medium are similar to those applied to the structure of FIG. 1, which has a single storage layer 4 at one side of the optical waveguide. In the present embodiment having the storage layers 4 at both the upper and lower sides, the diffracted beam 9 can be much effectively used, thereby improving the efficiency of data storage and retrieval.

THIRD EMBODIMENT

Figure 5:
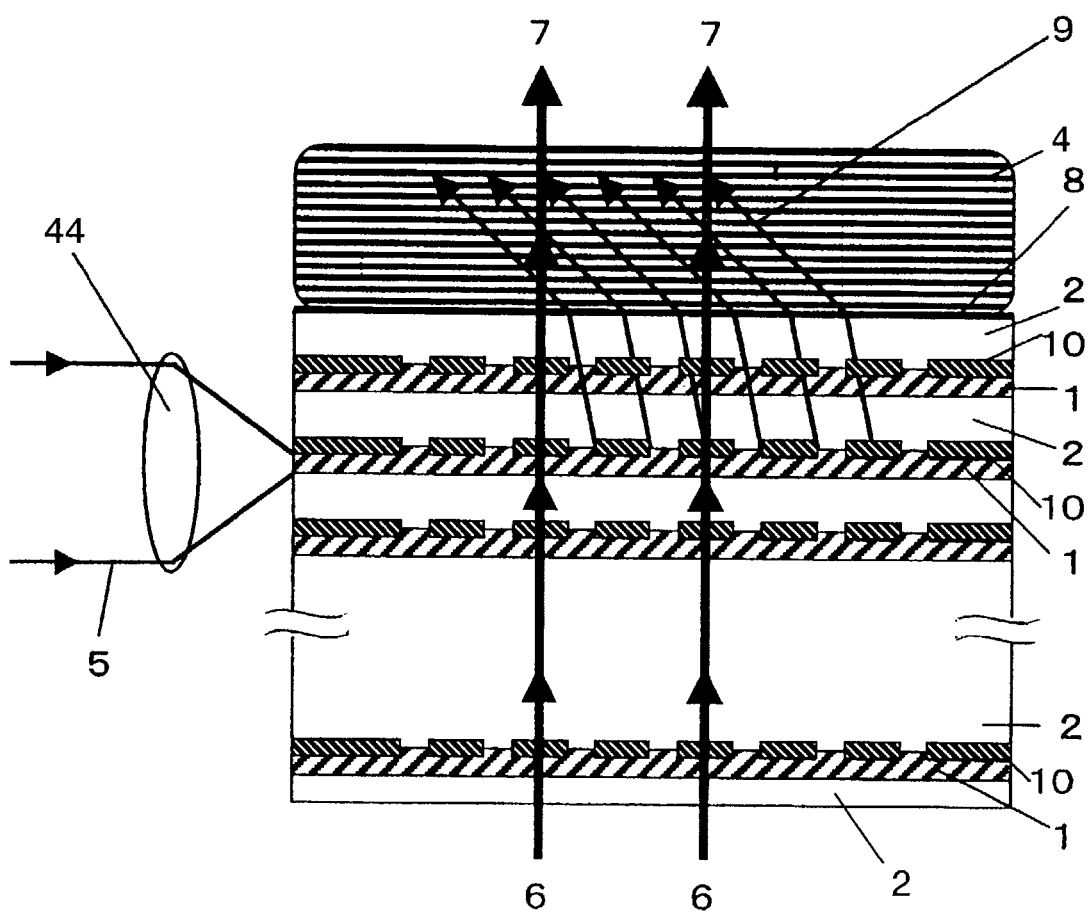
FIG. 5 shows a holographic medium as the third embodiment of the present invention.

FIG. 5 shows a holographic medium as the third embodiment of the present invention.

As shown in FIG. 5, the optical waveguide of the present embodiment is a multilayered optical waveguide including two or more sets of a core layer 1 and a cladding layer 2. In this structure, a single cladding layer has two functions, that is, an upper cladding layer with respect to a core layer below this cladding layer, and a lower cladding layer with respect to a core layer above this cladding layer.

Each diffraction grating layer 10 is provided at a boundary surface between each core layer 1 and its corresponding upper cladding layer 2 formed on the core layer 1. Also in this structure, the diffraction grating layer 10 may be formed at a boundary surface between a core layer 1 and its corresponding lower cladding layer 2, or at both boundary surfaces, or may be formed in the core layer 1. In each case, similar effects can be obtained. A storage layer 4 is positioned at one side (i.e., the upper side) of the multilayered optical waveguide, in parallel to the plane of the waveguide.

In order to manufacture the holographic medium shown in FIG. 5, the core layer 1, the cladding layer 2, and the diffraction grating layer 10 can be formed using a method similar to that applied to the first embodiment. However, the diffraction grating layer 10 formed for each core layer 1 can have a different shape, thereby producing a diffracted beam 9 having a different wavefront from each core layer 1. In this case, the values of at least one of specific parameters such as the width of the groove, the spacing of the grooves, the angle of the groove, and the height of the groove may be changed. In addition, the area size and the shape of the diffraction grating layer 10 may also be parameters. According to changing the value of such a parameter, diffracted beams having various wavefronts can be produced, thereby storing and retrieving various kinds of holograms.

As examples of various kinds of wavefronts, the diffracted beam 9 may be a parallel beam (having a plane wave) or a combination of parallel beams (see FIG. 2). The diffracted beam 9 may also be a converging or diverging beam, or may have a combination of wavefronts including a converging or diverging beam (see FIG. 3).

After the diffraction grating layer 10 is formed for each core layer 1, the upper cladding layer 2 is formed. Accordingly, a multilayered optical waveguide including a plurality of the core layers 1 and the cladding layers 2 is formed. The storage layer 4 is further arranged on the multilayered optical waveguide. Here, an adhesive layer 8 may be provided between the multilayered optical waveguide and the storage layer 4 if necessary.

Below, the holographic storage and retrieval method in the present embodiment will be explained.

In the storage process, a reference beam 5 is input from an end face of a specific core layer 1, and an object beam 6 is simultaneously input into the multilayered optical waveguide from the upper or lower side of the optical waveguide.

The incident reference beam 5 is transmitted through the core layer 1 and transformed in the area where the diffraction grating layer 10 is formed into a diffracted beam 9 having a specific wavefront. This diffracted beam 9 is emitted towards the outside of the core layer 1 and passes through the storage layer 4.

On the other hand, the object beam 6 incident from the upper or lower side of the multilayered optical waveguide passes through this optical waveguide having multiple core layers 1 and cladding layers 2 and also passes through the storage layer 4. In the storage layer 4, the diffracted beam 9 produced from the reference beam 5 and the object beam 6 interfere with each other, so that an interference fringe pattern is stored in the storage layer 4 as a hologram.

In the retrieval process, a reference beam 5 is emitted onto the specific core layer 1. The reference beam 5 is transmitted through the core layer 1 and transformed in the area where the diffraction grating layer 10 is formed into a diffracted beam 9 having the same specific wavefront as that in the storage process. This diffracted beam 9 is emitted towards the outside of the core layer 1 and passes through the storage layer 4. When passing through the storage layer 4, the diffracted beam 9 is further diffracted by the stored interference fringe pattern, thereby producing a retrieved beam 7 which corresponds to the object beam 6 used in the storage process.

If the diffraction grating layer 10 formed for each core layer 1 has a different shape, then in a single medium, multiple holograms can be stored and retrieved due to multiple wavefronts obtained by the diffraction grating layers 10.

In addition, it is unnecessary to provide a storage layer 4 for each core layer 1; thus, the entire structure and manufacturing process can be simplified, thereby reducing the manufacturing cost.

When the diffraction grating layer 10 formed for each core layer 1 has a different shape, it is possible to avoid redundancy of having diffraction grating layers which have the same shape and are formed at different places. However, such a structure including diffraction grating layers which have the same shape at different palaces may be preferable depending on a method of using the medium. Therefore, diffraction grating layers having the same shape may be provided at a plurality of boundaries, each between the core layer and the cladding layer, or in a plurality of core layers.

FOURTH EMBODIMENT

Figure 6:
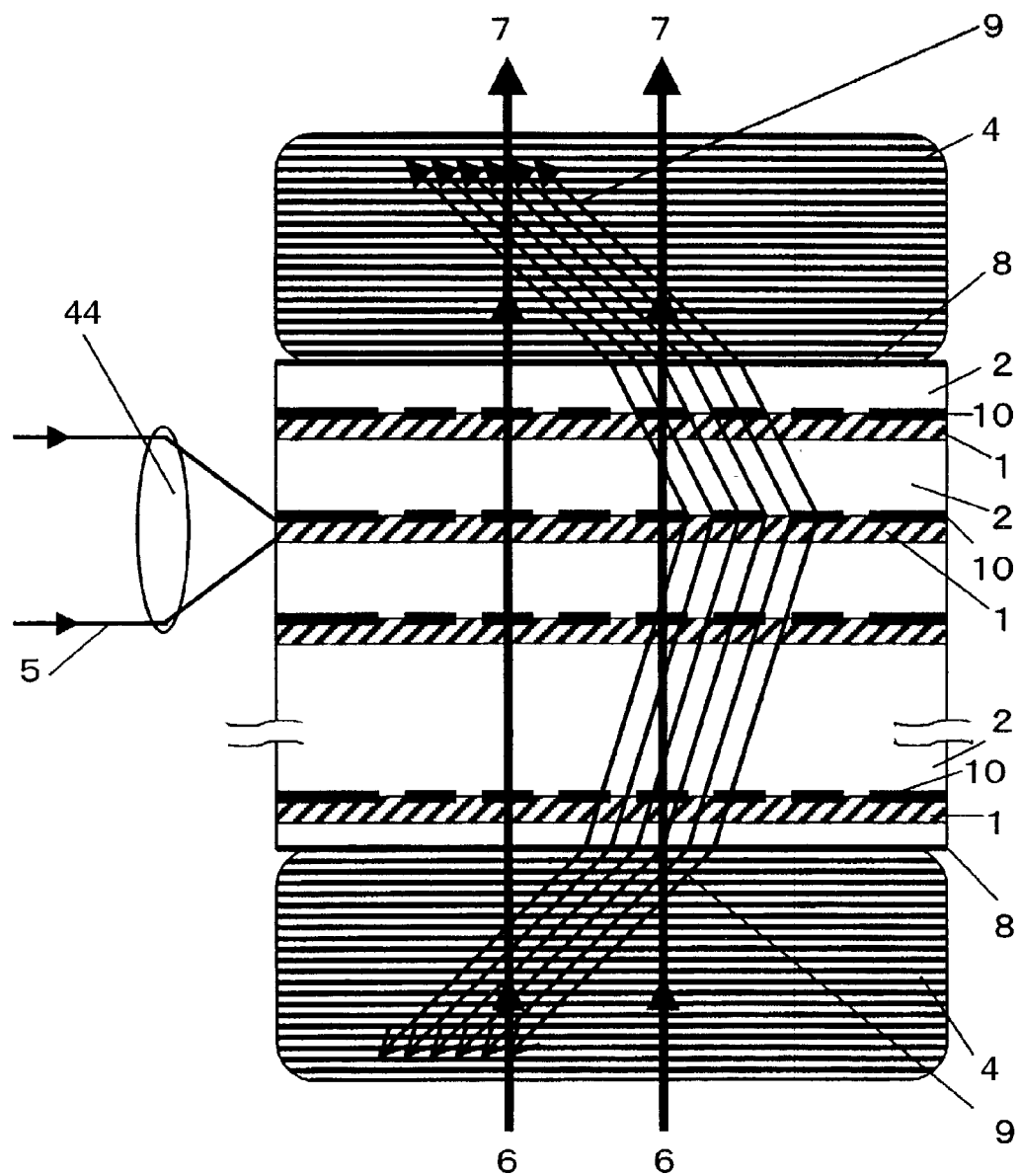
FIG. 6 shows a holographic medium as the fourth embodiment of the present invention.

FIG. 6 shows a holographic medium as the fourth embodiment of the present invention.

As shown in FIG. 6, in the present embodiment, two storage layers 4 are arranged at the upper and lower sides of the multilayered optical waveguide which has a structure similar to that of the third embodiment.

The principle of the function of the holographic medium and the storage and retrieval method applied to the holographic medium are similar to those applied to the third embodiment. However, due to the structure having the storage layers 4 at both the upper and lower sides, the diffracted beam 9 can be much effectively used, thereby improving the efficiency of data storage and retrieval.

FIFTH EMBODIMENT

Figure 7:
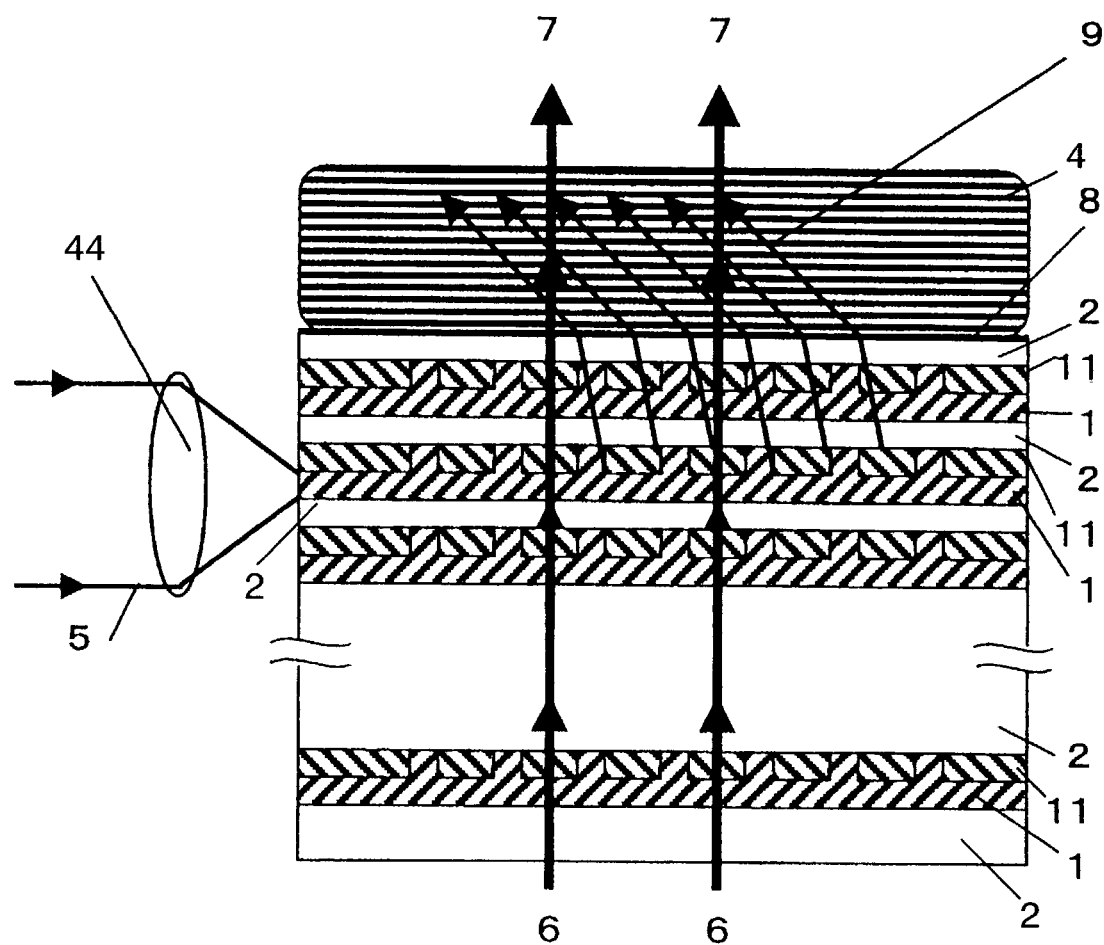
FIG. 7 shows a holographic medium as the fifth embodiment of the present invention.

FIG. 7 shows a holographic medium as the fifth embodiment of the present invention.

In FIG. 7, reference numeral 11 indicates a diffraction grating layer functioning as a factor for varying the refractive index. Similar to the third embodiment, the storage layer 4 is provided at one side of the multilayered optical waveguide, where the storage layer 4 contacts the optical waveguide.

The holographic medium can be manufactured by, for example, the following process.

If a polymeric material such as PMMA or photopolymer is used for making the waveguide, a cladding layer 2 is formed on a substrate by spin coating or the like, and a part of a core layer 1 is further formed on the cladding layer 2. Then, a resist, which functions as the remaining part of the core layer 1 and which has a refractive index almost the same as that of the core layer 1, is applied, and laser interference or electron beam irradiation is performed so as to produce a difference of photopolymerization in the resist, thereby providing a refractive index fluctuation in the core layer 1.

If a photochromic material is used for making the waveguide, a diffraction grating (layer) can be directly formed by double beam interference exposure.

If a chalcogenide amorphous thin film is used for making the waveguide, optical or electron beam irradiation can produce a diffraction grating layer 11 for providing an refractive index fluctuation in the core layer 1.

If a cladding layer 2 is made of LiNbO$_3$ and Ti or Fe is scattered on it in an area for making a core layer 1, the core layer 1 can be formed. Also in this case, the double beam interference exposure can be employed for making a diffraction grating layer 11 by directly exposing a diffraction grating pattern so as to produce a refractive index fluctuation in the core layer 1.

The diffraction grating layer 11 having such a refractive index fluctuation factor functions as, for example, a phase hologram. The logical value of the diffraction efficiency (i.e., the ratio of light intensity of the diffracted beam 9 to the light intensity of the reference beam 5 in FIG. 7) of the phase hologram is almost 100%. Therefore, in comparison with the case of using general holograms, the holographic medium using an optical waveguide of the present embodiment can have a higher sensibility.

SIXTH EMBODIMENT

Figure 8:
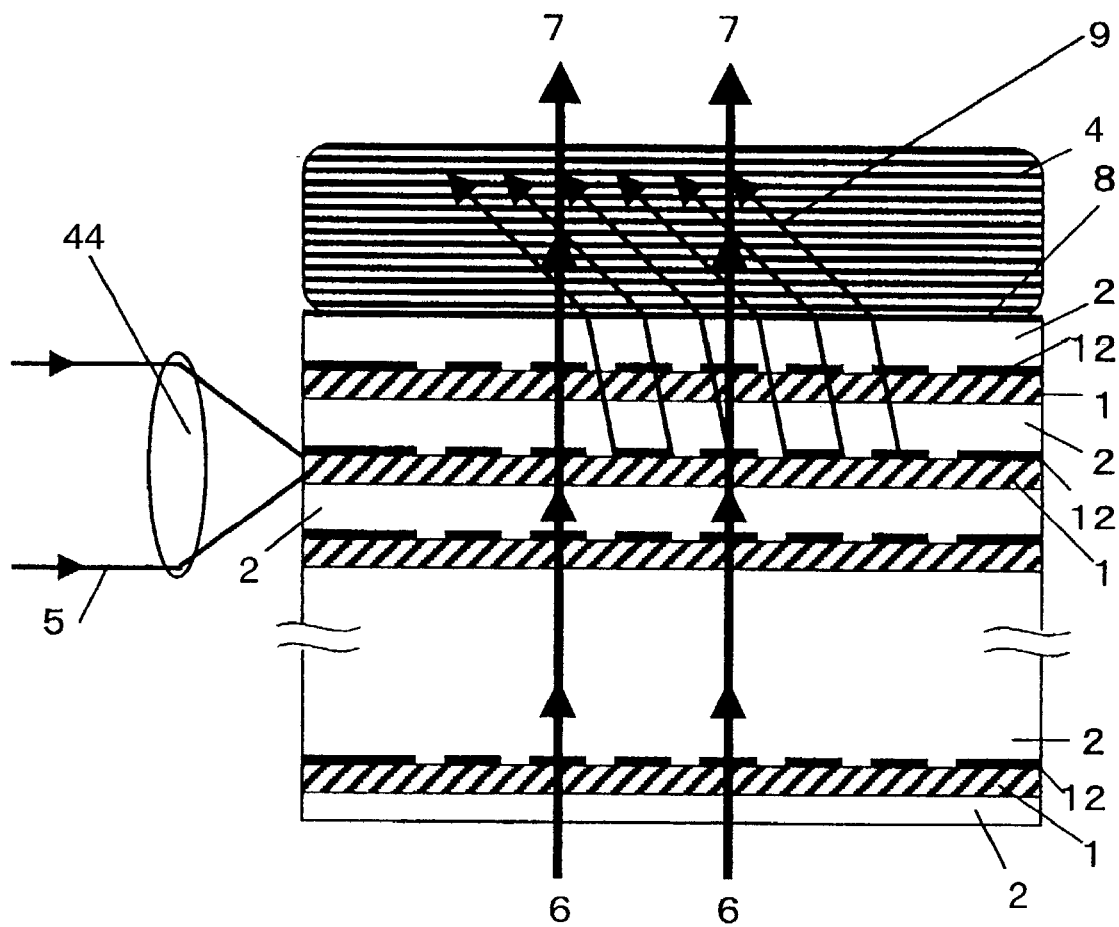
FIG. 8 shows a holographic medium as the sixth embodiment of the present invention.

FIG. 8 shows a holographic medium as the sixth embodiment of the present invention.

In FIG. 8, reference numeral 12 indicates a diffraction grating layer having an (alternating) concavo-convex shape formed on each core layer 1. The storage layer 4 and the multilayered optical waveguide have the same basic structures as those in the fifth embodiment.

The holographic medium of the present embodiment can be manufactured by, for example, the following method.

In order to make a multilayered optical waveguide using a resist and a polymeric material such as a photopolymer, first, a cladding layer 2 is formed by spin coating or the like, and a core layer 1 is further formed on the cladding layer 2.

In the next step, the core layer 1 is coated with a resist for forming a diffraction grating layer 12 on the core layer 1, by spin coating or the like. The resist is subjected to double beam interference exposure or electron beam patterning and then developed, so as to pattern the resist. After that, the core layer 1 is etched so that the surface of the core layer 1 has a concavo-convex shape which functions as the diffraction grating layer 12.

The diffraction grating layer may be a concavo-convex shape on a surface of the cladding layer 2. In this case, after the core layer 1 is formed on the lower cladding layer 2, the core layer 1 is coated with a resist by spin coating or the like. The resist is then patterned and a material for the cladding layer 2 is deposited on the resist pattern. According to the following lift-off process (i.e., removal of unnecessary portions of the pattern), the material for the cladding layer can remain on the core layer 1 as a thin deposit. A cladding layer 2 is then formed on the core layer 1 having such a thin deposit, so that a diffraction grating layer having a concavo-convex shape can be formed on a surface of the cladding layer 2.

In another method of forming the diffraction grating layer 12, a stamper having the same shape as a target concavo-convex shape for the diffraction grating layer 12 is manufactured in advance, and this stamper is pressed onto a surface of the core layer 1 or the cladding layer 2, thereby transferring the concavo-convex shape onto the core layer 1 or the cladding layer 2. More specifically, a known process for manufacturing optical disks such as CDs or DVDs can be applied to this method, which realizes mass production of holographic media using optical waveguides.

This diffraction grating layer 12 having a concavo-convex shape on the core layer 1 has a high diffraction efficiency, thereby realizing a holographic medium including an optical waveguide, which has high sensitivity.

SEVENTH EMBODIMENT

Figure 9A:
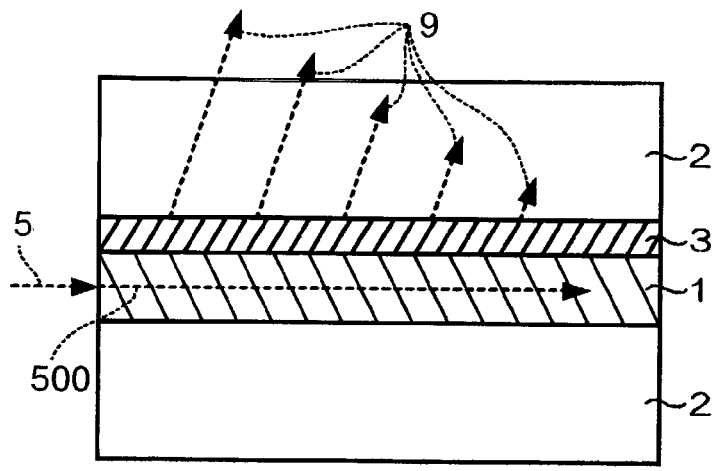
FIGS. 9A and 9B are sectional views showing the structure of an optical waveguide as the seventh embodiment of the present invention.

FIG. 9A is a sectional view showing the structure of an optical waveguide as the seventh embodiment of the present invention.

In FIG. 9A, the diffraction efficiency of a diffraction grating layer 3 formed between the core layer 1 and the upper cladding layer 2 has a specific distribution along the layer. More specifically, the diffraction grating layer 3 has a specific distribution such that the diffraction efficiency gradually increases along the transmission direction of the beam which is transmitted through the core layer 1.

As a typical example, the diffraction grating layer 3 has a rectangular-wave shape (i.e., alternating concavo-convex shape) (see FIG. 10) formed between the core layer 1 and the upper cladding layer 2. When a reference (or incident) beam 5 is input from the left end of the core layer 1, the reference beam 5 is exposed to absorption of the core layer 1 and diffraction of the diffraction grating layer 3 (so that a diffracted beam 5 as shown by the arrows in FIG. 9A is produced). Therefore, the light intensity of the transmitted beam 500 through the core layer 1 is maximum at the left end (of the core layer) and gradually decreases towards the right end (see the profile in FIG. 79).

Figure 79:
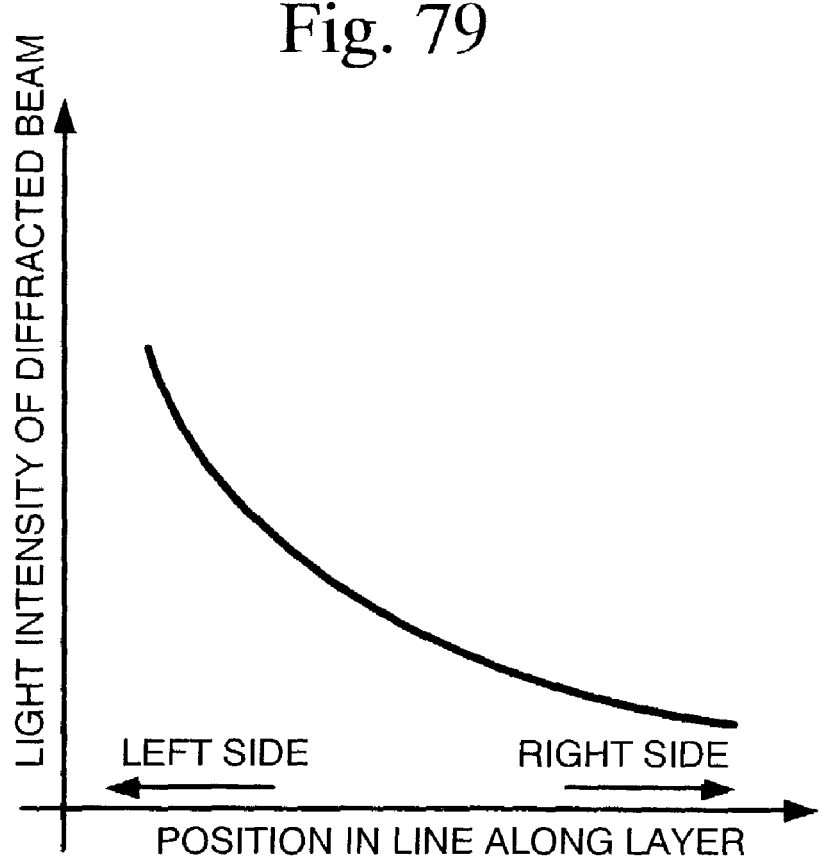
FIG. 79 is a diagram showing the intensity profile of a diffracted beam through a diffraction grating layer of a conventional optical waveguide.

In FIG. 79, the horizontal axis indicates distance Z along the transmission direction of the transmitted beam, while the vertical axis indicates light intensity A of the diffracted beam. If it is assumed that each of the core layer, cladding layer, diffraction grating layer, diffraction grating, and the like has uniform characteristics along the transmission direction, an approximate relationship "A ∝ exp(−z)" is defined ("∝" indicates a proportional relationship). That is, the light intensity along the transmission direction of the core layer 1 and the light intensity of the diffracted beam exponentially decrease (i.e., along an exponential curve).

As described above, the intensity of the diffracted beam 9 is defined by multiplication between intensity of the transmitted beam 500 and the diffraction efficiency. Accordingly, in order to obtain a uniform light intensity profile of the diffracted beam 9 along the layer, it is effective to define the diffraction efficiency (of the diffraction grating layer 3) which is minimum at the left end and gradually increases towards the right end, that is, increases along the transmission direction so as to cancel the light intensity profile of the transmitted beam 500. For example, the diffraction efficiency can be increased by increasing the height of the rectangular-wave shape.

In the seventh embodiment as shown in FIG. 9A, the diffraction efficiency of the diffraction grating layer 3 has a maximum value at the left end of the layer and increases towards the right end so as to cancel the light intensity profile of the transmitted beam 500. That is, as shown in FIG. 11, the height of the rectangular-wave shape is minimum at the left end and gradually increases towards the right end, thereby producing a diffraction-efficiency distribution for canceling the light intensity profile of the transmitted beam 500.

Figure 11:
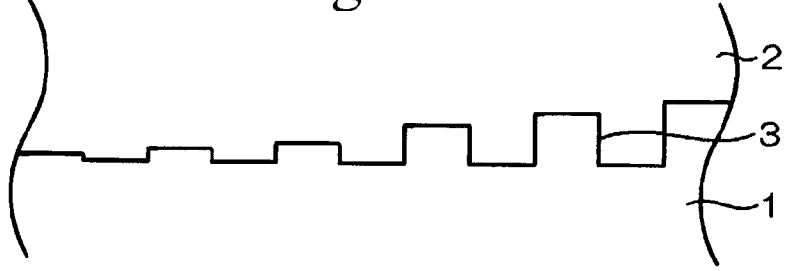
FIG. 11 is a sectional view showing an example of the structure of the diffraction grating layer of the optical waveguide in the seventh embodiment.

In the diffraction grating having a shape as shown in FIG. 11, with given height h and diffraction efficiency R of diffraction grating, an approximate relationship "R ∝ h²" is defined while the height h is small, where "∝" indicates a proportional relationship. It is necessary to determine the distribution of diffraction efficiency in consideration of the above approximate relationship. Accordingly, the light intensity profile of the diffracted beam 9 can be uniform along the layer.

Figure 12:
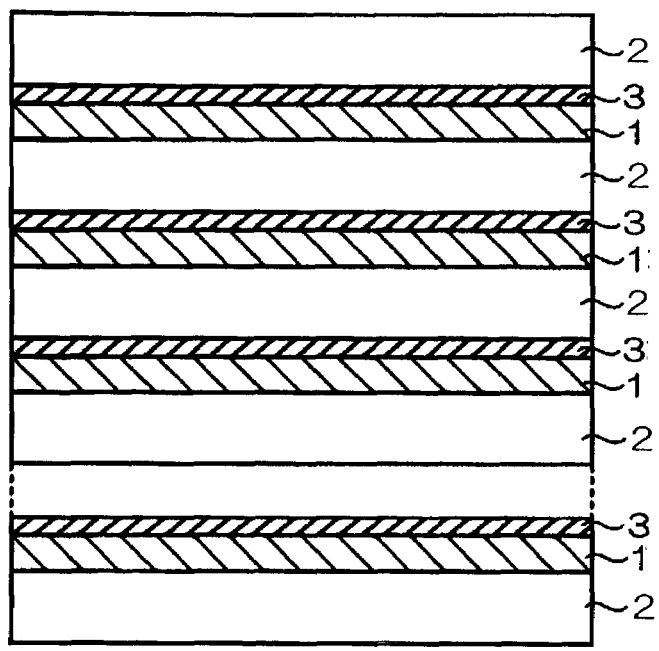
FIG. 12 is a sectional view showing an example of the multilayered optical waveguide in the seventh embodiment.

As shown in FIG. 12, the optical waveguide may consist of two or more core layers 1, 1, . . . 1, three or more cladding layers 2, 2, . . . 2 for holding each core layer 1 (between two cladding layers), and two or more diffraction grating layers 3, 3, . . . 3 each provided between a core layer 1 and an upper cladding layer 2. Also in this structure, the diffraction efficiency of each diffraction grating layer 3 can be maximum at the left end and gradually increase towards the right end by changing the height of a rectangular-wave shape of the diffraction grating layer 3. Accordingly, the diffraction efficiency of each of the diffraction grating layers 3, 3, . . . 3 cancels the light intensity profile of the transmitted beam 500 through the corresponding core layer 1, thereby obtaining a uniform light intensity profile of the diffracted beam 9 along the layer.

EIGHTH EMBODIMENT

Figure 13:
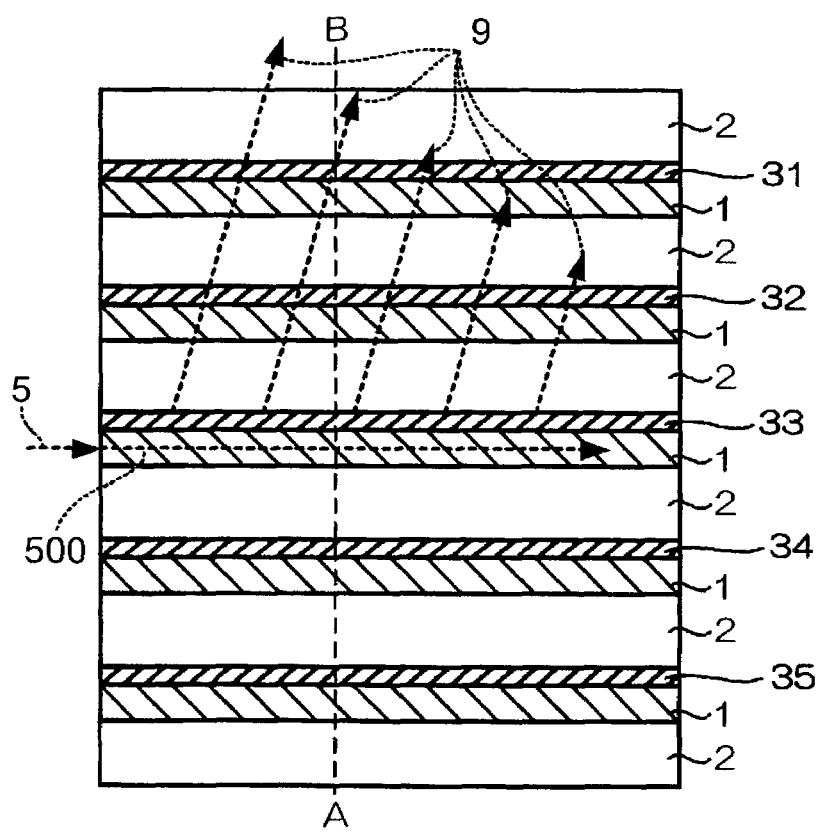
FIG. 13 is a sectional view showing the structure of an optical waveguide as the eighth embodiment of the present invention.

FIG. 13 is a sectional view showing the structure of an optical waveguide as the eighth embodiment of the present invention.

In FIG. 13, the optical waveguide has five core layers 1, 1, 1, 1, and 1, six cladding layers 2, 2, 2, 2, 2, and 2 for holding each core layer 1 (i.e., between two cladding layers), and five diffraction grating layers 31, 32, 33, 34, and 35 respectively provided at five boundaries between each core layer 1 and its upper cladding layer 2.

Figure 10:
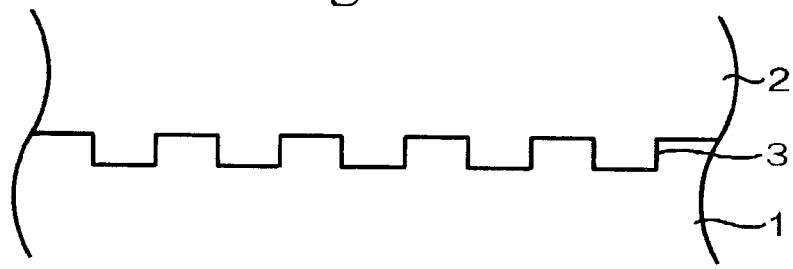
FIG. 10 is a sectional view showing an example of the structure of the diffraction grating layer.

The diffraction efficiency of the diffraction grating layers 31, 32, 33, 34, and 35 has a specific distribution along the thickness direction of the layers. More specifically, the diffraction efficiency gradually decreases along the emission direction of the diffracted beam. Each of the diffraction grating layers 31, 32, 33, 34, and 35 has a rectangular-wave shape (as shown in FIG. 10) which is formed at a corresponding boundary between the core layer 1 and its upper cladding layer 2.

When a reference beam 5 is input from the left end of the core layer 1, the transmitted beam 500 in the core layer 1 is diffracted by the relevant diffraction grating layer and a diffracted beam 9 is emitted towards the upper side of the optical waveguide. When passing through the optical waveguide, the diffracted beam 9 undergoes absorption; thus, the diffracted beam emitted from a lower diffraction grating layer undergoes greater absorption and is attenuated.

In order to equalize the light intensity of the diffracted beam emitted from each diffraction grating layer towards the outside of the optical waveguide, it is effective to assign a smaller diffraction efficiency to the diffraction grating layer at a higher position and to assign a larger diffraction efficiency to the diffraction grating layer at a lower position, so as to cancel the absorption. For example, as explained above, the diffraction efficiency can be increased by increasing the height of the rectangular-wave shape of the diffraction grating layer. The eighth embodiment shown in FIG. 13 employs this method for distributing the diffraction efficiency.

Figure 14:
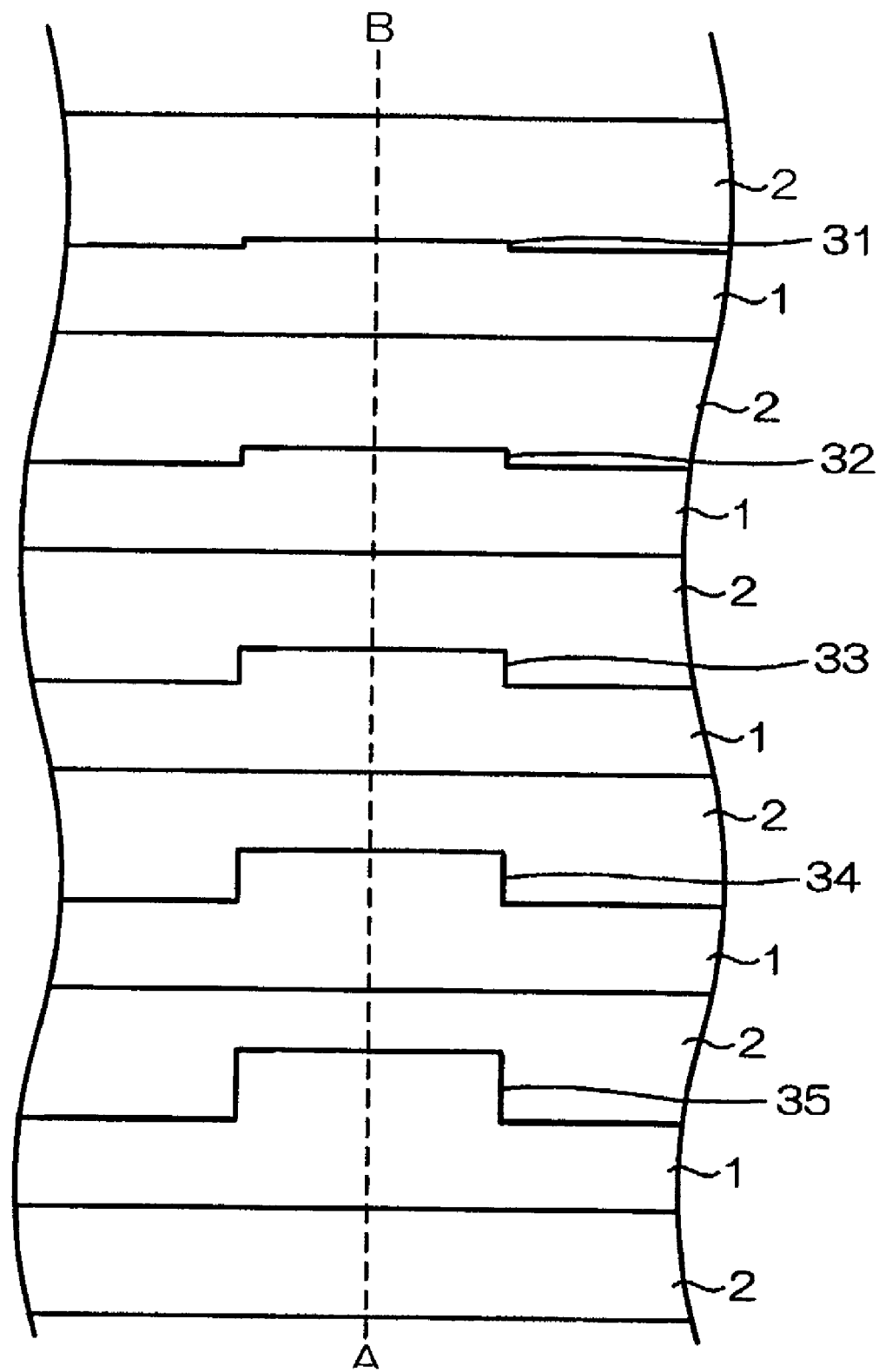
FIG. 14 is a sectional view showing an example of the structure of the diffraction grating layers in the vicinity of line A-B in FIG. 13 in the eighth embodiment.

That is, as shown in FIG. 14, the height of the rectangular-wave shape of a lower diffraction grating layer is higher and the height gradually decreases towards the upper side, so that the diffraction efficiency between the diffraction grating layers 31, 32, 33, 34, and 35 has a distribution so as to cancel the absorption while the diffracted beam passes through the optical waveguide. FIG. 14 shows only a portion of the diffraction grating layers 31, 32, 33, 34, and 35 which is in the vicinity of line A-B in FIG. 13.

Similarly, if the optical waveguide has a multilayered structure including any number of sets of stacked layers as shown in FIG. 12, a distribution for canceling the absorption (produced when the diffracted beam passes through the optical waveguide) is effectively provided to the diffraction efficiency of the diffraction grating layers 3 in the thickness direction of the layers (i.e., a distribution in which the diffraction efficiency gradually decreases towards the emission direction of the diffracted beam). Accordingly, the light intensity profile of the diffracted beam 9 in the thickness direction of the layers can be uniform.

In addition to the structure shown in FIG. 14, a structure as shown in FIG. 11 in which the diffraction efficiency of each diffraction grating layer has a distribution for canceling the light intensity profile of the transmitted beam 500 through the core layer 1 may be employed. In this case, the light intensity profile of the diffracted beam 9 can be uniform through the layer.

That is, the diffraction efficiency of each diffraction grating layer is defined in a manner such that (i) the light intensity profile of the transmitted beam 500 in the core layer 1 is canceled through the layer and (ii) the absorption produced when a beam passes through the optical waveguide in the vertical direction is canceled. Consequently, the diffracted beam emitted from each diffraction grating layer can have a uniform light intensity profile through the layer and have the same light intensity when being emitted to the outside of the optical waveguide.

Figure 15A:
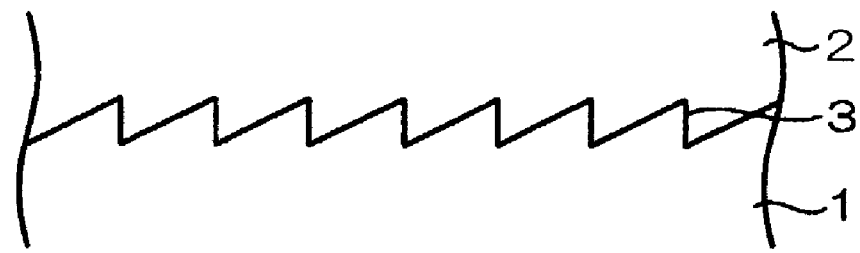
FIGS. 15A to 15C are sectional views showing other examples of the structure of the diffraction grating layer.
Figure 15B:
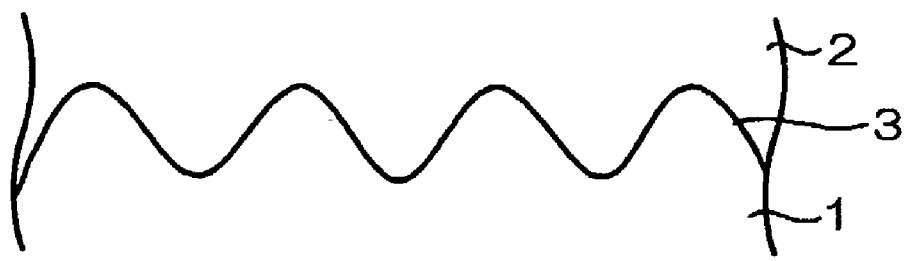

In the above seventh and eighth embodiments, the diffraction grating layers (3 and 31 to 35) have a rectangular-wave shape formed at a boundary of the core layer 1 and the cladding layer 2. However, the diffraction grating layer may have sawtooth-wave shaped grooves (see FIG. 15A) or sine-wave shaped grooves (see FIG. 15B), or may be formed by changing the refractive index (see FIG. 15C in which the portions having different hatched patterns have different refractive indexes). In either case, the diffraction efficiency can be changed by changing the height of grooves or the refractive index, and similar effects can be obtained.

Also in the above seventh and eighth embodiments, the diffraction grating layer is formed on the core layer 1; however, the diffraction grating layer may be formed (i) under the core layer 1, (ii) at either side over and under the core layer 1, or (iii) in the core layer 1. In either case, similar effects can be obtained.

In order to transmit the transmitted beam 500 through the core layer 1, the core layer 1 should be positioned between media which have a refractive index lower than that of the core layer 1. In the seventh and eighth embodiments, the refractive index of each cladding layer 2 is lower than that of the core layer 1. The cladding layer 2 has a function of maintaining and supporting the shape of the optical waveguide; thus, each core layer 1 is placed between the cladding layers 2. However, the necessary condition is that the core layer 1 be put between portions having a refractive index lower than that of the core layer 1 so as to transmit a light beam through the core layer 1.

Figure 9B:
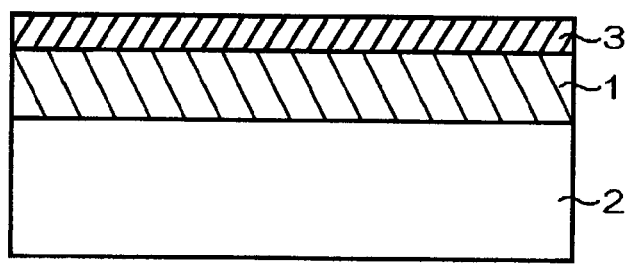

If the refractive index of free space is lower than that of the core layer 1 (i.e., the above-explained portions having a refractive index lower than that of the core layer 1 are air, vacuum, or the like), one or both of the uppermost or lowermost cladding layers 2 may be omitted, and also in such a structure, a light beam is transmitted through the core layer 1 which is placed between air or the like, thereby producing similar effects (refer to FIG. 9B corresponding to the seventh embodiment, in which the upper cladding layer 2 is omitted). If the refractive index of the storage layer 4 is lower than that of the core layer 1, then the storage layer 4 can function as the above-explained portions having a lower refractive index.

Generally, this principle can be applied to each core layer of an optical waveguide having any number of core layers or of a holographic medium having an optical waveguide and a storage layer (refer to other embodiments).

Also in the seventh and eighth embodiments, the light intensity of the diffracted beam is set accurately uniform or equal through the layer and in the thickness direction of the layers. However, according to the product specification or intended use, such an accurately uniform or equal state may be unnecessary, and a substantially uniform or equal state may be sufficient. Therefore, according to the present invention, the diffraction efficiency of the diffraction grating layers can be suitably distributed through each layer and also in the thickness direction of the layers, so that the light intensity of the diffracted beam can be approximately equal through each layer and in the thickness direction of the layers.

Instead of making the light intensity of the diffracted beam uniform or equal as explained above, in some application fields, a distribution may be intendedly and conveniently provided to the intensity of the diffracted beam. Therefore, according to the present invention, the diffraction efficiency of the diffraction grating layers can be suitable distributed through each layer and also in the thickness direction of the layers, so that the intensity of the diffracted beam can have a desired distribution.

As a concrete example, the area of the diffraction grating layer may not be the same as the area of the core layer, that is, a diffraction grating layer may be partially provided on the core layer or a plurality of diffraction grating layers may be provided on the core layer. In addition, it is not always necessary to provide a diffraction grating layer to every core layer, that is, the optical waveguide may include a core layer which does not have a diffraction grating layer.

An optical waveguide as shown in the seventh or eight embodiment and a storage layer may be flexibly combined so as to form a desired holographic medium. That is, a storage layer may be provided at one or both of the upper and lower sides of the optical waveguide, or may be placed between two optical waveguides. It is also possible to alternately stack a plurality of optical waveguides and a plurality of storage layers. Such a flexibility on design is basically applicable to any embodiment of the present invention.

NINTH EMBODIMENT

FIGS. 16A, 16B, 17A, and 17B are sectional views showing the structure of a holographic medium and for explaining the holographic storage and retrieval method as the ninth embodiment according to the present invention.

Figure 16A:
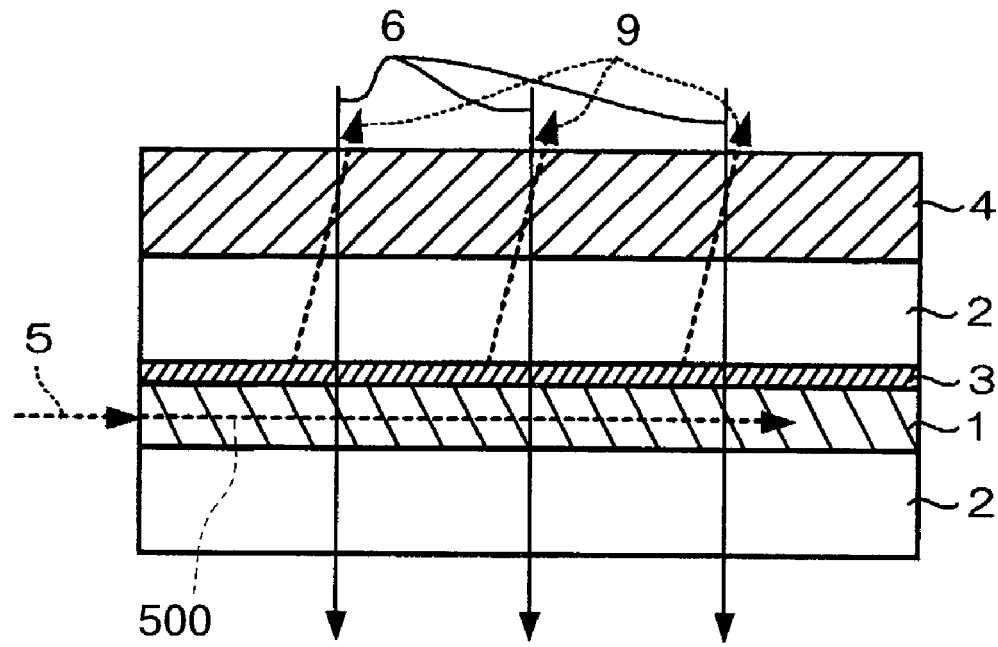
FIGS. 16A and 16B are sectional views showing the structure of a holographic medium and for explaining the holographic storage and retrieval method as the ninth embodiment of the present invention.

In FIG. 16A which corresponds to FIG. 1, a reference beam 5 is input from an end face of the core layer 1 and a transmitted beam 500 is diffracted by the diffraction grating layer 3, so that a diffracted beam 9 is emitted onto the storage layer 4. A hologram is stored in the storage layer 4 by the diffracted beam 9 and an object beam 6 incident from the upper side of the holographic medium.

Figure 16B:
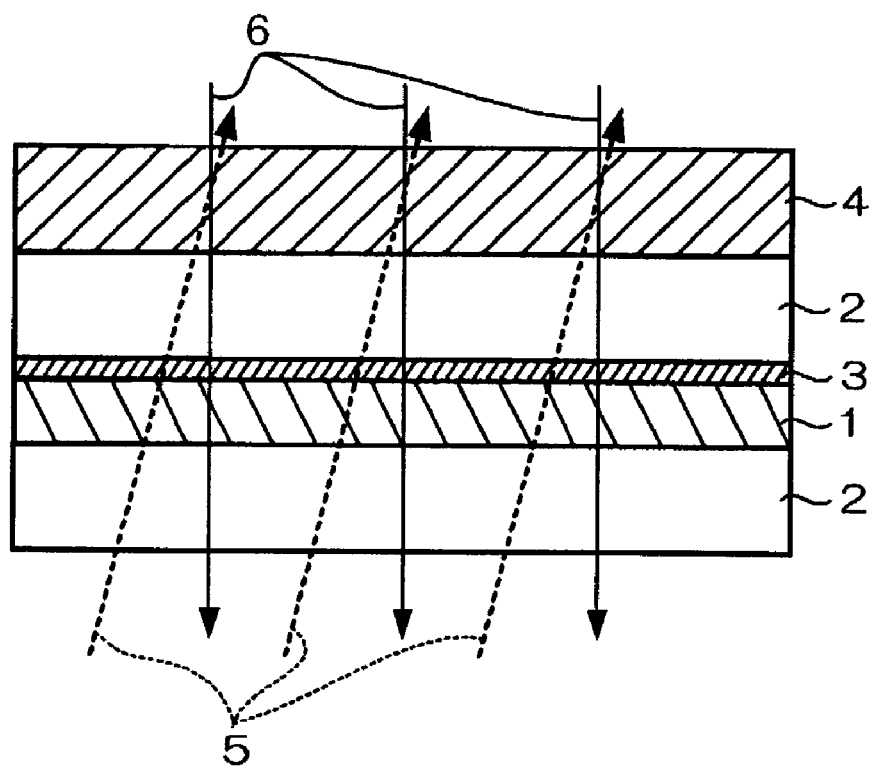

In FIG. 16B, holographic data storage in the storage layer 4 is performed using a reference beam 5 incident from the lower side of the holographic medium and an object beam 6 incident from the upper side of the holographic medium. The reference beam 5 may be incident from the upper side of the holographic medium.

Figure 17A:
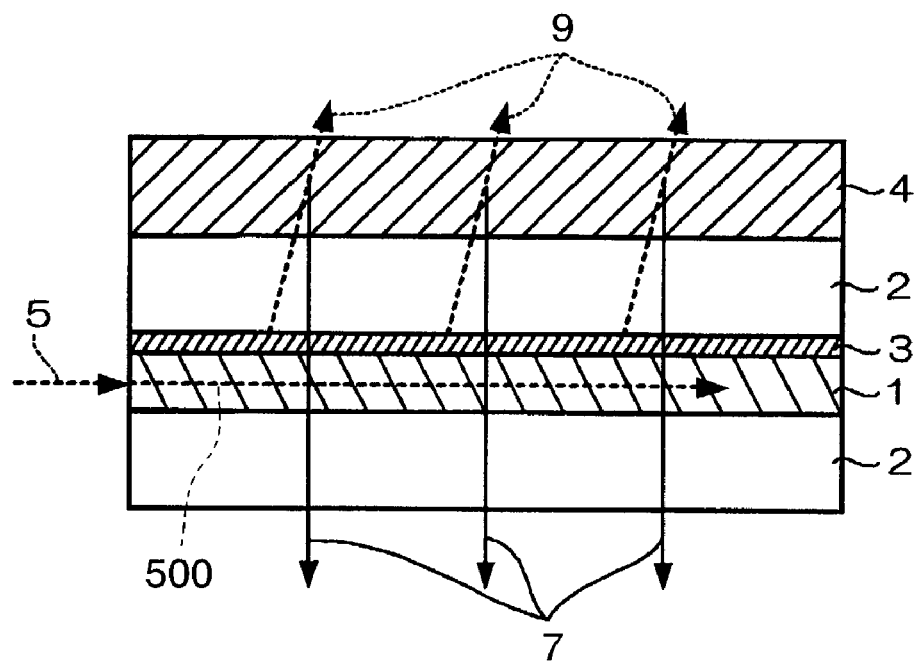
FIGS. 17A and 17B are also sectional views showing the structure of a holographic medium and for explaining the holographic storage and retrieval method as the ninth embodiment of the present invention.

In FIG. 17A which also corresponds to FIG. 1, a reference beam 5 is input from an end face of the core layer 1 and a transmitted beam 500 is diffracted by the diffraction grating layer 3, so that a diffracted beam 9 is emitted onto the storage layer 4. The holographic data stored in the storage layer 4 is retrieved by the diffracted beam 9.

Figure 17B:
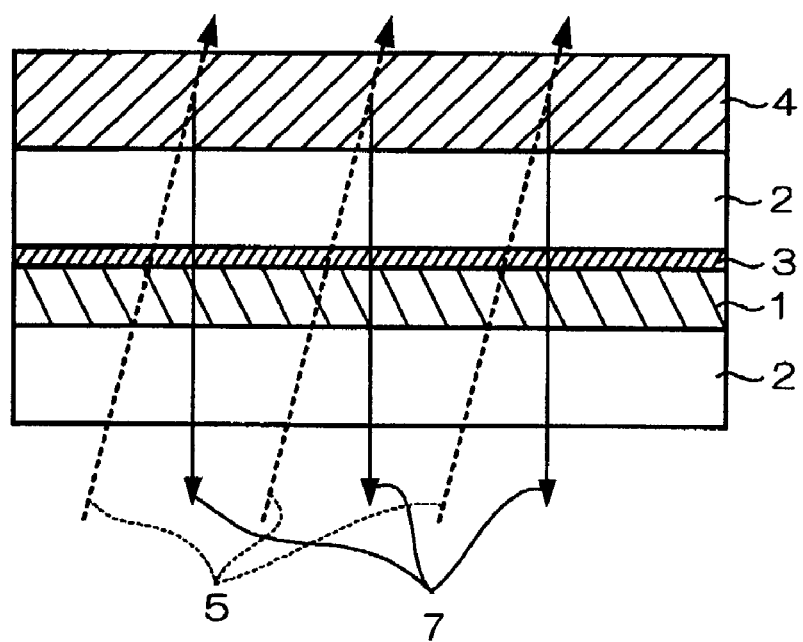

In FIG. 17B, the holographic data stored in the storage layer 4 is retrieved by a reference beam 5 incident from the lower side of the holographic medium. The reference beam 5 may be incident from the upper side of the holographic medium.

Four combinations of storage and retrieval processes are possible between the above four methods, that is, storage and retrieval processes shown by FIGS. 16A and 17A, by FIGS. 16A and 17B, by FIGS. 16B and 17A, and by FIGS. 16B and 17B are possible.

In the storage process, an interference fringe pattern formed by a diffracted beam 9 or a reference beam 5 and an object beam 6 is stored in the storage layer 4, so that holographic data storage is realized. In the retrieval process, a diffracted beam 9 or a reference beam 5 is diffracted by the interference fringe pattern stored in the storage layer 4 and a retrieved beam 7 is produced, so that holographic data retrieval is realized.

In order to store data in the storage layer 4 made of an optical storage material by using the object beam 6 and the reference beam 5, excitation of the optical storage material may be necessary by using an excitation beam having a wavelength different from those of the object and reference beams. In this case, similar to the reference beam 5, an excitation beam is input from an end face of a core layer 1 or from one of the upper and lower sides of the holographic medium, so that the excitation beam is incident onto the storage layer 4. A concrete example of the excitation beam will be shown in an embodiment explained below.

Figure 19:
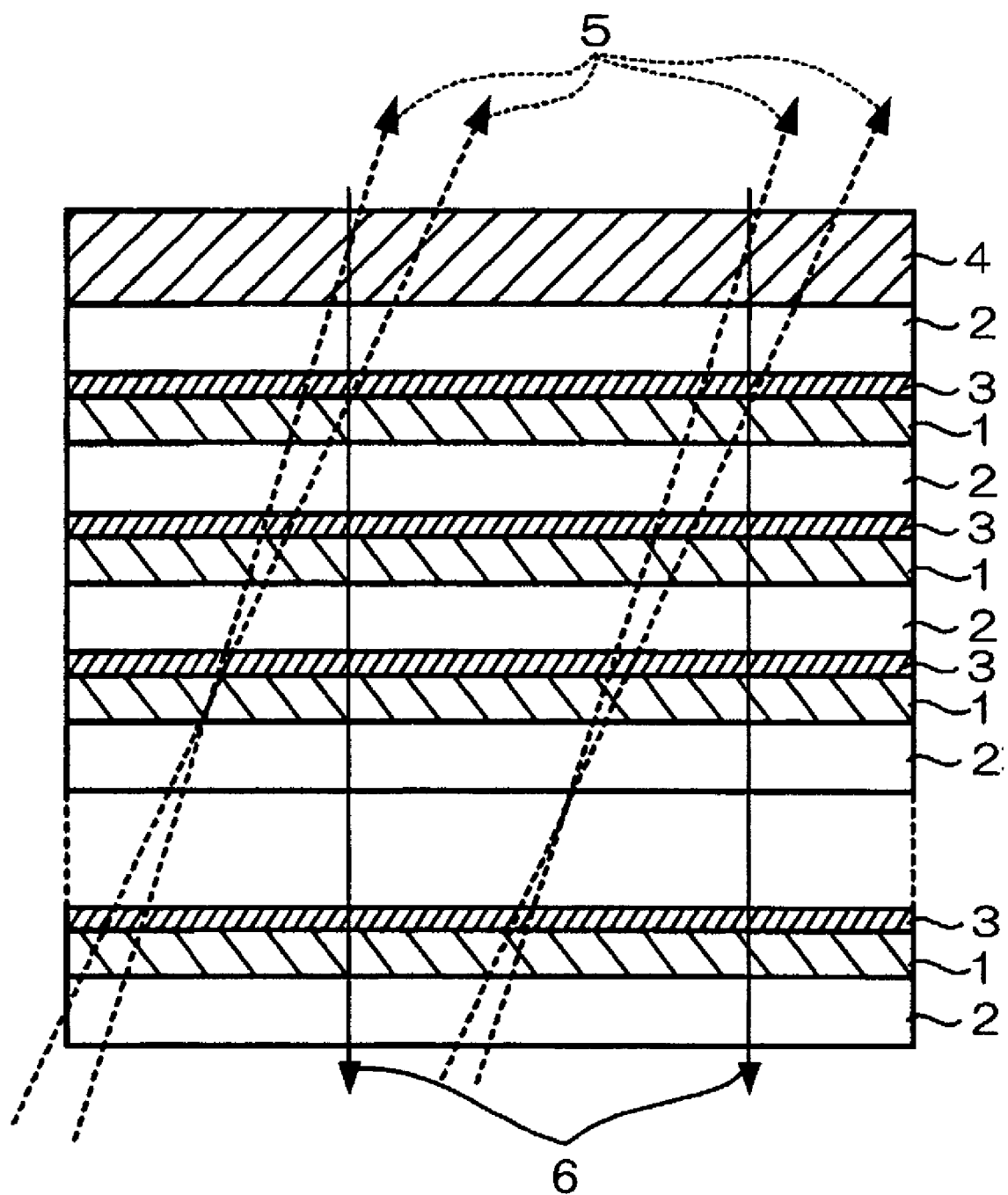
FIG. 19 is also a sectional view showing another example of the structure of a holographic medium to which the holographic storage and retrieval method of the ninth embodiment is applied.

If the holographic medium has a multilayered optical waveguide as shown in FIGS. 18 and 19, then similarly to FIGS. 16A and 16B, an interference fringe pattern is stored in the storage layer 4 by a diffracted beam 9 or a reference beam 5 incident from the lower side of the holographic medium and an object beam 6 incident from the upper side of the holographic medium, thereby realizing the holographic data storage. Additionally, similar to FIGS. 17A and 17B, a diffracted beam 9 or a reference beam 5 incident from the lower side of the holographic medium is diffracted by the interference fringe pattern stored in the storage layer 4, thereby producing a retrieved beam in the direction of the object beam 6 and thus realizing the holographic data retrieval.

With reference to the examples shown by FIGS. 18 and 19, multiple data storage in the present embodiment will be explained below.

In order to perform holographic data storage onto the storage layer 4 by using the diffracted beam 9 and the object beam 6 incident from the upper side of the holographic medium, as shown in FIG. 18, the diffracted beam 9 emitted from each diffraction grating layer 3 is a parallel beam and has a different incident angle to the storage layer 4. Accordingly, each interference fringe pattern formed by each diffracted beam and the object beam 6 is different and independently stored in the storage layer 4. That is, multiple data storage using multiple angles is realized by employing different diffracted beams 9 having different incident angles and the object beam 6, where the different diffracted beam 9 are obtained by selectively using core layers 1 (i.e., diffraction grating layers 3).

In the retrieval process, a reference beam 5 incident from the lower side of the holographic medium or a diffracted beam 9 is incident in a manner such that the incident angle is the same as the incident angle of one of the diffracted beams used in the storage process. Accordingly, only one of the multiple-stored data, which corresponds to the selected incident angle, can be retrieved. Here, the incident angle of the diffracted beam 9 in the retrieval process can be easily matched to that in the storage process, by inputting the reference beam 5 into the same core layer 1 used in the storage process.

In order to perform holographic data storage onto the storage layer 4 by using the reference beam 5 incident from the lower side of the holographic medium and the object beam 6 incident from the upper side of the holographic medium, as shown in FIG. 19, each reference beam 5 is a parallel beam and has a different incident angle to the storage layer 4. Accordingly, each interference fringe pattern formed by each reference beam 5 and the object beam 6 is different and independently stored in the storage layer 4. That is, multiple data storage using multiple angles is realized by employing different reference beams 5 having different incident angles and the object beam 6.

In the retrieval process, a reference beam 5 incident from the lower side of the holographic medium or a diffracted beam 9 is incident in a manner such that the incident angle is the same as the incident angle of one of the diffracted beams used in the storage process. Accordingly, only one of the multiple-stored data, which corresponds to the selected incident angle, can be retrieved. Here, the incident angle of the diffracted beam 9 in the retrieval process can be easily matched to that in the storage process, by inputting the reference beam 5 into a suitable core layer 1.

Figure 20A:
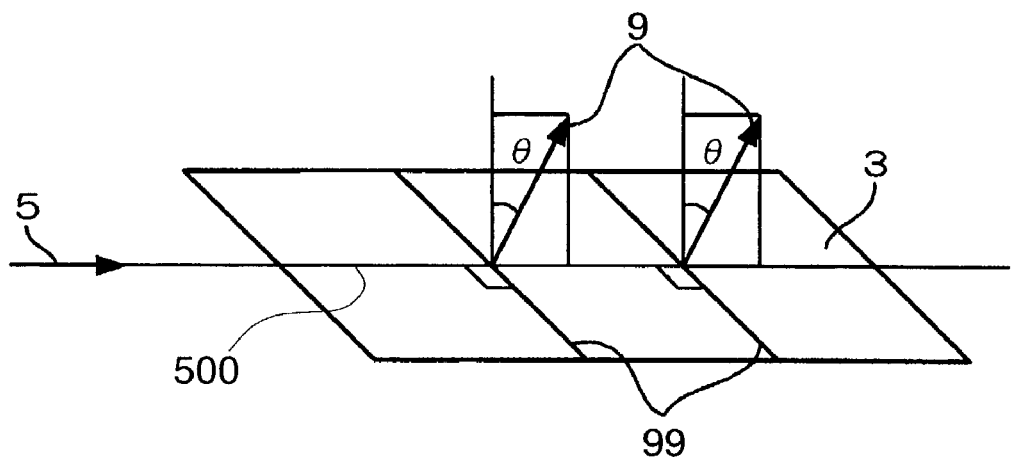
FIGS. 20A and 20B are diagrams for explaining the multiple data storage in the holographic storage and retrieval method of the ninth embodiment.
Figure 20B:
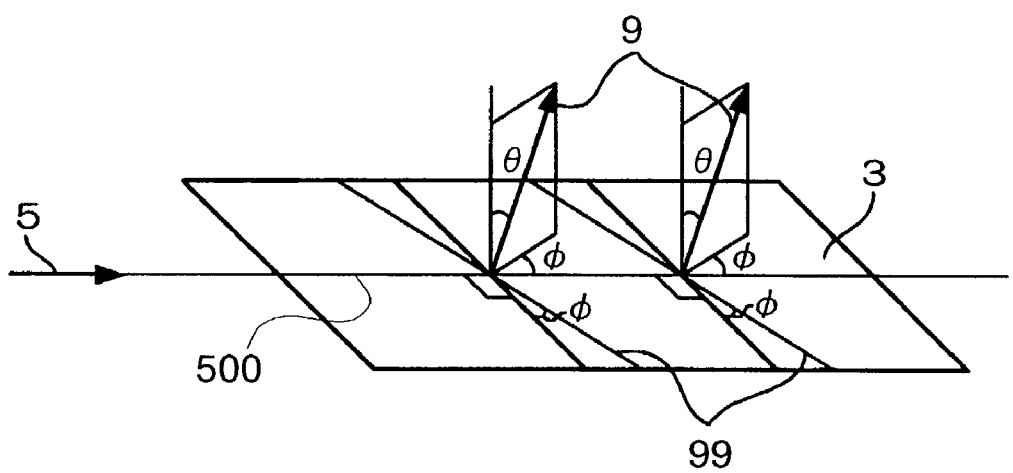

FIGS. 20A and 20B are diagrams for explaining the multiple data storage in the holographic storage and retrieval method of the present embodiment. These figures show one of the diffraction grating layers 3 in the structure shown in FIG. 18. As shown in FIG. 20A, in the diffraction grating layer 3, the transmitted beam 500 and the diffraction grating 99 are perpendicular to each other, and the diffracted beam 9 is diffracted at an angle θ in the plane which is perpendicular to the diffraction grating 99 and in which the transmitted beam 500 is transmitted. Here, the diffracted beam 9 is a parallel beam.

The above angle θ is changed for each of the diffraction grating layers 3, 3, 3, . . . 3 shown in FIG. 18 or 19, and the incident angle of the diffracted beam 9 is changed by selecting a suitable core layer 1, that is, a diffraction grating layer 3. Multiple data storage is performed using such a variable diffracted beam 9 and an object beam 6, so that the above-described multiple storage using multiple angles (in the θ direction) is realized.

Here, the incident angle of the diffracted beam 9 is indicted by θ, and angle θ is changed from θi to θj with a pitch of Δθ. Therefore, the incident angles θi, θi+Δθ, θi+2Δθ, θi+3Δθ, . . . θj are employed as multiple angles and these angles are called "$\theta_0$". When a reference beam 5 having a wavelength $\lambda_0$ is input and a diffracted beam 9 is incident at angle $\theta_0$ onto the storage layer 4, the following formula (1) is defined between $\lambda_0$, $\theta_0$, and a wavelength $\Lambda_0$ of the diffraction grating of the diffraction grating layer 3 (here, influence by the refractive index is disregarded as explained below):

$$\Lambda_0 = \lambda_0 / (1 - \sin \theta_0) \tag{1}$$

That is, in order to input a reference beam 5 having a wavelength $\lambda_0$ as shown in FIG. 18 and produce a diffracted beam 9 having an incident angle $\theta_0$, the diffraction grating layer 3 is designed in a manner such that the wavelength of the diffraction grating is $\Lambda_0$ which satisfies the formula (1).

Similarly, in order to input a reference beam 5 having a wavelength $\lambda_0$ as shown in FIG. 19 and couple the reference beam 5 with a diffraction grating layer 3 at an incident angle $\theta_0$, the diffraction grating layer 3 is designed in a manner such that the wavelength of the diffraction grating is $\Lambda_0$ which satisfies the formula (1). The diffraction grating layer 3 in the present embodiment is designed so as to satisfy the formula (1).

In addition, as explained above, the reference beam 5 and the object beam 6 have the same wavelength for sensitizing the storage layer 4. Here, the wavelength of the reference beam in the retrieval process is generally the same as that of the reference beam in the storage process. However, both the wavelengths may differ from each other according to the specification of the product. This condition is applicable to any embodiment according to the present invention.

As shown in FIG. 20B, angle φ, at which the diffracted beam 9 is projected on the plane of the diffraction grating layer 3, can be flexibly determined (i.e., changed) by suitable designing the structure and arrangement of the diffraction grating 99.

That is, if the angle between the transmitted beam 500 and the diffraction grating 99 is shifted by angle φ in comparison with the angle shown in FIG. 20A, then the diffracted beam 9 is emitted at angle θ in a plane whose direction is shifted from the transmission direction of the transmitted beam 500 by angle φ, as shown in FIG. 20B. The interference fringe pattern formed by such a diffracted beam 9 and an object beam 6 is independently stored in the storage layer 4, that is, interference fringe patterns corresponding to different values of angle φ are different from each other.

Therefore, different angles θ and φ are assigned to each of the diffraction grating layers 3, 3, 3, . . . 3 in FIG. 18, so that multiple data storage is realized by the diffracted beam 9 emitted from each of the diffraction grating layers 3, 3, 3, . . . 3 and the object beams 6. Accordingly, multiple data storage by changing angles θ and φ is realized by using the diffracted beam 9 which is changed to have a different incident angle θ and a different incident angle φ and the object beam 6, where the diffracted beam 9 can be changed by suitable selecting the core layer 1, that is, the diffraction grating layer 3.

In the retrieval process, the angles θ and φ of a reference beam 5 incident from the lower side of the holographic medium or a diffracted beam 9 are set equal to those of the diffracted beam 9 used in the storage process, so that one of the stored data, which corresponds to the above angles θ and φ can be retrieved. The angles θ and φ of the diffracted beam 9 in the retrieval process can be easily matched to those of the diffracted beam 9 in the storage process by inputting the reference beam 5 into the same core layer 1 selected in the storage process.

Similar to FIG. 19, when the reference beam 5 which is a parallel beam and the object beam 6 are used for storing data as a hologram in the storage layer 4, the interference fringe pattern formed by the reference beam 5 and the object beam 6 has a different pattern depending on the angles θ and φ and independently stored in the storage layer 4.

That is, the reference beam 5 which is changed by changing the incident angles θ and φ, and the object beam 6 can realize multiple data storage related to the angles θ and φ. In the retrieval process, the angles θ and φ of the reference beam incident from the lower side of the holographic medium or the diffracted beam 9 are set equal to those of the reference beam 5 used in the storage process, so that only one of the stored multiple data, which corresponds to the set angles θ and φ, can be retrieved. The angles θ and φ of the diffracted beam 9 in the retrieval process can be easily matched to those of the reference beam 5 in the storage process by inputting the reference beam 5 into a suitable core layer 1.

According to the present embodiment as explained above, the diffracted beam 9 can be used in one or both of the storage and retrieval processes in the multiple data storage using multiple angles, and as explained below, the angles θ and φ of the diffracted beam 9 (i.e., incident angles onto the storage layer 4) can be defined with high controllability when each diffraction grating layer 3 is formed. That is, the usage of the diffracted beam 9 can make the external control of the incident angle unnecessary in one or both of the storage and retrieval processes, so that the incident angle can be easily controlled.

As explained above, the storage layer 4 may be formed at one or both of the upper and lower sides of the optical waveguide, or may be spatially separated from the optical waveguide. Similar effects can be obtained in either case.

Additionally, a protection film may be provided for one or both of the upper and lower surfaces of the storage layer 4, or the storage layer 4 may be surrounded by a protection film. Similar effects can be obtained in either case.

The reference beam 5 may be incident from the upper or lower side, and similar effects can be obtained in either case. The object beam 6 may also be incident from the upper or lower side, and similar effects can be obtained in either case.

As explained in the first embodiment, the wavefront of the reference beam 5 or the diffracted beam 9 can be suitably defined, that is, in each diffraction grating layer 3, the area where the diffraction grating is formed may be divided into smaller areas, and in each smaller area, the shape, arrangement, direction, or the like of the diffraction grating may be different, so that diffracted beams having different characteristics can be simultaneously produced from the same diffraction grating layer 3. Therefore, numerous reference beams having different characteristics can be easily emitted by flexibly combining parallel, diverging, and converging beams, thereby easily storing various kinds of data.

Also as explained above, the diffraction grating layer 3 may have grooves having a rectangular-wave shape (see FIG. 10), and the diffraction efficiency can be increased by increasing the height of the rectangular wave. In addition, the angle θ of the diffracted beam can be easily changed and determined with high controllability by changing the wavelength of the rectangular wave, and the angle φ of the diffracted beam can also be easily changed and determined with high controllability by changing the angle φ of the diffraction grating (refer to formula (1)).

Figure 15C:
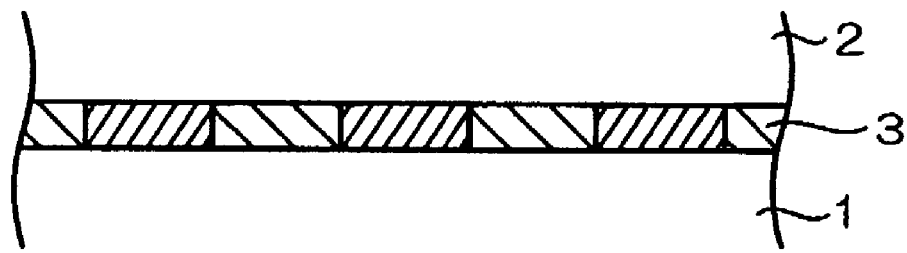

The grooves having a sawtooth-wave shape (see FIG. 15A) or a sine-wave shape (see FIG. 15B) may be employed for the diffraction grating layer 3. In addition, the diffraction grating layer 3 may be formed by alternately changing the refractive index as shown in FIG. 15C. In either case, similar effects can be obtained.

In the present embodiment, the effect of difference of the refractive index of each layer is not considered. That is, strictly, when the reference beam 5, the diffracted beam 9, or the like passes through each layer, the beam is refracted and the values of the angles θ and φ are changed. However, regardless of whether the effect of the refractive index is considered, the substantial features of the present invention are not changed and similar effects can be obtained.

TENTH EMBODIMENT

Figure 21:
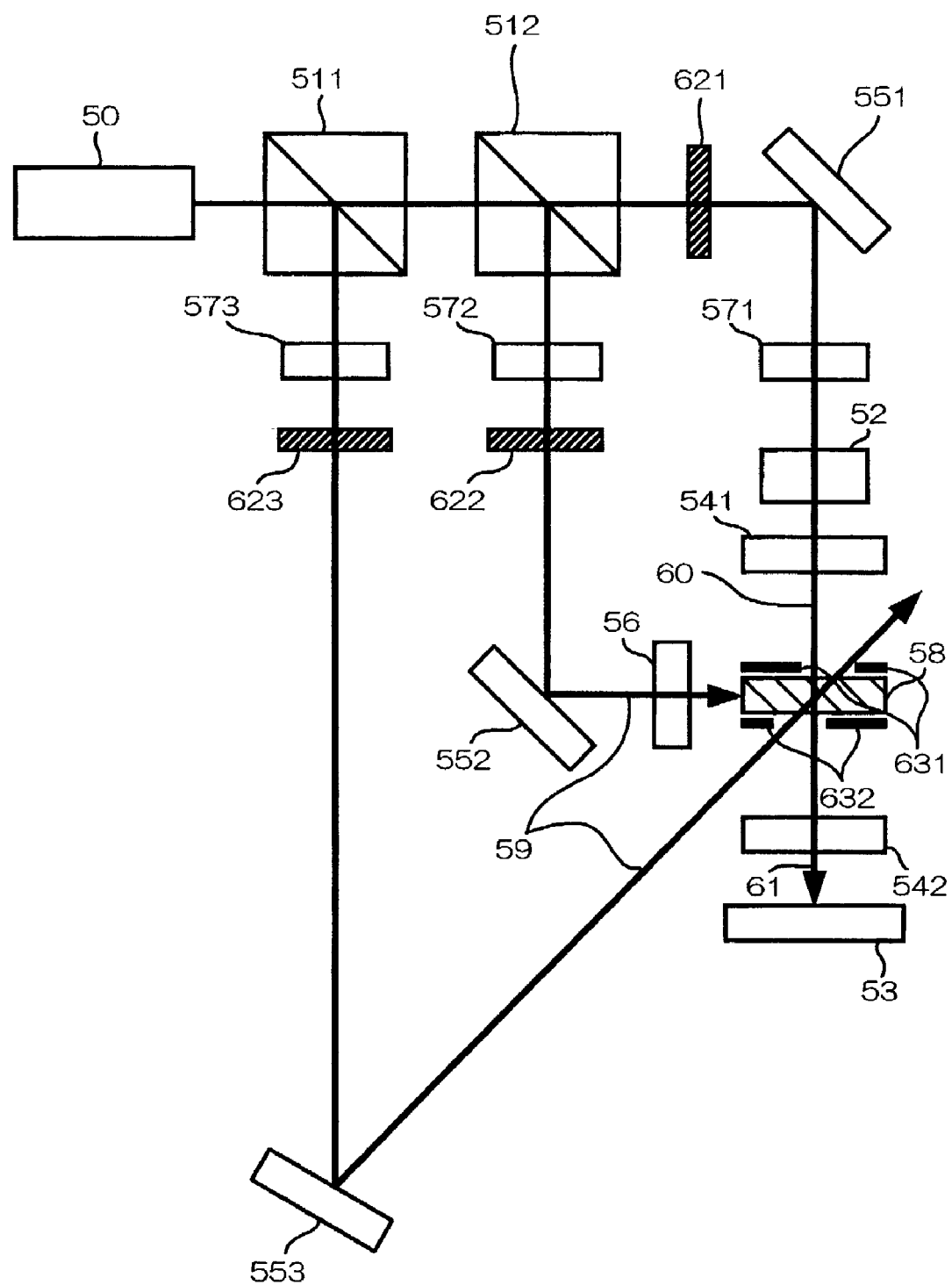
FIG. 21 is a diagram showing the structure of a holographic storage and retrieval system as the tenth embodiment of the present invention.

FIG. 21 is a diagram showing the structure of a holographic storage and retrieval system as the tenth embodiment of the present invention. In each embodiment explained below, the holographic storage and retrieval system may be divided into a storage system having a storage function and a retrieval system having a retrieval function.

The holographic storage and retrieval system comprises a light source 50, two beam splitters 511 and 512, a spatial optical modulator 52, a photodetector 53, two imaging devices 541 and 542, three reflectors 551, 552, and 553, a condenser 56, three polarization controllers 571, 572, and 573, three beam shutters 621, 622, and 623, and two spatial optical selectors 631 and 632.

The light source 50 is typically a light source for emitting a light beam such as laser.

Each of the beam splitters 511 and 512 includes a half mirror, any kind of beam splitter, or the like and is provided for splitting a beam into two beams.

The spatial optical modulator 52 includes an LCD (liquid crystal display) element, a DMD (digital micromirror device), or the like and is provided for displaying data to be stored.

The photodetector 53 includes a CCD, a CMOS, or the like and is provided for detecting a retrieved beam 61. In order to image the retrieved beam 61 on the photodetector 53 with less distortion, it is effective to make the retrieved beam 61 incident on the photodetector 53 within an angle range of ±45° with respect to the direction perpendicular to the detection plane of the photodetector 53.

The photodetector 53 is not used in the storage process. However, in order to image the retrieved beam 61 on the photodetector 53 with less distortion in the retrieval process, an object beam 60 is also adjusted so as to be imaged on the position of the photodetector 53 with less distortion in the storage process. Therefore, it is also effective to make the object beam 60 incident on the photodetector 53 within an angle range of ±45° with respect to the direction perpendicular to the detection plane of the photodetector 53.

Each of the imaging devices 541 and 542 includes a single lens, a composite lens or the like and is provided for imaging the object beam 60 and the retrieved beam 61 on the photodetector 53.

Each of the reflectors 551, 552, and 553 includes a mirror or the like for reflecting a light beam.

The condenser 56 has a cylindrical lens or the like and is provided for focusing (or condensing) a reference beam 59 so as to input the reference beam 59 into a specific core layer of the optical waveguide.

Each of the polarization controllers 571, 572, and 573 has a half-wave plate or the like and is provided for rotating the polarization plane (i.e., the plane of polarization) of a light beam.

Each of the beam shutters 621, 622, and 623 includes a shutter device or the like and has two states of "open" and "closed". In the "open" state, light is transmitted through the beam shutter, while in the "closed" state, light is blocked by the beam shutter.

Each of the spatial optical selectors 631 and 632 is provided for making the reference beam 59 and the object beam 60 incident only on a desired area of the holographic medium 58, or inputting only a desired retrieved beam into the photodetector 53.

A light beam emitted from the light source 50 is transmitted through the beam splitters 511 and 512 and is reflected by the reflector 551. The polarization plane of the reflected beam is matched to that of the reference beam 59 by the polarization controller 571 and this beam then passes through the spatial optical modulator 52 so as to be transformed into an object beam 60 which carries data to be stored. The object beam 60 is transmitted through the imaging device 541 and incident on the holographic medium 58.

On the other hand, the beam which is transmitted through the beam splitter 511 and is reflected by the beam splitter 512 towards a direction rotated by 90° is input into the polarization controller 572, where the polarization plane of the reflected beam is matched to that of the object beam 60, and this beam is then reflected by the reflector 552. The reflected beam is then incident as a reference beam 59 via the condenser 56 onto a specific core layer of the holographic medium 58.

The beam reflected by the beam splitter 511 towards a direction rotated by 90° is input into the polarization controller 573 which matches the polarization plane of this beam to that of the object beam 60. This beam is then reflected by the reflector 553 and incident on the holographic medium 58 as a reference beam 59. One of the reference beams 59 is selected by opening/closing operation of the beam shutters 622 and 623.

Below, the operations corresponding to the storage and retrieval methods as shown in FIGS. 16A, 16B, 17A, and 17B will be explained.

In the storage method corresponding to FIG. 16A, the beam shutter 621 is set to the "open" state, the beam shutter 622 is set to the "open" state, and the beam shutter 623 is set to the "closed" state, so that the reference beam 59 is input from an end face of a core layer of the holographic medium 58, and the object beam 60 is incident from the upper side of the holographic medium 58.

In the storage method corresponding to FIG. 16B, the beam shutter 621 is set to the "open" state, the beam shutter 622 is set to the "closed" state, and the beam shutter 623 is set to the "open" state, so that the reference beam 59 is incident from the lower side of the holographic medium 58, and the object beam 60 is incident from the upper side of the holographic medium 58.

In the retrieval method corresponding to FIG. 17A, the beam shutter 621 is set to the "closed" state, the beam shutter 622 is set to the "open" state, and the beam shutter 623 is set to the "closed" state, so that the reference beam 59 is input from an end face of the core layer of the holographic medium 58.

In the retrieval method corresponding to FIG. 17B, the beam shutter 621 is set to the "closed" state, the beam shutter 622 is set to the "closed" state, and the beam shutter 623 is set to the "open" state, so that the reference beam 59 is incident from the lower side of the holographic medium 58.

The incident direction of the reference beam 59 and the object beam 60 to the holographic medium 58, that is, the incident direction from the upper or lower side of the holographic medium 58, can be easily switched by turning the holographic medium 58 upside down.

The specific core layer of the holographic medium 58 can be easily selected by rotating and/or shifting at least one of the reflector 552, the condenser 56, and the holographic medium 58. If the reference beam 59 is incident from the lower side of the holographic medium 58, the above-explained angles θ and φ can be controlled by rotating and/or shifting at least one of the reflector 553 and the holographic medium 58.

According to the holographic storage and retrieval system of the present embodiment, any of the above-explained holographic storage and retrieval methods can be performed.

Figure 22:
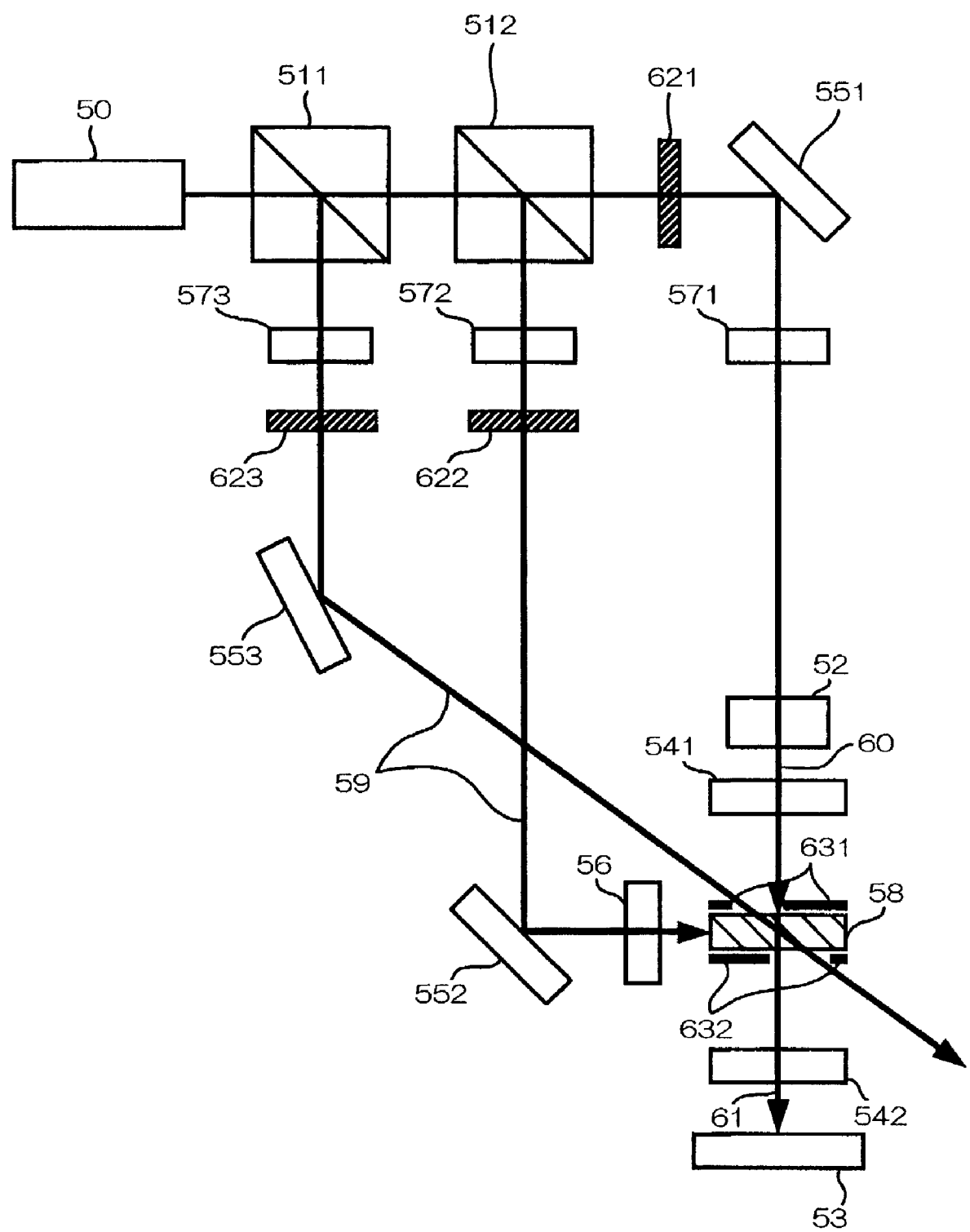
FIG. 22 is a diagram showing another structure of the holographic storage and retrieval system in the tenth embodiment.

FIG. 22 is a diagram showing another structure of the holographic storage and retrieval system. In the above-explained structure shown in FIG. 21, the reference beam 59 is incident on the holographic medium 58 from the upper or lower side of the medium, and the object beam 60 is incident from the opposite side. However, in FIG. 22, the reference beam 59 and the object beam 60 are incident on the holographic medium 58 from the same side (i.e., one of the upper or lower side).

The system shown in FIG. 22 can also be used for performing any of the above-explained holographic storage and retrieval methods and thus can produce effects similar to those obtained by the system as shown in FIG. 21.

In the structure shown in FIG. 21, the reference beam 59 output from the beam splitter 511 may be incident on an end face of a specific core layer of the holographic medium 58, and the reference beam 59 output from the beam splitter 512 may be incident from the lower side of the holographic medium 58. Similarly, in the structure in FIG. 22, the reference beam 59 output from the beam splitter 511 may be incident on an end face of a specific core layer of the holographic medium 58, and the reference beam 59 output from the beam splitter 512 may be incident from the upper side of the holographic medium 58.

FIGS. 23A, 23B, 23C, and 23D are diagrams showing examples of the structure of the imaging device in the holographic storage and retrieval system in the present embodiment.

Figure 23A:
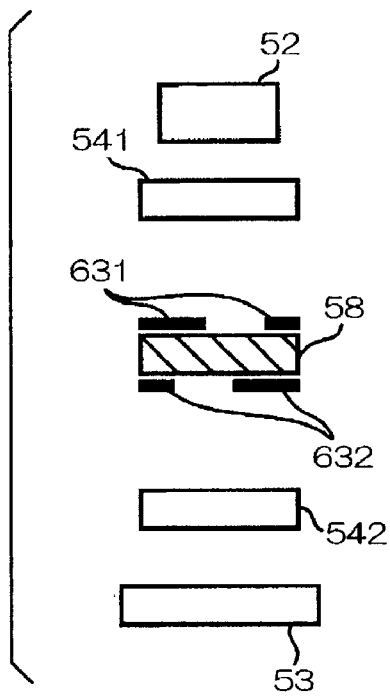
FIGS. 23A to 23D are diagrams showing examples of the structure of the imaging device in the holographic storage and retrieval system in the tenth embodiment.
Figure 23B:
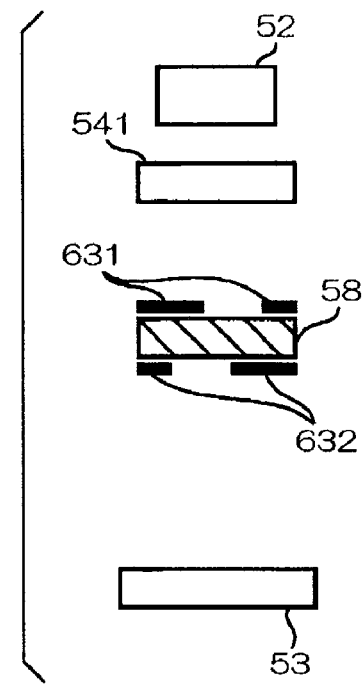
Figure 23C:
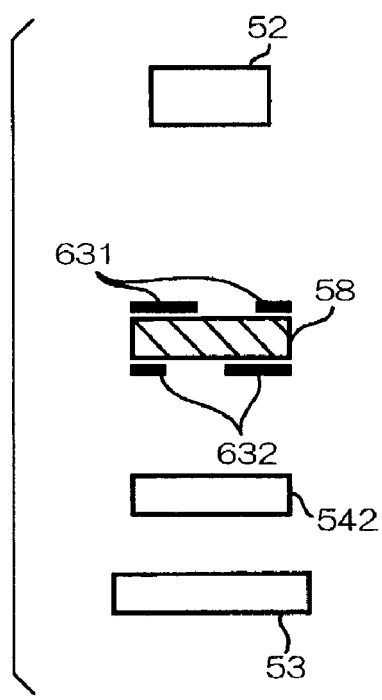
Figure 23D:
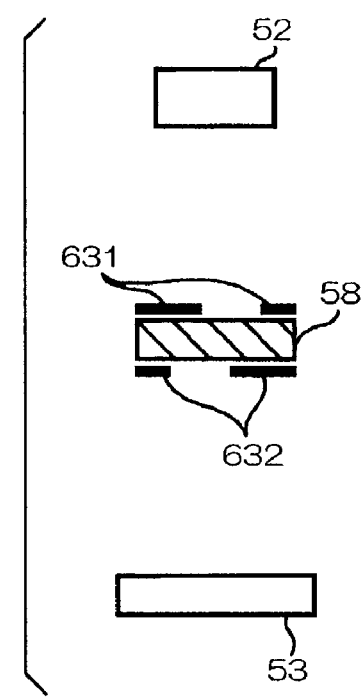

In FIG. 23A, the holographic medium 58 is positioned between the imaging devices 541 and 542. In FIG. 23B, the imaging device 541 is positioned between the holographic medium 58 and the spatial optical modulator 52. In FIG. 23C, the imaging device 542 is positioned between the holographic medium 58 and the photodetector 53. In FIG. 23D, no imaging device is provided at either side of the holographic medium 58.

In either case, the holographic storage and retrieval method of the present embodiment can be performed if the object beam 60 and the retrieved beam 61 can form an image on the photodetector 53, and similar effects can be obtained.

In the above embodiment, the spatial optical selectors 631 and 632 are respectively provided at both sides (i.e., upper and lower sides) of the holographic medium 58. However, only one spatial optical selector may be provided at one of the sides of the holographic medium 58, or no spatial optical selector may be provided, so as to perform the holographic storage and retrieval method of the present embodiment. In either case, similar effects can be obtained.

Also in the above embodiment, in addition to the above optical components, a beam expander for expanding the diameter of a light beam, a collimator for transforming a light beam to have a plane wave, or an optical attenuator (or filter) for attenuating the light intensity may be used, and in this case, similar effects can be obtained.

In the holographic storage and retrieval system of the present embodiment, only the optical waveguide portion of the medium may be placed in advance at a position where the holographic medium 58 should be placed, and the storage layer portion may be replaced with another storage layer portion for each storage and retrieval process. In this case, a conventional volume hologram or the like can be used as a storage layer 4; thus, the holographic storage and retrieval system of the present embodiment can be applied to the holographic storage and retrieval operation which uses a conventional holographic medium and which is highly accurate and has improved controllability.

Such a flexible combination arrangement between a storage layer and an optical waveguide is also applicable to any holographic medium according to the present invention. That is, the following methods are possible:

(1) The storage layer and the optical waveguide have an integrated structure, and this integrated structure is attached to the storage and retrieval system;
(2) The storage layer and the optical waveguide are originally separated, and these portions are stacked on each other and then attached to the storage and retrieval system; and
(3) The storage layer and the optical waveguide are originally separated, and the optical waveguide is attached to the storage and retrieval system in advance, while the storage layer is attached at the operation so that the optical waveguide and the storage layer are stacked on each other.

In the storage and retrieval processes, a space may be provided between the optical waveguide and the storage layer.

ELEVENTH EMBODIMENT

Figure 24:
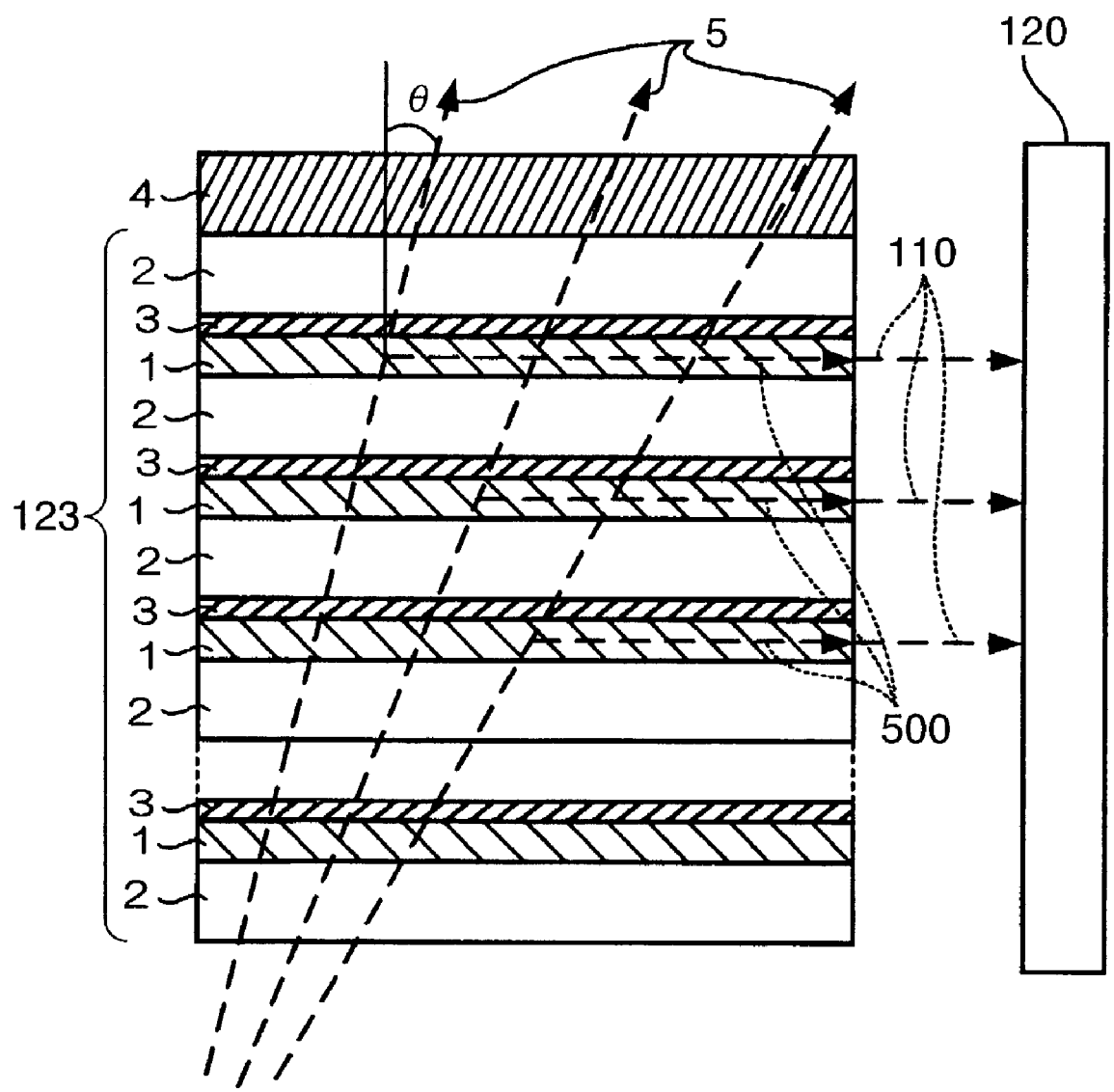
FIG. 24 is a diagram for explaining the incident angle control method as the eleventh embodiment of the present invention.

FIG. 24 is a diagram for explaining the incident angle control method as the eleventh embodiment of the present invention.

In FIG. 24, the diffraction grating layer 3 is designed so that a reference beam 5 incident at the above-explained angle $\theta_0$ is diffracted and emitted at a specific angle, and each value of angle $\theta_0$ is assigned to each of the diffraction grating layers 3, 3, . . . 3 in a one-to-one corresponding relationship.

That is, when the reference beam 5 is incident at any angle $\theta_0$, the reference beam 5 is coupled with any one of the diffraction grating layers 3, 3, . . . 3 which corresponds to this angle $\theta_0$ and is transmitted as a transmitted beam 500 through the core layer 1 for which said one of the diffraction grating layers is provided. Therefore, the transmitted beam 500 is output as an emitted beam 110 only from an end face of this core layer 1.

Either or both of the reference beam 5 and the optical waveguide 123 (see FIG. 24) may be shifted and/or rotated so as to output the emitted beam 110 from the target core layer 1. Accordingly, the actual incident angle $\theta$ can be matched to a target incident angle $\theta_0$ with high accuracy.

Figure 25:
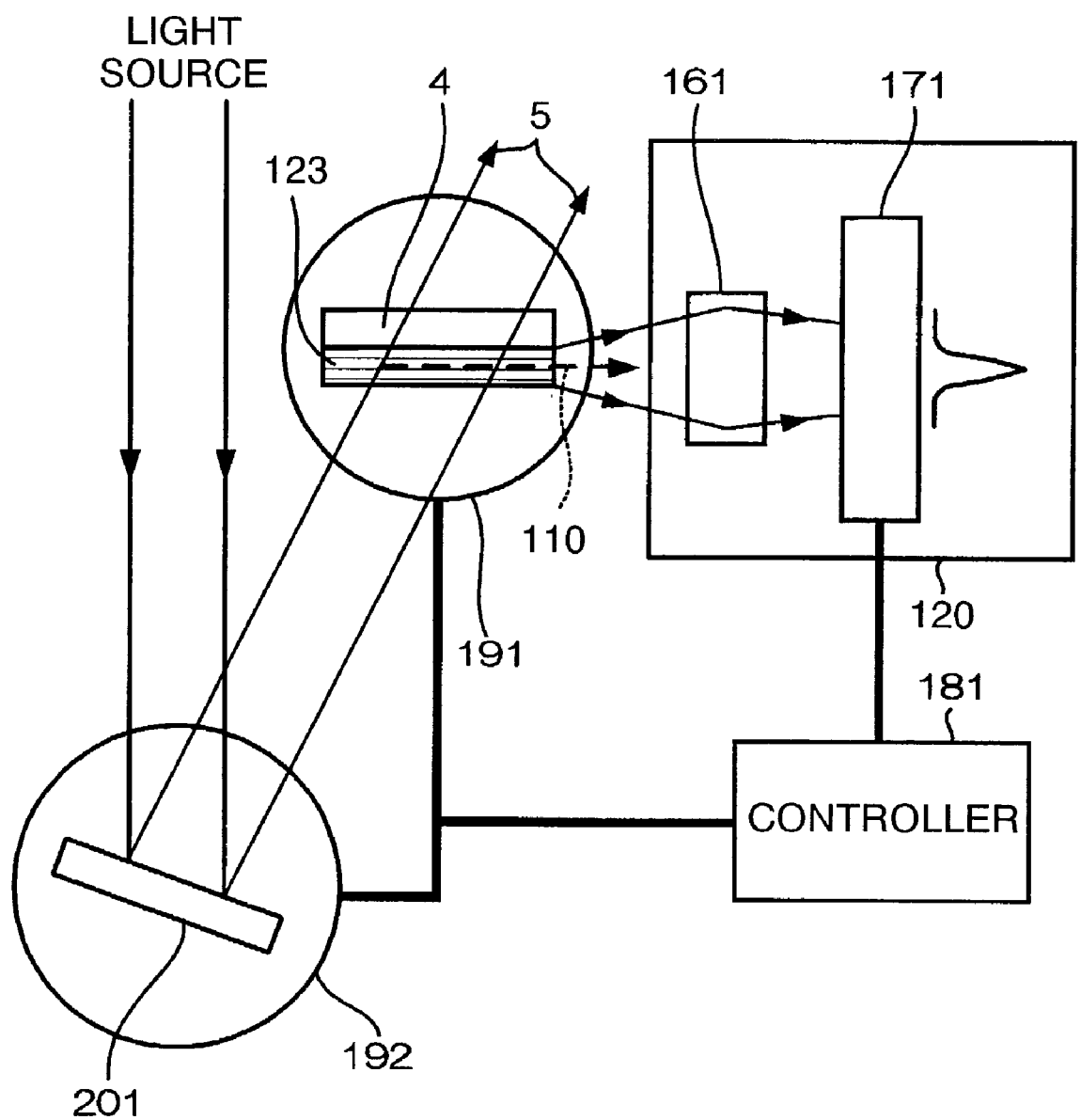
FIG. 25 is a diagram for explaining the incident angle control method of the eleventh embodiment in detail.

The core layer 1 from which the emitted beam 110 is output is detected using a photodetector 120. The photodetector 120 includes a lens or the like, and as shown in FIG. 25 and as explained below, the photodetector 120 can be made using a combination of a condenser 160 for focusing (or condensing) a light beam and an image pick-up device 171 which includes a CCD, a CMOS, or the like and which has an image pick-up function. The position of this photodetector 120 is set in a maimer such that the relevant end faces of the optical waveguide 123 are imaged on the image pick-up device 171, so that the core layer 1 from which the emitted beam 110 is output can be detected as explained below.

FIG. 25 is a diagram for explaining the incident angle control method of the present embodiment in detail. A light beam from a light source is reflected by the reflector 201, and the reflected beam is incident as a reference beam 5 on the optical waveguide 123 from the lower side of the optical waveguide. A shift and rotation mechanism 192 on which the reflector 201 is placed can shift and/or rotate the direction of the reference beam 5. In addition, a shift and rotation mechanism 191 on which the optical waveguide 123 is placed can shift and/or rotate the optical waveguide 123.

In an initial state in which the incident angle $\theta$ does not coincide with any defined incident angle $\theta_0$, no emitted beam 110 is output from any core layer 1. If either or both of the shift and rotation mechanisms 191 and 192 is driven using a controller 181, then the incident angle $\theta$ coincides with any incident angle $\theta_0$, and an emitted beam 110 is output from the core layer 1 for which a diffraction grating layer 3 corresponding to this angle $\theta_0$ is provided.

The end faces of the optical waveguide 123 are imaged on the image pick-up device 171 of the photodetector 120; thus, a bright point is imaged at a position on the image pick-up device 171, which (i.e., said position) corresponds to the core layer 1 from which the emitted beam 110 is output. If once the incident angle $\theta$ coincides with any incident angle $\theta_0$, then either or both of the shift and rotation mechanisms 191 and 192 are driven by the controller 181 so as to shift and scan the incident angle $\theta$ by a pitch of $\Delta\theta$, so that the incident angle $\theta$ can be made to coincide with any target incident angle $\theta_0$.

Here, it is assumed that the above-explained incident angles θi, θi+Δθ, θi+2Δθ, . . . θj are respectively assigned to the uppermost core layer 1, the second core layer 1 (counted from the uppermost layer), the third core layer 1, . . . the lowermost core layer 1. When either or both of the shift and rotation mechanisms 191 and 192 are driven by the controller 181 so as to scan the incident angle θ in a manner such that the incident angle θ is decreasing, the bright point on the image pick-up device 171 shifts while blinking, and the bright point at the last position corresponds to the uppermost core layer 1.

After that, when one or both of the shift and rotation mechanisms 191 and 192 are driven by the controller 181 so as to scan the incident angle θ in a manner such that the incident angle θ is increasing, then as for all the incident angles $θ_0$, the positions on the image pick-up device 171, where the bright points appear, respectively correspond to the core layers 1 in a one-to-one relationship. Therefore, after this process, when a position where a bright point appears is detected, the core layer 1 from which the emitted beam 110 is output can be detected.

Therefore, the relationship between the position of each bright point on the image pick-up device 171 and each core layer 1 is first determined, and then one or both of the shift and rotation mechanisms 191 and 192 are driven by the controller 181 so as to scan the incident angle θ while the core layer 1 from which an emitted beam 110 is output is monitored by using the image pick-up device 171. Accordingly, the incident angle θ can be matched to a target incident angle $θ_0$. In addition, feed back control of one or both of the shift and rotation mechanisms 191 and 192 by using the controller 181 can be performed so as to maximize the brightness of each bright point. According to such control, the incident angle θ can be maintained at a specific incident angles $θ_0$.

In another method for determining the relationship between each bright point on the image pick-up device 171 and each core layer 1, image recognition for an image of the end faces of the optical waveguide 123 on the image pick-up device 171 is performed so as to detect a brighter core layer 1.

If the optical waveguide 123 does not relatively move with respect to the image pick-up device 171, the end faces of the optical waveguide 123 are always imaged on the same positions on the image pick-up device 171. In this case, the relationship between each bright point on the image pick-up device 171 and each core layer 1 can be determined in advance.

In either method, similar effects can be obtained.

In addition, the following two methods are possible:
(i) for all the incident angles $θ_0$, the relationship between each bright point on the image pick-up device 171 and each core layer 1 is determined so as to control the incident angle of the reference beam 5, and
(ii) for only a specific incident angle $θ_0$, the relationship between the bright point on the image pick-up device 171 and the relevant core layer 1 is determined, and for the other incident angle $θ_0$, the above specific incident angle $θ_0$ is used as a reference, and one or both of the reference beam 5 and the optical waveguide 123 are shifted and/or rotated so as to mechanically shift the incident angle θ by, for example, an integer multiple of Δθ, thereby controlling the incident angle of the reference beam 5.

In either case, the incident angle of the reference beam 5 can be highly accurately controlled.

In addition, the structure of FIG. 24 has a storage layer 4; however, the present method of controlling the incident angle can also be applied to an optical waveguide itself which has no storage layer. This condition is also applicable to each embodiment explained below.

11-1 First Variation

Figure 26:
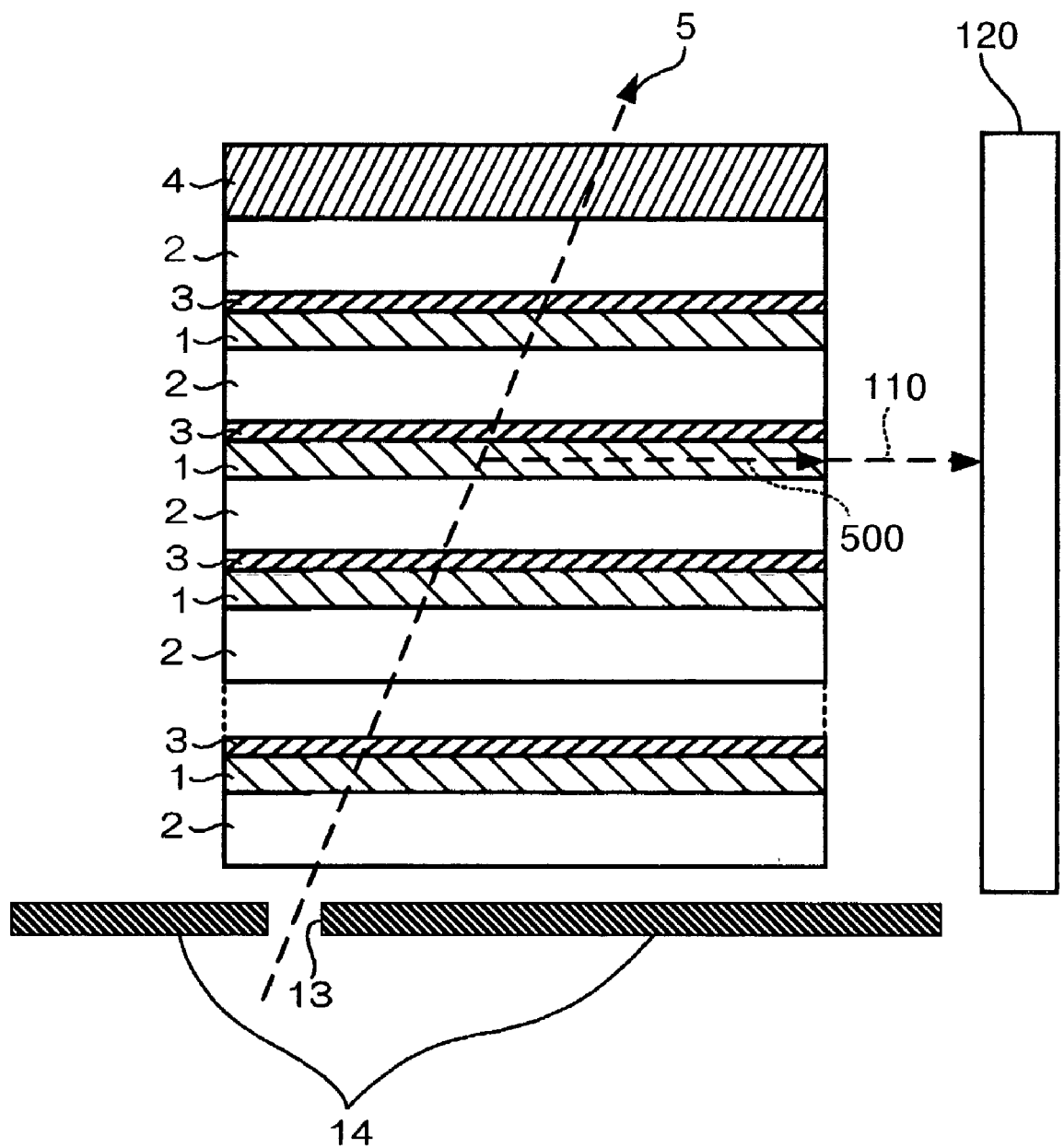
FIG. 26 is a diagram showing the first variation of the incident angle control method of the eleventh embodiment.

FIG. 26 is a diagram showing the first variation of the incident angle control method of the eleventh embodiment.

In the first embodiment, the reference beam 5 has a wavelength λa for sensitizing the storage layer 4. In addition, each of the diffraction grating layers 3, 3, 3, . . . 3 is designed in a manner such that the reference beam 5 of the wavelength λa input at one of the incident angles $θ_0$ is coupled with the diffraction grating layer.

In this case, if the reference beam 5 is emitted onto the entire storage layer 4, the entire storage layer 4 is exposed. In order to avoid this, the reference beam 5 is incident via a spatial optical selector having a small hole or slit 13 on the storage layer 4, so that the exposed area in the storage layer 4 can be limited to only a desirable area to be exposed.

Also in this variation, an incident angle control method as shown by FIGS. 24 and 25 can be employed, that is, one or both of the reference beam 5 and the optical waveguide 123 is shifted and/or rotated so as to output an emitted beam from a target core layer 1. Therefore, the incident angle θ can be highly accurately matched to a target incident angle $θ_0$.

Figure 27:
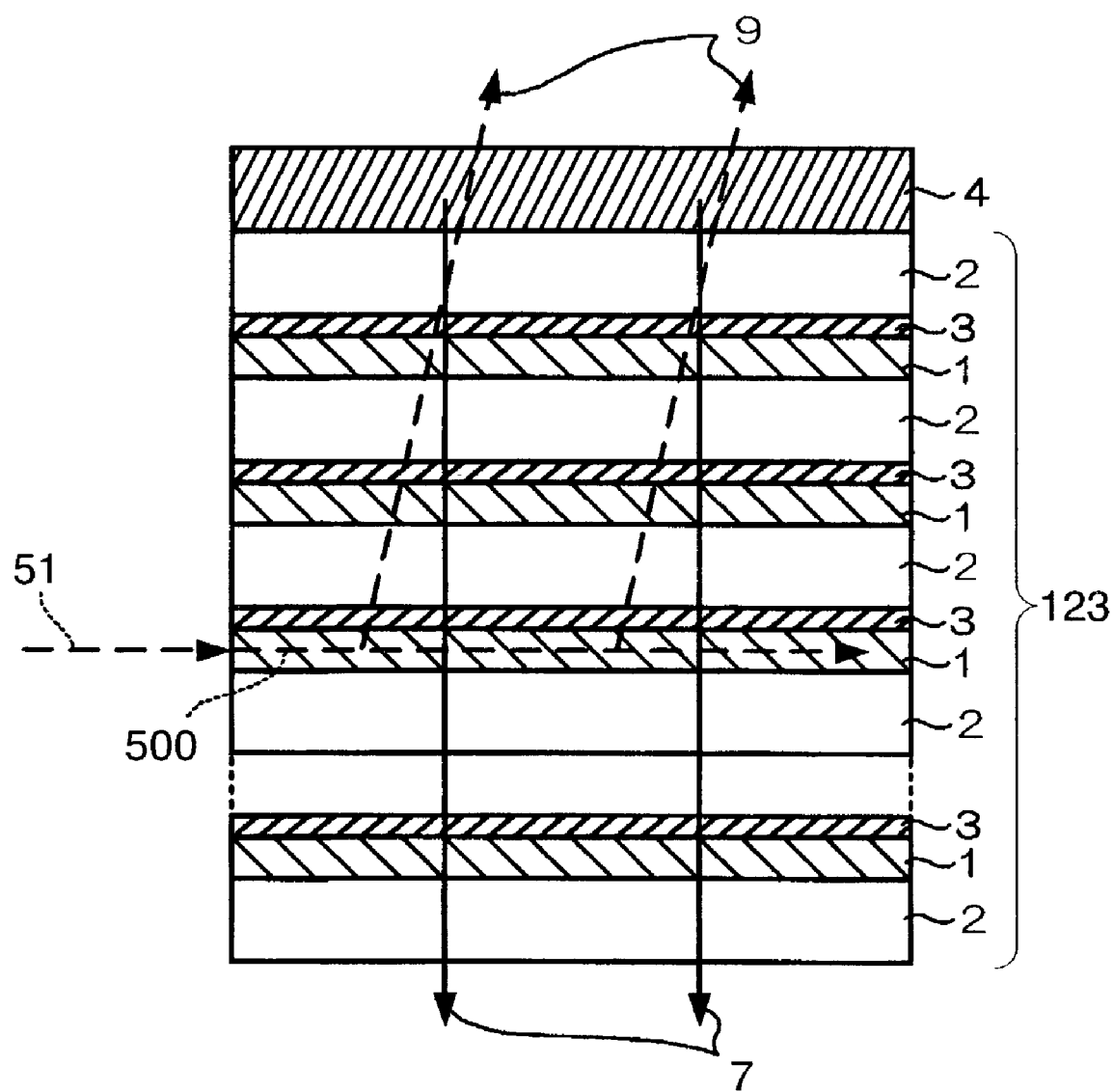
FIG. 27 is a diagram for explaining an example of the retrieval process of the holographic medium in the eleventh embodiment.

If the diffraction grating layer 3 is designed so as to satisfy the above formula (1), then as shown in FIG. 27, a diffracted beam 9, produced from a reference beam 51 having a wavelength λa, is incident on the storage layer 4 at an incident angle $θ_0$, thereby obtaining a retrieved beam 7 by this diffracted beam 9.

11-2 Second Variation

Figure 28:
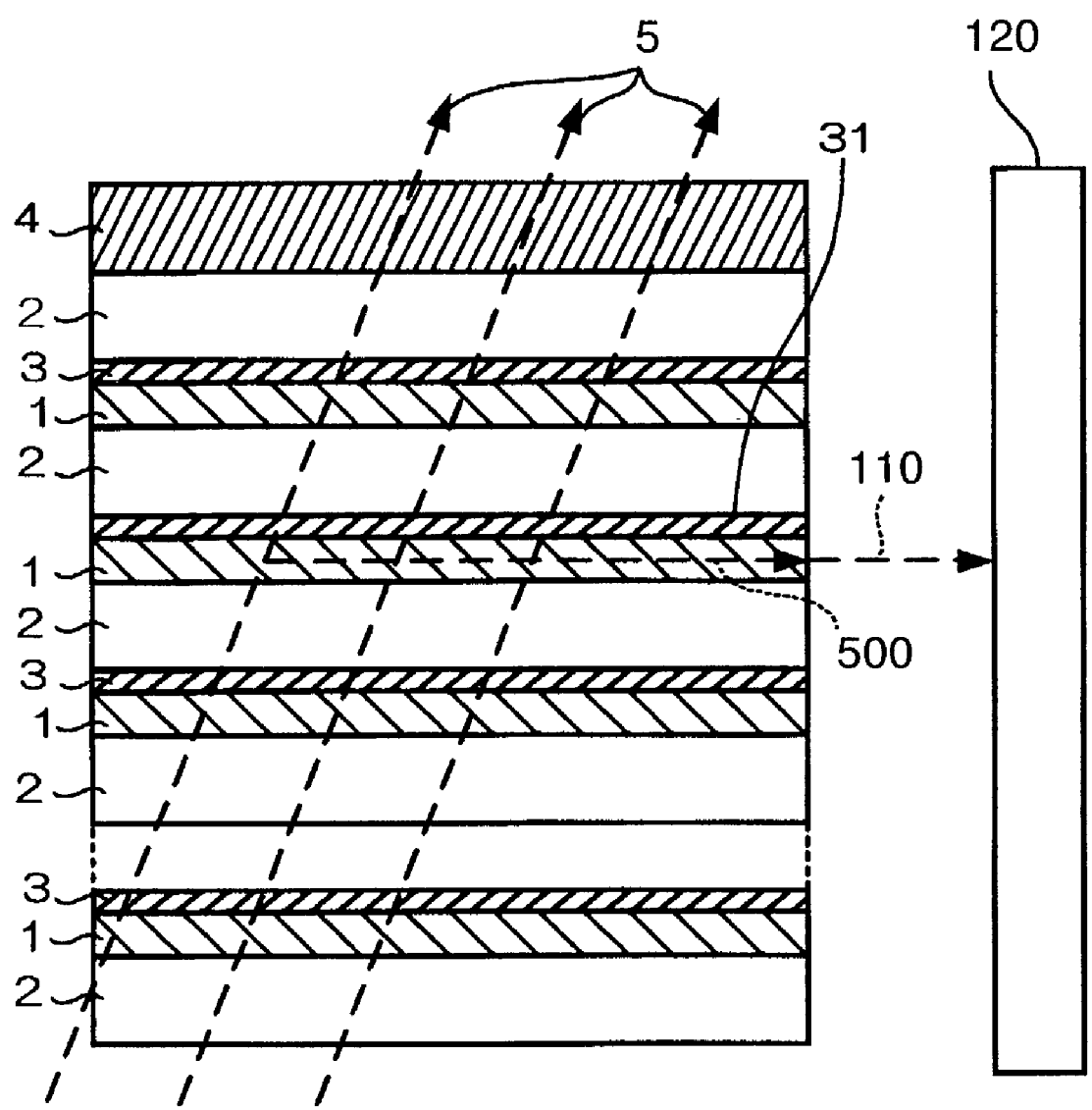
FIG. 28 is a diagram showing the second variation of the incident angle control method of the eleventh embodiment.

FIG. 28 is a diagram showing the second variation of the incident angle control method of the eleventh embodiment.

In this second variation, first, a reference beam 5 having a wavelength λb which does not sensitize the storage layer 4 is used. In this case, even if the reference beam 5 is emitted onto the entire area of the storage layer 4, the storage layer 4 is not exposed; thus, no spatial optical selector 14 is necessary. Here, when a different wavelength is used, then the correspondence between the incident angle $θ_0$ and the diffraction grating layer 3 is also changed.

In the second variation, a part or all of the diffraction grating layers 3, 3, 3, . . . 3 are designed in a manner such that the reference beam of the wavelength λb input at any incident angle $θ_0$ is coupled with these diffraction grating layers (e.g., diffraction grating layer 31 in FIG. 28).

First, the reference beam 5 having the wavelength λb and the diffraction grating layer 31 are used for matching the incident angle of the reference beam 5 to a target incident angle $θ_0$ by using an incident angle control method as shown by FIGS. 24 and 25. After this control, in the storage and retrieval processes, a reference beam 5 having the wavelength λa (as used in the first variation) is used instead of the reference beam of the wavelength λb.

In another method, the diffraction grating layer 31 is designed in a manner such that a reference beam 5 which has the wavelength λb and is incident at an incident angle θb is coupled with this diffraction grating layer. In this case, first, the reference beam 5 having the wavelength λb and the diffraction grating layer 31 are used for matching the incident angle of the reference beam 5 to the incident angle θb by using an incident angle control method as shown by FIGS. 25 and 26. After that, this incident angle θb is used as a reference for adjusting the angle, and the incident angle θ is matched to a target incident angle $θ_0$ by mechanically shifting and/or rotating one or both of the reference beam 5 and the optical waveguide 123.

In either of the above-explained methods, the incident angle of the reference beam 5 can be highly accurately controlled. In addition, a portion of the diffraction grating layers 3 may be designed so as to couple the reference beam 5 having a wavelength λa to this portion at an incident angle $\theta_0$. When this portion is used, a reference beam 51 having the wavelength λa produces a diffracted beam 9 which is incident onto the storage layer 4 at the incident angle $\theta_0$. Therefore, a retrieval process as shown by FIG. 27 can be employed.

11-3 Third Variation

Figure 29:
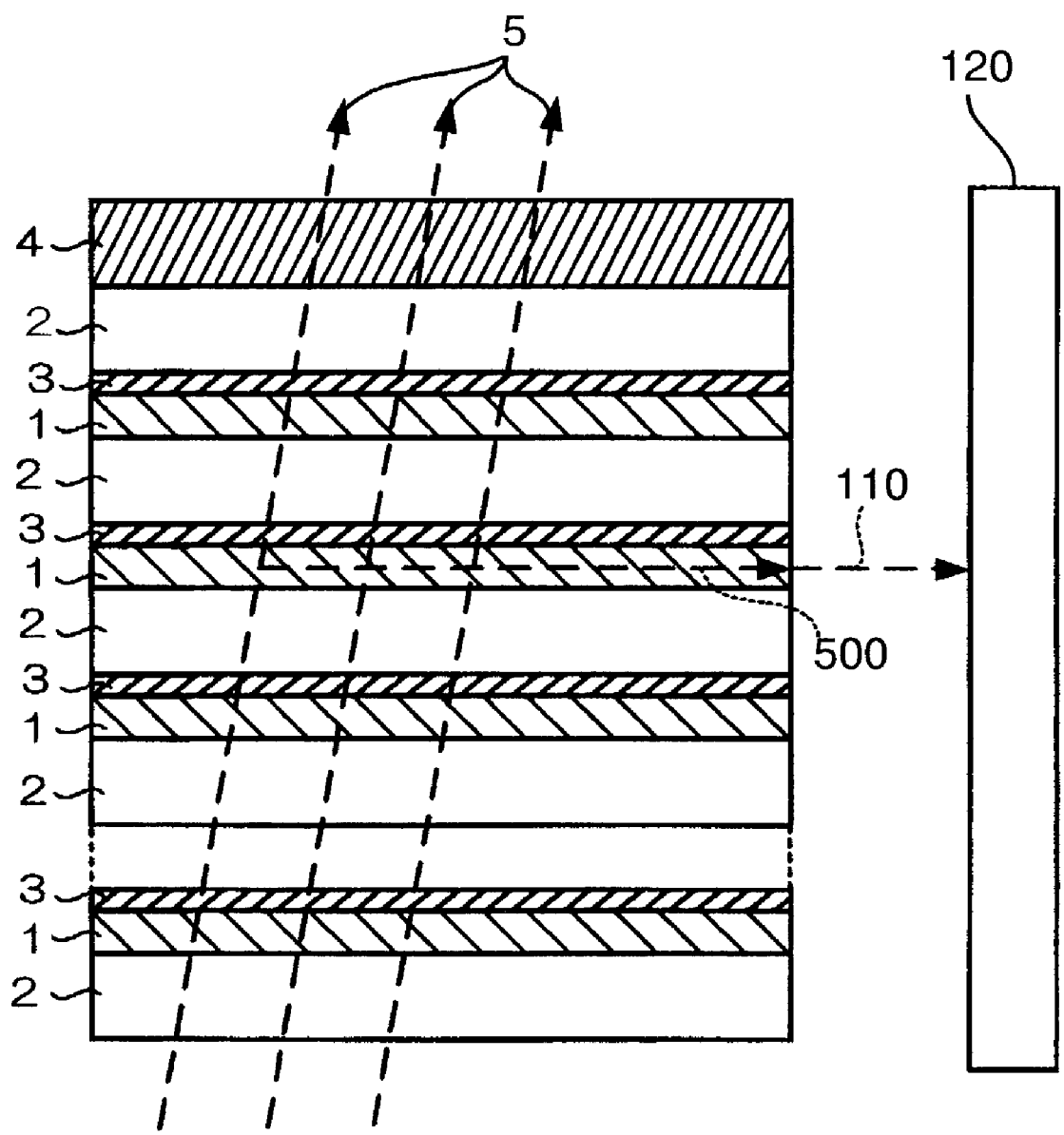
FIG. 29 is a diagram showing the third variation of the incident angle control method of the eleventh embodiment.

FIG. 29 is a diagram showing the third variation of the incident angle control method of the eleventh embodiment.

Also in this third variation, first, a reference beam having the above-explained wavelength λb is used; thus, no spatial optical selector 14 is necessary.

In the third variation, the diffraction grating layer 3 is designed in a manner such that a reference beam having the wavelength λa, incident at an incident angle $\theta_0$, is coupled with this diffraction grating layer. According to the above formula (1), when a reference beam 5 having a wavelength λb is incident at an incident angle $\theta_{0b}$, which satisfies the relationship "λb/(1−sin $\theta_{0b}$)=λa/(1−sin $\theta_0$)", this reference beam 5 of wavelength λb is coupled with the diffraction grating layer 3.

In this variation, first, a reference beam 5 having the wavelength λb is used for matching the incident angle to a target angle $\theta_{0b}$ by employing an incident angle control method as shown by FIGS. 24 and 25, and this angle $\theta_{0b}$ is then used as a reference for controlling the incident angle. Therefore, one or both of the reference beam 5 and the optical waveguide 123 are mechanically shifted and/or rotated so as to obtain a target incident angle $\theta_0$. In the storage and retrieval processes, a reference beam 5 having the wavelength λa is used instead of the reference beam of wavelength λb.

In the third variation, similar to the second variation, the diffraction grating layers 3 may be designed in a manner such that a reference beam 5 having the wavelength λa is coupled with a portion of the diffraction grating layers and a reference beam 5 having the wavelength λb is coupled with the other portion at an incident angle $\theta_0$.

Also in this variation, a retrieval process as shown in FIG. 27 can be employed by using a reference beam 51 having the wavelength λa.

In FIGS. 24, 25, 26, 28, and 29, if the diffraction efficiency of the diffraction grating layer 3 is small and thus the reference beam 5 is not sufficiently coupled with the diffraction grating layer 3 and a beam detected by the photodetector 120 has a low light intensity, then one or more diffraction grating layers (among all diffraction grating layers 3) may have a higher diffraction efficiency or a diffraction grating layer having a higher diffraction efficiency may be provided one or both of the upper and lower sides of the optical waveguide 123. Such a diffraction grating layer having a higher diffraction efficiency can be used as a reference layer for controlling the incident angle.

TWELFTH EMBODIMENT

Figure 30:
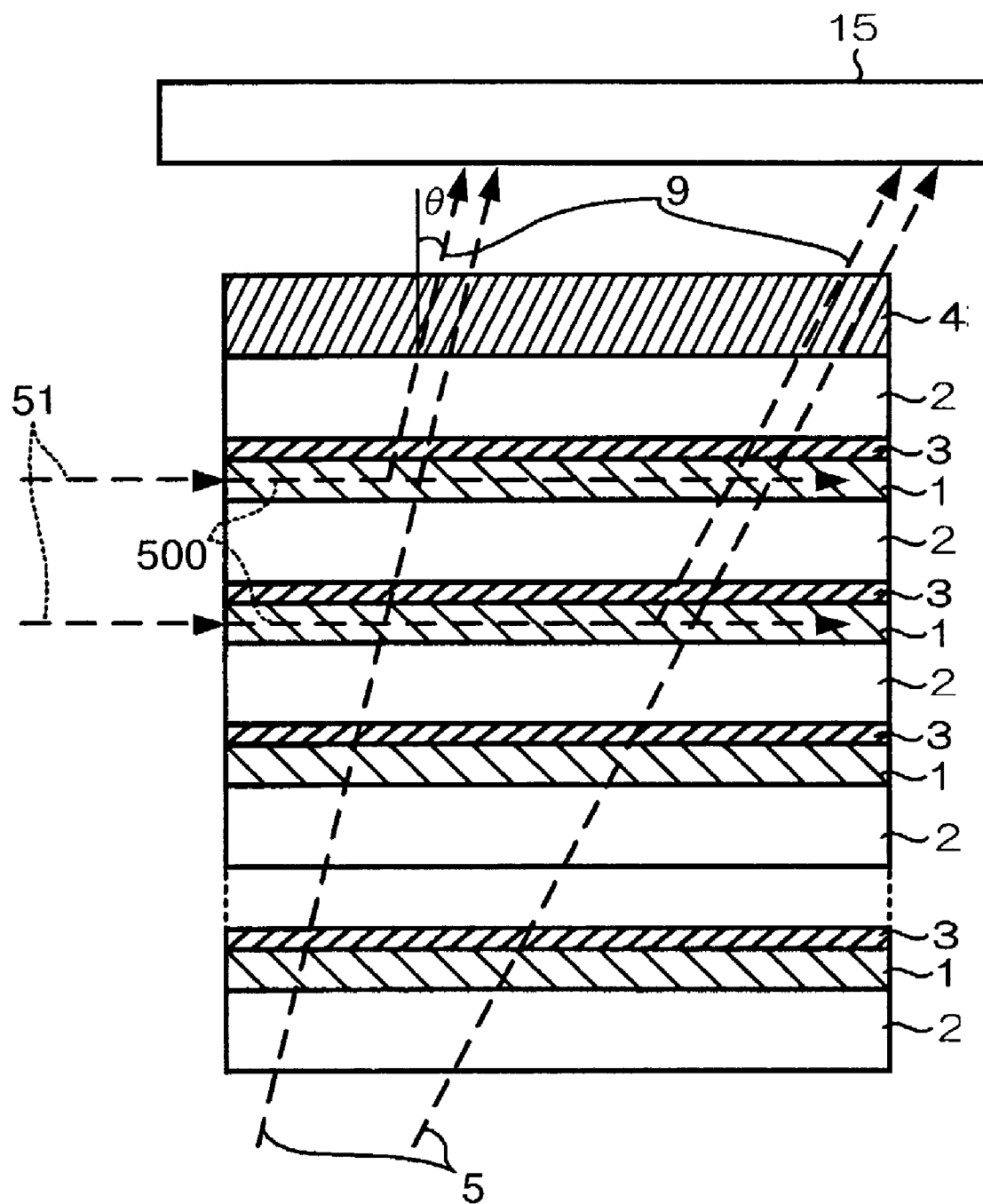
FIG. 30 is a diagram for explaining the incident angle control method as the twelfth embodiment of the present invention.

FIG. 30 is a diagram for explaining an incident angle control method as the twelfth embodiment of the present invention.

In FIG. 30, each diffraction grating layer 3 is designed to have a one-to-one corresponding relationship with each incident angle $\theta_0$. That is, when a reference beam 51 is input from an end face of a diffraction grating layer 3 which corresponds to a target incident angle $\theta_0$, a diffracted beam 9 is incident on the storage layer 4 at this incident angle $\theta_0$.

If the incident angle of a reference beam 5, which is incident from the lower side, coincides with the above incident angle $\theta_0$, the reference beam 5 and the diffracted beam 9 are parallel to each other. Therefore, one or both of the reference beam 5 and the optical waveguide 123 are shifted and/or rotated so as to make the reference beam 5 parallel to the diffracted beam 9 which corresponds to the target incident angle $\theta_0$, thereby controlling the incident angle of the reference beam 5 so as to match the target incident angle $\theta_0$ with high accuracy.

Figure 31:
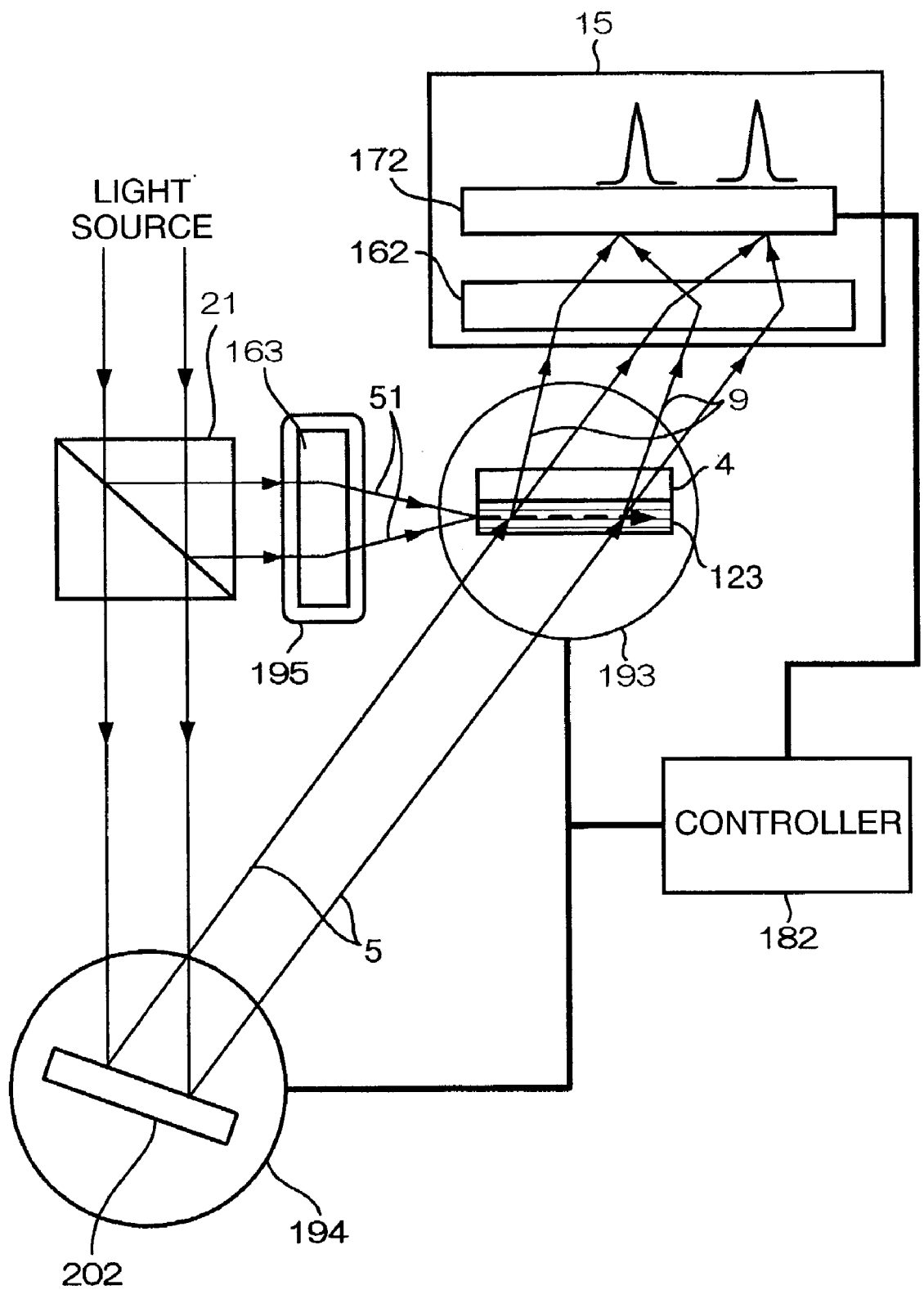
FIG. 31 is a diagram for explaining the incident angle control method of the twelfth embodiment in detail.

The photodetector 15 is used for determining whether the reference beam 5 and the diffracted beam 9 are parallel to each other. As shown in FIG. 31 (explained later), the photodetector 15 can be made using a combination of a condenser 162 having a lens or the like for focusing a light beam and an image pick-up device 172 which includes a CCD, a CMOS, or the like and which has an image pick-up function. The reference beam 5 and the diffracted beam 9 are imaged onto the image pick-up device 172, and when image points of these beams coincide with each other, it is determined that both beams are parallel, as explained below.

FIG. 31 is a diagram for explaining the incident angle control method of the twelfth embodiment in detail. A light beam from a light source is input into a beam splitter 21 for splitting a light beam, and a portion transmitted through the beam splitter 21 is reflected by a reflector 202 and is then incident on the optical waveguide 123 as a reference beam 5 from the lower side of the medium. On the other hand, a portion reflected by the beam splitter 21 towards a perpendicular direction is focused by a condenser 163 and is incident as a reference beam 51 onto an end face of the optical waveguide 123.

The condenser 163 is placed on a shift and rotation mechanism 195 and the end face of a core layer 1, into which the reference beam 51 is input, is selected by shifting and/or rotating the shift and rotation mechanism 195. In addition, the reference beam 5 is shifted and/or rotated by an operation of a shift and rotation mechanism 194 on which a reflector 202 is placed, and the optical waveguide 123 is shifted and/or rotated by an operation of a shift and rotation mechanism 193 on which the optical waveguide 123 is placed.

When the reference beam 51 is input into a core layer 1 and the diffracted beam 9 having an incident angle $\theta_0$ is produced, a bright point appears at a position on the image pick-up device 172, where the position corresponds to the incident angle $\theta_0$. If the incident angle of the reference beam 5 does not coincide with the incident angle $\theta_0$, a bright point corresponding to the reference beam 5 appears at another position on the image pick-up device 172.

When one or both of the shift and rotation mechanisms 193 and 194 are driven by a controller 182, the distance between two bright points decreases or increases. Therefore, this distance is monitored using the image pick-up device 172 and one or both of the shift and rotation mechanisms 193 and 194 are driven by the controller 182 so as to decrease the distance up to zero, thereby making the incident angle of the reference beam 5 coincide with the incident angle $\theta_0$.

There are a plurality of methods for detecting an actual value of the incident angle $\theta_0$, that is, to determine the core layer 1 into which the reference beam 51 is input.

Figure 32:
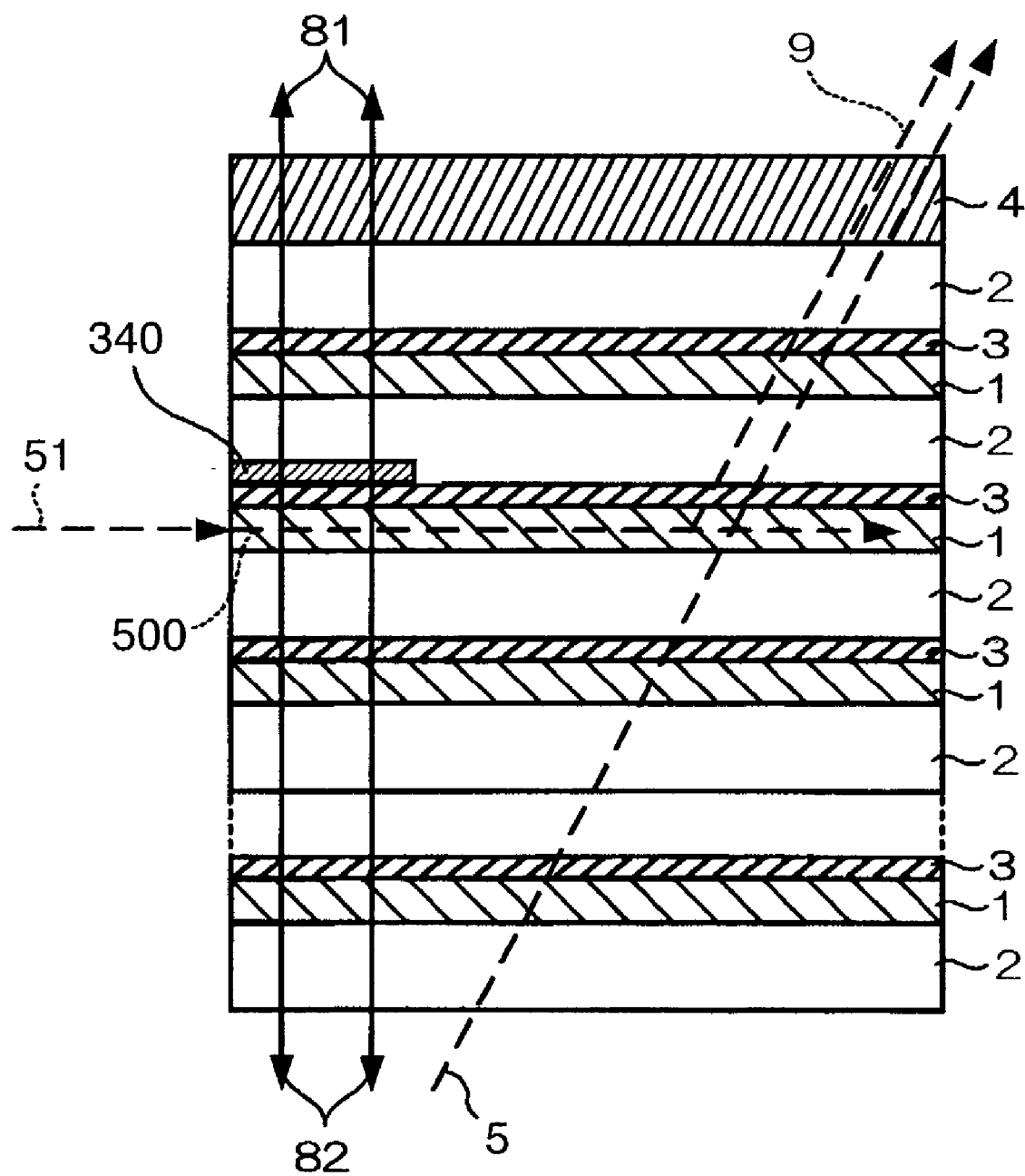
FIG. 32 is also a diagram for explaining the incident angle control method of the twelfth embodiment in detail.

First, as shown in FIG. 32, a marker data related to a core layer 1 (i.e., a corresponding diffraction grating layer 3) is provided to the entire or a portion 340 of the diffraction grating layer 3 by using a computer generated hologram.

In the first method, when a reference beam 51 is input into the above core layer 1 (i.e., the diffraction grating layer 3 having the above portion 340), retrieved beams 81 and 82, which are diffracted beams diffracted by the portion 340 of the diffraction grating layer, are detected in addition to the retrieved beam 7 produced from the storage layer 4, thereby determining the core layer 1 (i.e., the diffraction grating layer 3) into which the reference beam 51 was input.

In the second method, when the reference beam 51 is transmitted through the core layer 1, an emitted beam, output from an end face opposite to that for inputting the reference beam 51, is detected by the photodetector 120 as shown in FIG. 25, and the core layer 1 from which the emitted beam is output can be detected by a method as shown by FIG. 25.

In the third method, a relationship between the position of each bright point on the image pick-up device 172 and each incident angle $\theta_0$ is determined by a method as shown by FIG. 25, and the value of the incident angle $\theta_0$ is detected by the position of the bright point on the image pick-up device 172.

In either method, similar effects can be obtained.

Instead of controlling the incident angle of the reference beam 5 for all the incident angles $\theta_0$ as explained above, the incident angle of the reference beam 5 may be controlled for only a specific incident angle $\theta_0$ by using the above method. In this case, as for the other incident angles $\theta_0$, the above specific incident angle $\theta_0$ is used as a reference, and the incident angle $\theta$ of the reference beam 5 is controlled by shifting and/or rotating one or both of the reference beam 5 and the optical waveguide 123 so as to mechanically change the incident angle $\theta$ by, for example, an integer multiple of $\Delta\theta$. In either case, the incident angle of the reference beam 5 can be controlled with high accuracy.

12-1 First Variation

Figure 33:
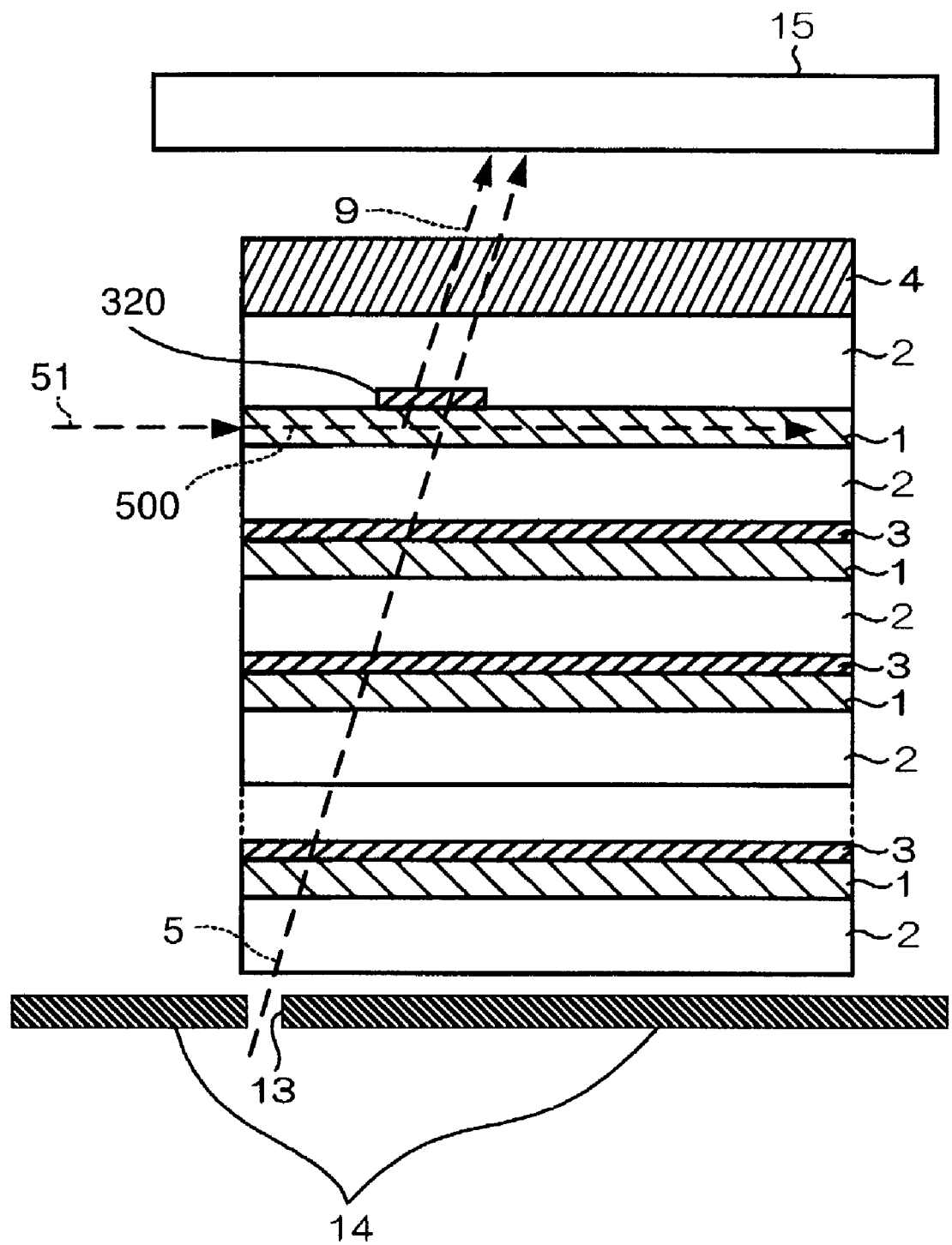
FIG. 33 is a diagram showing the first variation of the incident angle control method of the twelfth embodiment.

FIG. 33 is a diagram for explaining the first variation of the incident angle control method of the twelfth embodiment.

In this first variation, the reference beam 51 has a wavelength $\lambda a$ for sensitizing the storage layer 4. In addition, each of the diffraction grating layers 3, 3, 3, . . . 3 is designed in a manner such that when the reference beam 51 of the wavelength $\lambda a$ is input into the diffraction grating layer, a diffracted beam 9 is incident on the storage layer 4 at one of the incident angles $\theta_0$. In this case, if the reference beam 5 is emitted onto the entire storage layer 4, the entire storage layer 4 is exposed.

In order to avoid this, the reference beam 5 is incident via a spatial optical selector 14 having a small hole or slit 13 on the storage layer 4, and the area of the diffraction grating layer of the core layer 1 into which the reference beam 51 is input is limited to a portion of the boundary between the core layer 1 and the cladding layer 2 (see a diffraction grating layer 320 in FIG. 33). Accordingly, in the storage layer 4, only a portion desired to be exposed is exposed.

In this variation, an incident angle control method as shown by FIGS. 30 to 32 can be employed, that is, one or both of the reference beam 51 and the optical waveguide 123 are shifted and/or rotated so as to make the reference beam 51 parallel to the diffracted beam 9 which corresponds to a target incident angle $\theta_0$. Therefore, the incident angle $\theta$ of the reference beam 5 can be highly accurately matched to the target incident angle $\theta_0$.

Also in this case, the diffracted beam 9 is incident on the storage layer 4 at the incident angle $\theta_0$ with respect to the reference beam 51 of wavelength $\lambda a$; thus, a retrieval process as shown in FIG. 27 can be employed here.

12-2 Second Variation

Figure 34:
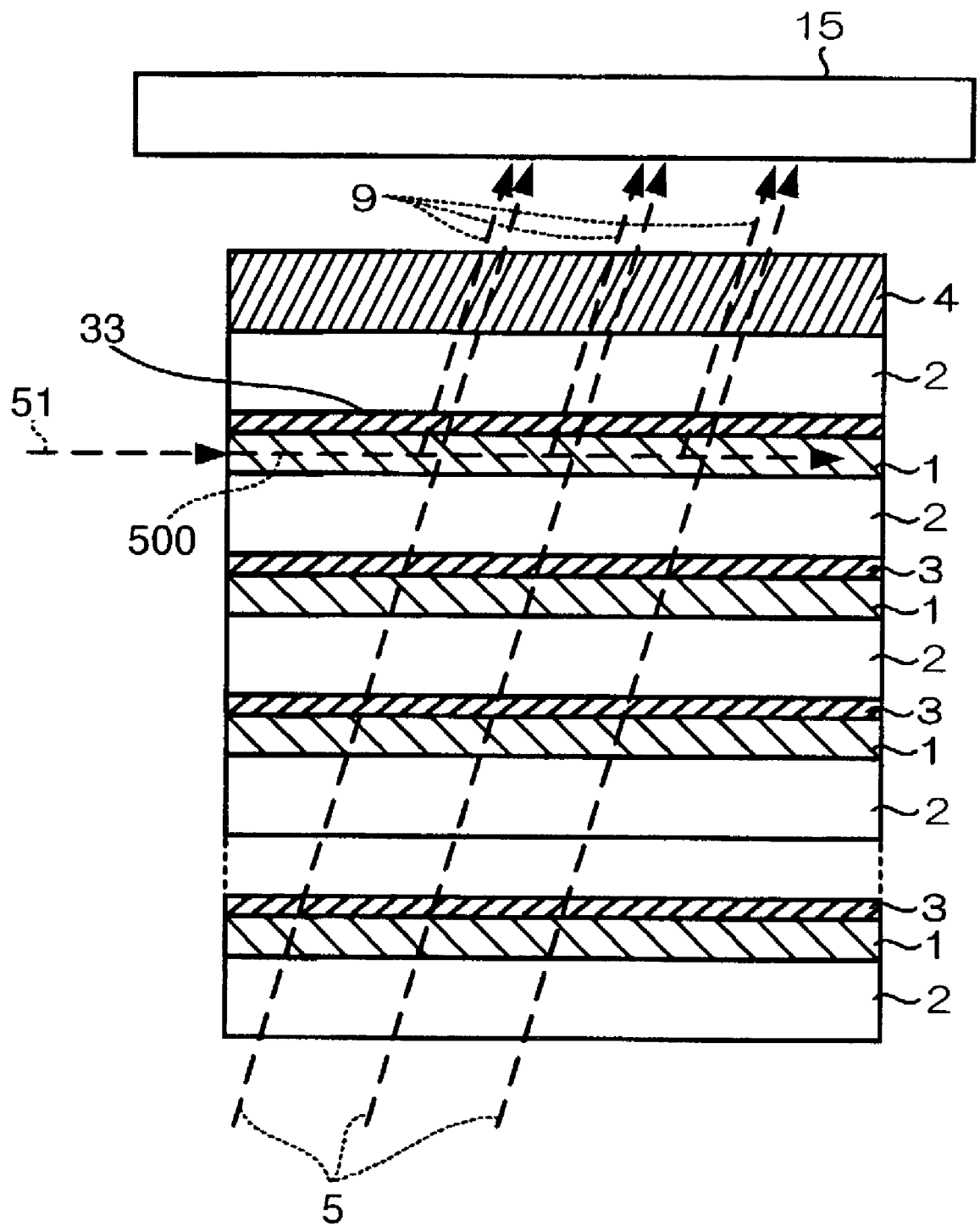
FIG. 34 is a diagram showing the second variation of the incident angle control method of the twelfth embodiment.

FIG. 34 is a diagram showing the second variation of the incident angle control method of the twelfth embodiment.

In this second variation, first, a reference beam 5 and a reference beam 51, which have a wavelength $\lambda b$ which does not sensitize the storage layer 4, are used. Therefore, a spatial optical selector 14 is unnecessary. In addition, when a different wavelength is used, then the correspondence between the incident angle $\theta_0$ and the diffraction grating layer 3 is also changed.

In the second variation, a part or all of the diffraction grating layers 3, 3, 3, . . . 3 are designed in a manner such that when a reference beam 51 of the wavelength $\lambda b$ is input, a diffracted beam 9 is incident on the storage layer 4 at an incident angle $\theta_0$ (see a diffraction grating layer 33 in FIG. 34).

First, the reference beams 5 and 51 having the wavelength $\lambda b$ and the diffraction grating layer 33 are used for matching the incident angle of the reference beam 5 to a target incident angle $\theta_0$ by using an incident angle control method as shown by FIGS. 30 to 32. After this control, in the storage and retrieval processes, reference beams 5 and 51 having the wavelength $\lambda a$ are used instead of the reference beams of wavelength $\lambda b$.

In another method, the diffraction grating layer 33 is designed in a manner such that when a reference beam 51 having the wavelength $\lambda b$ is input, a diffracted beam 9 is incident on the storage layer 4 at angle $\theta b'$. In this case, first, the reference beams 5 and 51 having the wavelength $\lambda b$ and the diffraction grating layer 33 are used for matching the incident angle of the reference beam 5 to $\theta b'$ by using an incident angle control method as shown by FIGS. 30 to 32. This incident angle $\theta b'$ is then used as a reference for matching the incident angle, and one or both of the reference beam 5 and the optical waveguide 123 are shifted and/or rotated so as to mechanically match the incident angle to $\theta_0$.

In either of the above-explained methods, the incident angle of the reference beam 5 can be highly accurately controlled. Also in this case, a portion of the diffraction grating layer 3 may be designed so as to correspond to wavelength $\lambda a$, so that a retrieval process as shown by FIG. 27 can be employed.

12-3 Third Variation

Figure 35:
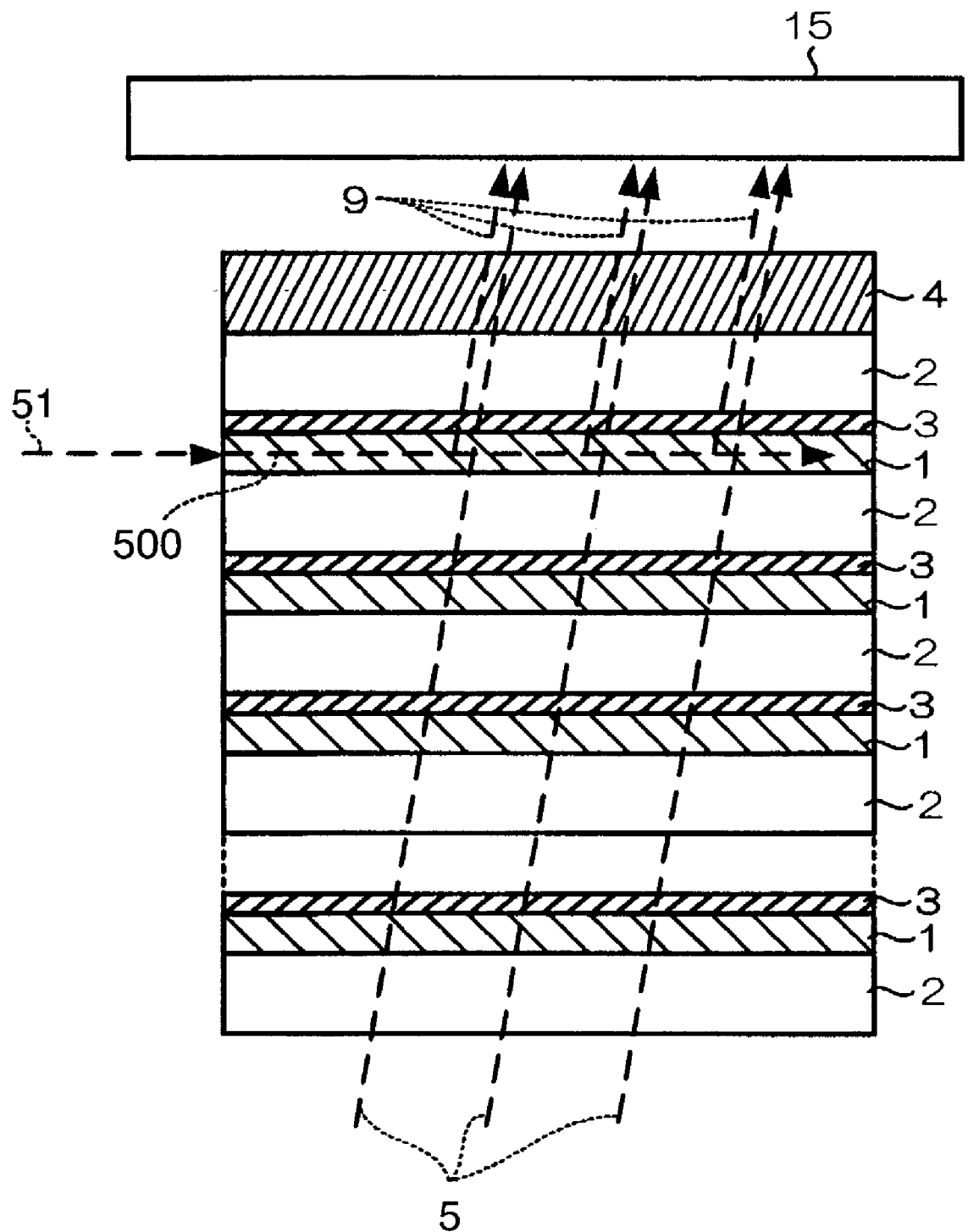
FIG. 35 is a diagram showing the third variation of the incident angle control method of the twelfth embodiment.

FIG. 35 is a diagram showing the third variation of the incident angle control method of the twelfth embodiment.

Also in this third variation, first, reference beams 5 and 51 having the wavelength $\lambda b$ are used. In this case, the storage layer 4 is not exposed even if the reference beams 5 and 51 are emitted to the entire storage layer 4; thus, no spatial optical selector 14 is necessary. However, when a different wavelength is used, then the correspondence between the incident angle 00 and the diffraction grating layer 3 is also changed.

In the third variation, the diffraction grating layer 3 is designed in a manner such that when a reference beam 51 having the wavelength $\lambda a$ is input, a diffracted beam 9 is incident on the storage layer 4 at an incident angle $\theta_0$.

According to the above formula (1), when a reference beam 51 having a wavelength λb is input, a diffracted beam 9 is incident on the storage layer 4 at an incident angle $\theta_{0b}'$ which satisfies the relationship:

"$\lambda b/(1-\sin \theta_{0b}')=\lambda a/(1-\sin \theta_0)$".

In this variation, first, a reference beam 51 having the wavelength λb is used for matching the incident angle to a target angle $\theta_{0b}'$ by employing an incident angle control method as shown by FIGS. 30 to 32, and this angle $\theta_{0b}'$ is then used as a reference for controlling the incident angle. Therefore, one or both of the reference beam 5 and the optical waveguide 123 are mechanically shifted and/or rotated so as to mechanically change the incident angle.

In the storage and retrieval processes, reference beams 5 and 51 having the wavelength λa are used instead of the reference beams of wavelength λb.

In the third variation, as shown in FIG. 34, the diffraction grating layer 3 may be designed in a manner such that a reference beam 51 having the wavelength λa is coupled with a portion of the diffraction grating layers and a reference beam 5 having the wavelength λb corresponds to the other portion of the layers. In addition, a retrieval process as shown by FIG. 27 can be employed when a reference beam 51 having the wavelength λa is input into the diffraction grating layer 3.

In addition, in a core layer 1, it is unnecessary to have a one-to-one corresponding relationship between an incident angle $\theta_0$ and a diffraction grating layer. FIGS. 36 to 39 are top views of variations of the optical waveguide 123. Here, the reference beam 51 is input from the left end face of the core layer 1. A spatial optical selector 14 having a small hole or slit 13 is provided at the left side of the optical waveguide if necessary.

Figure 36:
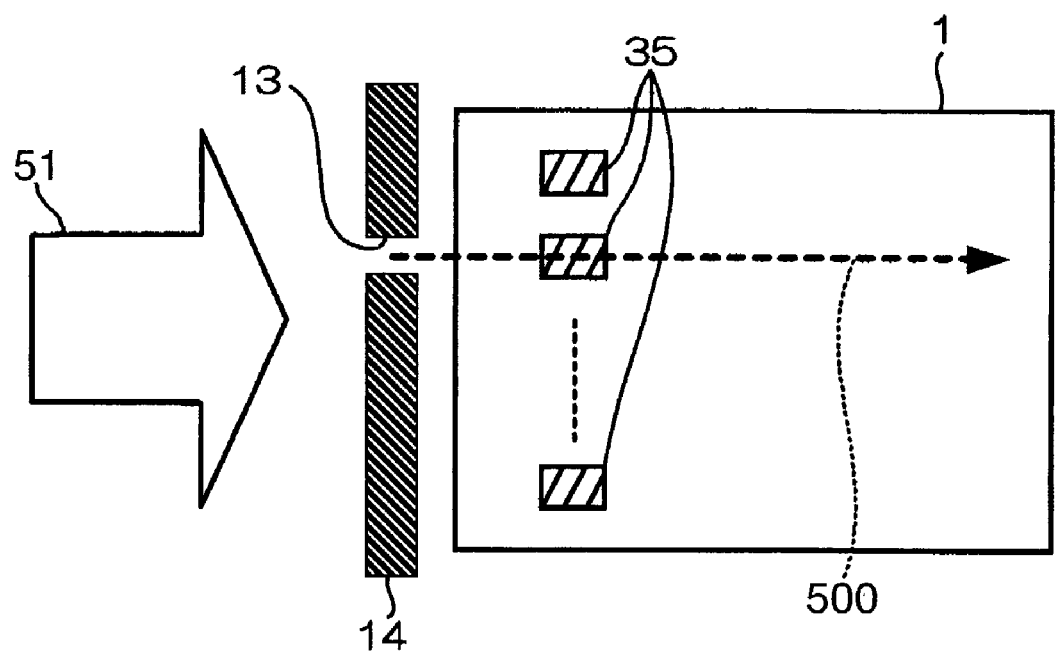
FIG. 36 is a top view showing a variation of the optical waveguide 123.
Figure 37:
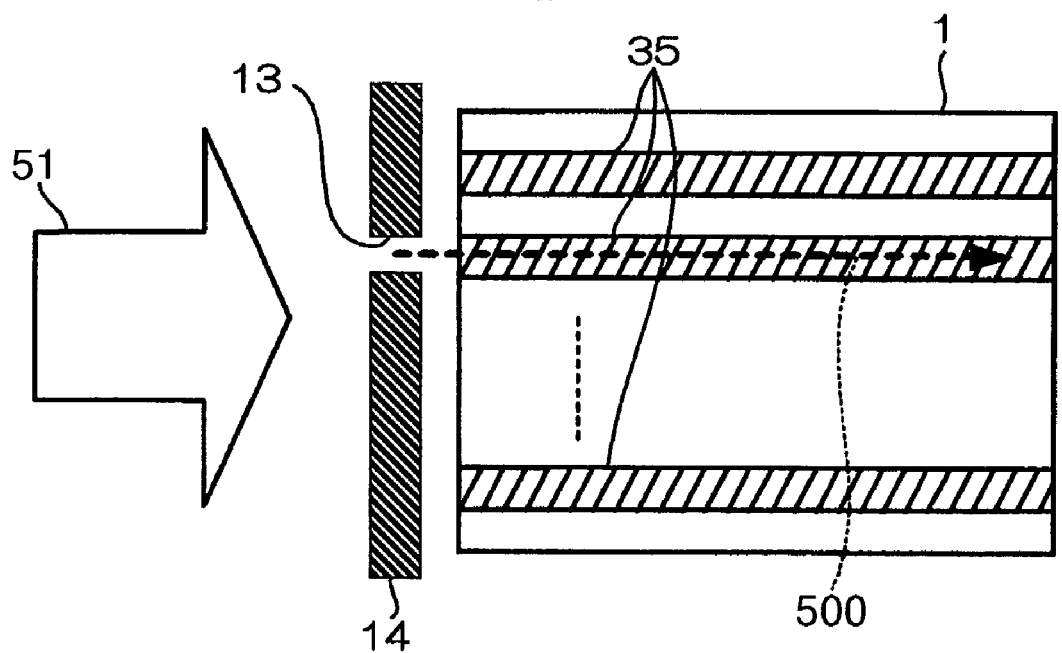
FIG. 37 is a top view showing another variation of the optical waveguide 123.

In FIGS. 36 and 37, a plurality of diffraction grating layers 35 are provided in a direction perpendicular to the transmission direction of the reference beam 51 and the transmitted beam 500. In FIG. 36, the diffraction grating layers 35 are provided only in a portion in the transmission direction of the reference beam 51 and the transmitted beam 500, while in FIG. 37, the diffraction grating layers 35 are provided over the entire length in the transmission direction.

Figure 38:
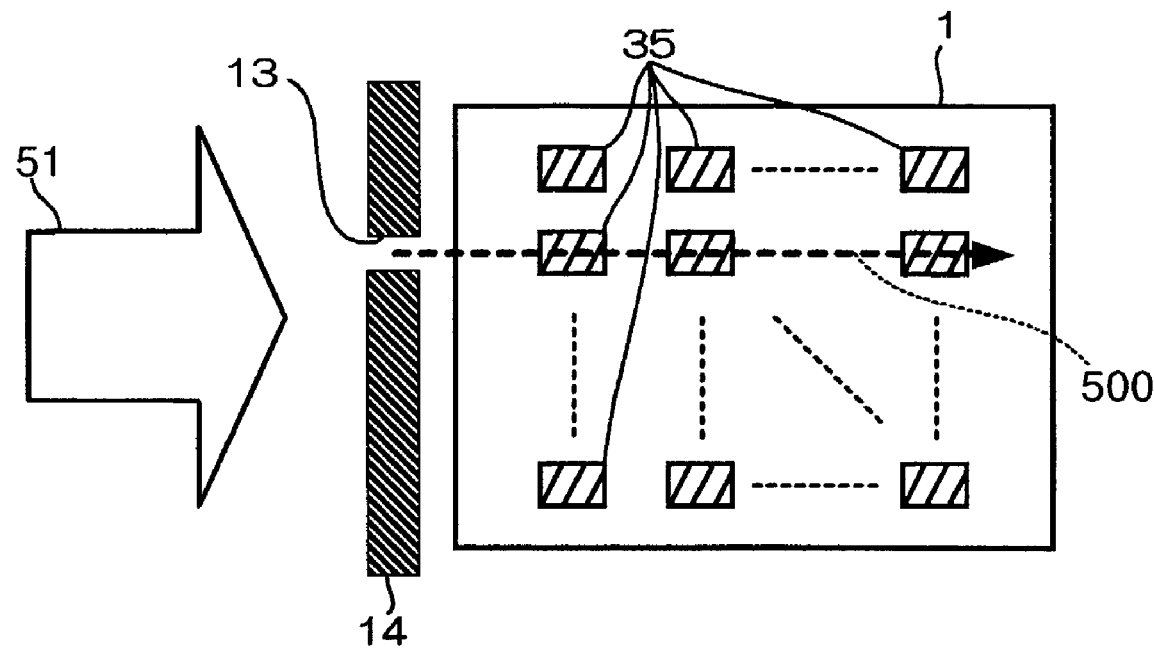
FIG. 38 is a top view showing another variation of the optical waveguide 123.
Figure 39:
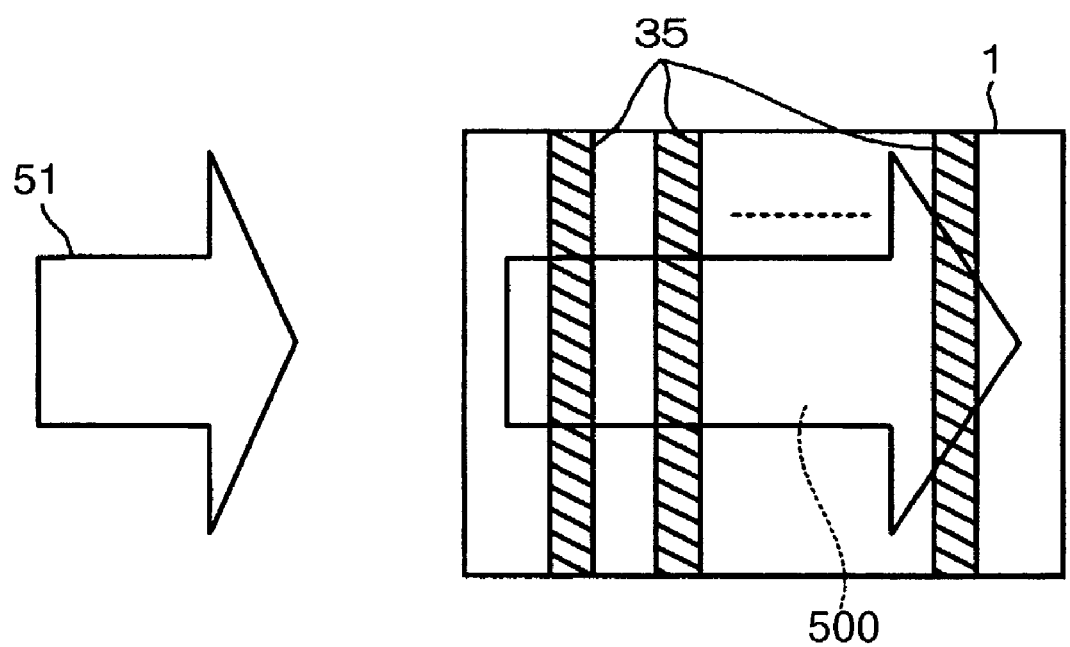
FIG. 39 is a top view showing another variation of the optical waveguide 123.

In FIG. 38, a plurality of diffraction grating layers 35 are provided both in the transmission direction of the reference beam 51 and the transmitted beam 500 and in a direction perpendicular to the transmission direction. In FIG. 39, a plurality of diffraction grating layers 35 are provided in the transmission direction of the reference beam 51 and the transmitted beam 500, where each diffraction grating layer 35 is formed over the entire length in a direction perpendicular to the transmission direction.

Some of the structures shown in FIGS. 36 to 39 may be mixed. Additionally as a variation of the arrangement shown in FIG. 38, the diffraction grating layers 35 may be provided in the transmission direction of the reference beam 51 and the transmitted beam 500, where only a single diffraction grating layer 35 is present in each direction perpendicular to the transmission direction. In either case, similar effects can be obtained. Each diffraction grating layer 35 corresponds to one of the incident angles $\theta_0$.

If a method as shown in FIG. 33 is employed, an arrangement as shown in one of FIGS. 36 to 38 can be used. In this case, if an arrangement as shown in FIG. 38 or 39 is used, a plurality of diffracted beams 9 are emitted due to a plurality of diffraction grating layers (35); thus, it is effective to provide a spatial optical selector 14 having a small hole or slit 13 for blocking unnecessary diffracted beams 9, at a side (of the optical waveguide 123 and the storage layer 4) which receives the diffracted beam 9.

As explained above, a spatial optical selector 14 having a small hole or slit 13 may be provided at the lower, left, or upper side of the optical waveguide 123 according to necessity, so that only a diffraction grating layer (35) corresponding to a target incident angles $\theta_0$ can be selected. Therefore, it is possible to adjust the incident angle to a plurality of incident angles $\theta_0$ by using a single core layer 1.

If the reference beams 5 and 51 have a beam diameter as small as the small hole or slit 13, a spatial optical selector 14 may be omitted.

In addition, in FIGS. 36 to 39, the diffraction grating layers 35 are separated from each other. However, they may contact with each other if each of the reference beams 51 and 5 and the diffracted beam 9 can be separately used by using a spatial optical selector 14. Also in the present variation, the value of the incident angle $\theta_0$ can also be detected according to the position of the selected diffraction grating layer 35 on the core layer 1.

In the above explanation, a plurality of core layers 1, cladding layers 2, and diffraction grating layers 3 are provided. However, a structure having a single core layer 1, two cladding layers 2, and a single diffraction grating layer 3 provides similar effects.

As explained above, the storage layer 4 may be provided at one or both of the upper and lower sides of the optical waveguide 123. In either case, similar effects can be obtained. Additionally, the storage layer 4 may be spatially separated from the optical waveguide 123. Also in this case, similar effects can be obtained.

Also as explained above, the storage layer 4 may be adhered to the optical waveguide 123 via an adhesive, or fixed to the optical waveguide 123 without using an adhesive. In addition, a protection film may be provided at one or both of the upper and lower sides of the storage layer 4, or the storage layer 4 may be surrounded by a protection film.

Also as explained above, each diffraction grating layer may be provided at a boundary between a core layer 1 and a lower cladding layer 2, or both boundaries between a core layer 1 and upper and lower cladding layers 2, or in a core layer 1. In either case, similar effects can be obtained. The diffraction grating layer can have any shape as shown in FIG. 19 and FIGS. 15A to 15C, similar to the above-explained embodiments.

The reference beam 5 may be incident from the lower or upper side of the holographic medium, the reference beam 51 may be input from the left or right side of the holographic medium, and the object beam 6 may be incident from the lower or upper side of the holographic medium. In either case, similar effects can be obtained.

When the arrangement of the storage layer 4 or the optical waveguide 123, or the incident direction of the reference beam 5 or 51 or the object beam 6 is changed, the positions of the photodetector 120, the photodetector 15, and the spatial optical selector 14 are suitably changed so as to satisfy the function of the present embodiment.

Also in the eleventh and twelfth embodiments and in formula (1), the effects of the refractive index on each layer are not disregarded and considered. That is, strictly, when the reference beam, diffracted beam, or the like passes through a layer having a different refractive index, the beam is refracted and the angle of the beam is changed, as explained above. Here, when a beam incident on a layer having a refractive index $n_1$ at an incident angle $\theta_1$ is then incident to the next layer having a refractive index $n_2$ at an incident angle $\theta_2$, a relationship "$n_1 \cdot \sin \theta_1 = n_2 \cdot \sin \theta_2$" is defined. In addition, the refractive index depends on the wavelength of light, and the wavelength also has a different value in a layer having a different refractive index (in a layer having a refractive index $n_0$, wavelength $\lambda_0$ has a value of $\lambda_0/n_0$). However, regardless of whether such characteristics relating to the refractive index are considered, substantial features of the present invention are not changed and similar effects can be obtained.

THIRTEENTH EMBODIMENT

FIGS. 40A to 42B are diagrams for explaining a holographic storage method as the thirteenth embodiment of the present invention.

In these figures, reference numeral 130 indicates a holographic medium, reference numeral 131 indicates divided areas of the medium 130 (i.e., of the storage layer 4), reference numeral 132 indicates an area for holographic storage and retrieval among the divided areas, reference numeral 133 indicates a group of areas (among the areas 131) for storing and retrieving a single piece of data, reference numerals 1 and 2 respectively indicate a core layer and a cladding layer for forming an optical waveguide, reference numeral 3 indicates a diffraction grating layer formed between the core layer 1 and the cladding layer 2, reference numeral 4 indicates a storage layer made of an optical storage material formed on a top surface of the optical waveguide, reference numeral 6 indicates an object beam 6 which is the first beam carrying data to be stored in the storage layer 4, and reference numeral 71 indicates a reference beam as the second beam.

First, with reference to FIGS. 40A (top view) and 40B (sectional view along line "a-b" in FIG. 40A), the holographic storage method of the present embodiment will be explained.

In the present embodiment, each of the object beam 6 and the reference beam 71 is selectively emitted only to a target area 132 among the divided areas 131 of the medium 130, from the lower or upper side of the medium, thereby storing data as a hologram. Accordingly, a plurality of different data can be stored in different small areas of the storage layer 4 which correspond to the different areas 131 of the medium 130. Therefore, the storage capacity of the medium 130 can be improved.

In the above process, the object beam 6 is focused or partly restricted in the vicinity of or inside the medium 130, and then expanded outside the medium 130 and imaged on a photodetector for detecting retrieved data. Accordingly, the data storage density for the area 131 can be improved independent of each pixel size of a spatial optical modulator for displaying data to be stored and of a photodetector.

In an example shown in FIG. 40B, the object beam 6 is most focused or restricted in the vicinity of the medium 130 after passing through the medium, in order to match the position where the object beam 6 is most focused or restricted to an opening 101 of a spatial optical selector 14 (explained below). Accordingly, the selectivity of the retrieved beam in the retrieval process can be improved, thereby reducing crosstalk of a retrieved signal.

The wavefront of a reference beam 71 in the storage layer 4 is defined in advance to match a wavefront in the storage layer 4 obtained when (refer to FIG. 46C explained below) a reference beam 72 is input from an end face of a core layer 1 and a transmitted beam 73 is transmitted through the core layer 1, and a specific diffracted beam 74 produced from the transmitted beam 73 by a diffraction grating layer 3 is incident on the storage layer 4.

The wavefront of another reference-beam 71 in the storage layer 4 is defined in advance to match a wavefront in the storage layer 4 obtained when (refer to FIG. 47) a reference beam 72 is input from another end face of a core layer 1 and a specific diffracted beam produced by a different diffraction grating layer 3.

Accordingly, a holographic retrieval method explained in the seventeenth embodiment explained below can be performed.

Figure 40A:
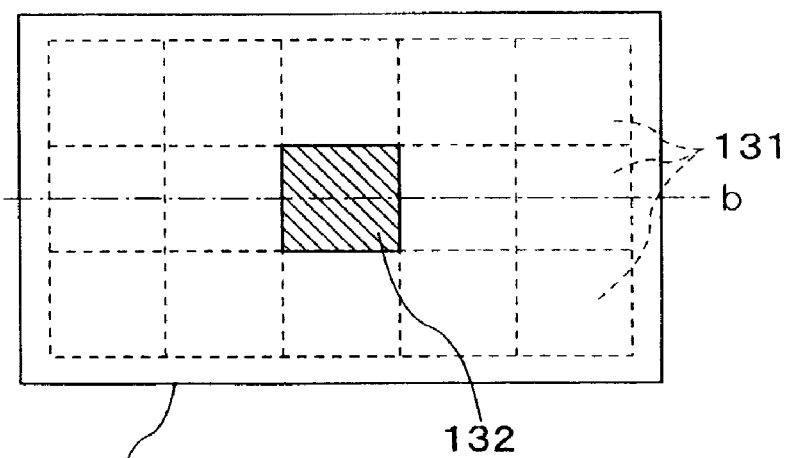
FIGS. 40A and 40B are diagrams for explaining a holographic storage method for storing a transmission hologram, as the thirteenth embodiment of the present invention.
Figure 40B:
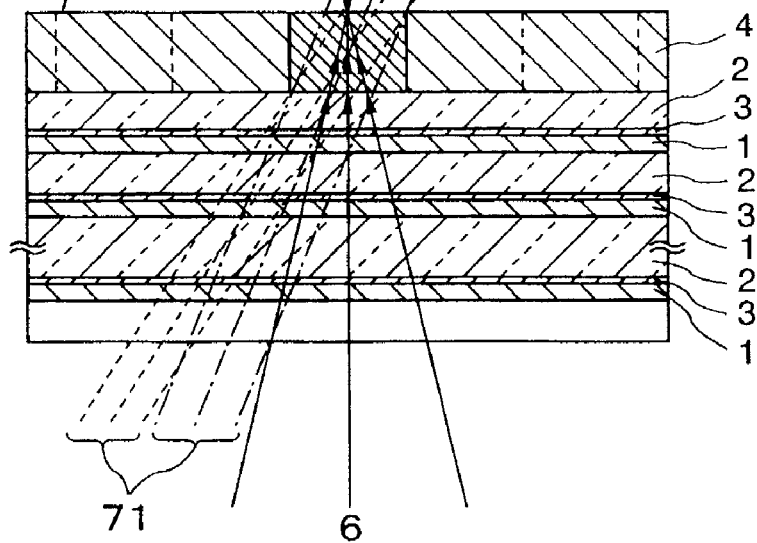
Figure 41:
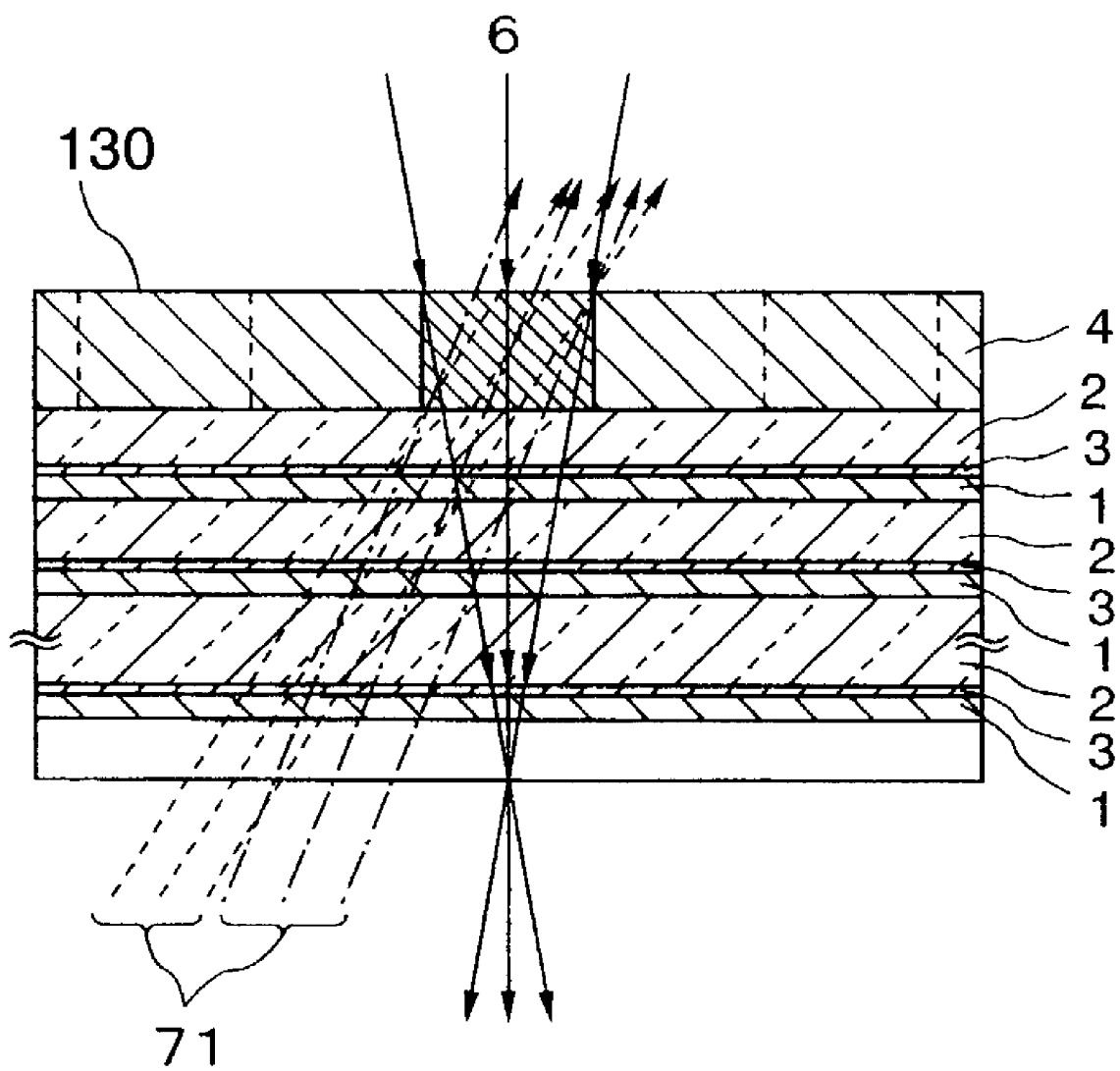
FIG. 41 is a diagram for explaining a holographic storage method for storing a reflection hologram in the thirteenth embodiment.

In FIG. 40B, the object beam 6 and the reference beam 71 are incident from the same side with respect to the storage layer 4 of the medium 130 so as to make a transmission hologram. However, as shown in FIG. 41 (a sectional view corresponding to FIG. 40B), the object beam 6 may be incident from a side opposite to that for inputting the reference beam 71 with respect to the storage layer 4 of the medium 130, so as to make a reflection hologram.

Below, another example of the storage method will be explained with reference to FIGS. 42A (top view) and 42B (sectional view along line "a-b" in FIG. 42A).

In this example, a single piece of data is divided into plural data portions in advance, and the divided data portions are respectively stored as holograms in different small areas of the storage layer 4 which correspond to some of the divided areas 131 of the medium 130. As for each divided data portion, the corresponding object beam 6 and reference beam 71 are emitted to only small areas of the storage layer 4 which correspond to one or more target areas 132 among the divided areas 131 of the medium 130, from the upper or lower side of the medium, thereby storing each divided data portion as a hologram.

Accordingly, similar to the method shown by FIGS. 40A and 40B, a plurality of different data can be stored in different areas of the storage layer 4 which correspond to some of the divided areas 131 of the medium 130, thereby improving the storage capacity of the medium 130.

As for the setting of the object beam 6 and the reference beam 71, the same method as that explained by referring to FIGS. 40A and 40B is used. Accordingly, effects similar to those explained above can be obtained.

In the present embodiment, in order to store the entire data, the above-explained data storage operation is repeatedly performed at least one time, where the maximum number of times of the repetition corresponds to the number of division of data. As a result, a group of areas 133 which corresponds to a single piece of data to be stored is formed on the medium 130, where the number of the areas 133 corresponds to the number of division of data.

As explained above, in the present embodiment, a single piece of data is divided into a plurality of data portions, and each data portion is stored as a hologram in a different area among the divided areas 131 of the storage layer 4. Therefore, if it is assumed that the size of the photodetector for detecting retrieved data and the distance between the medium 130 and the photodetector are fixed, the expansion rate of the object beam 6 from the position of the medium to the position of photodetection (i.e., the image formation plane) can be smaller. Accordingly, the optical system of the object beam 6 can be more easily established.

Also in this embodiment, a reflection hologram can be formed by a method similar to that explained by FIG. 41.

In order to selectively emit the object beam 6 and the reference beam 71 only to a small area of the storage layer 4, that is, the area 132 of the medium 130, a spatial optical selector (not shown in the present embodiment) having a suitable opening may be provided for one or both of the object beam 6 and the reference beam 71.

The present embodiment shows a structure in which a plurality of the core layers 1 and the diffraction grating layer 3 are provided in the optical waveguide, each diffraction grating layer 3 is formed between the core layer 1 and the upper cladding layer 2, and the storage layer 4 is placed on the upper surface of the optical waveguide. However, the optical waveguide may have only a single core layer 1 and a single diffraction grating layer 3, and each diffraction grating layer 3 may be provided between the core layer 1 and the lower cladding layer 2, or in the core layer 1. Additionally, the storage layer 4 may be provided at the lower side or both the upper and lower sides of the optical waveguide, or between two optical waveguides. In either case, effects similar to those of the present embodiment can be obtained. The above variations are also applicable to each embodiment (including a retrieval method) relating to a similar structure.

The storage layer 4 may be spatially separated from the optical waveguide, or the storage layer 4 may be adhered to the optical waveguide by an adhesive or fixed to the optical waveguide without an adhesive. A protection film may be provided to one or both of the upper and lower surfaces of the storage layer 4, or the storage layer 4 may be surrounded by a protection film. In either case, similar effects can be obtained. These variations are also applicable to each embodiment (including a retrieval method) related to a similar structure.

FOURTEENTH EMBODIMENT

Figure 44:
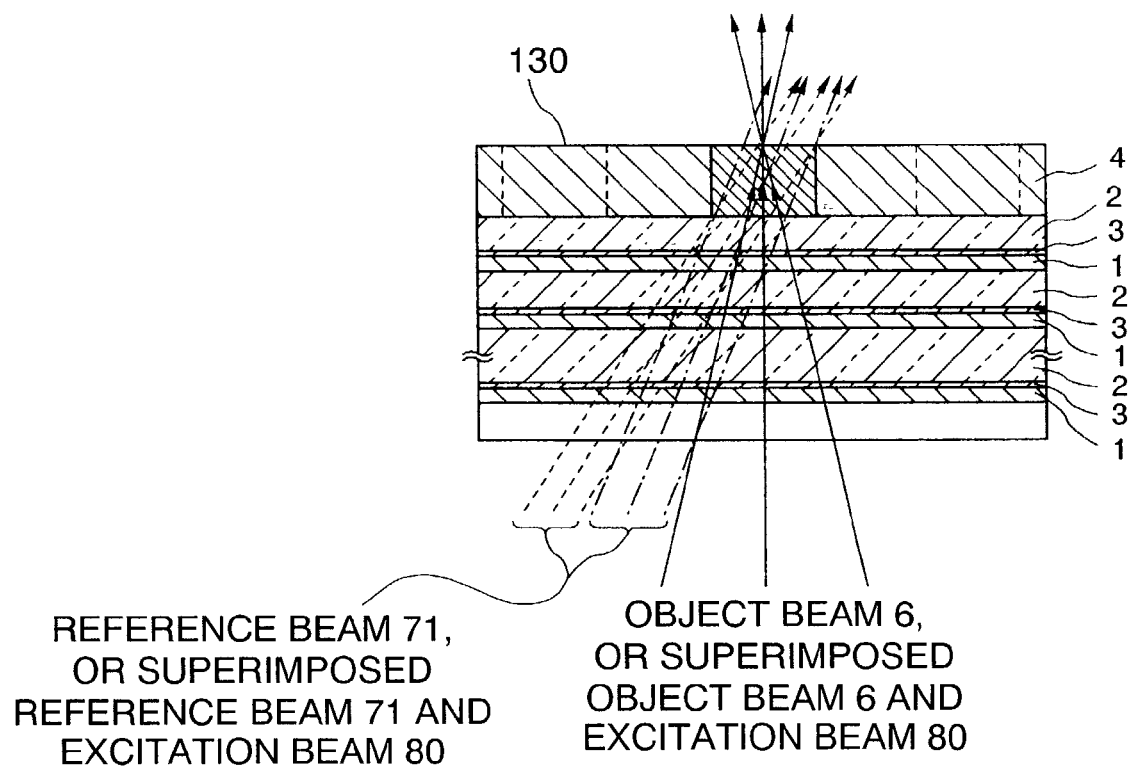
FIG. 44 is a diagram for explaining an example for emitting an excitation beam superimposed on the object beam or the reference beam.

FIGS. 43A to 44 are diagrams for explaining a holographic storage method as the fourteenth embodiment of the present invention. In comparison with the above thirteenth embodiment, the system shown by the figures has a distinctive feature of using an excitation beam 80 as the third beam. In the present embodiment, when data is stored in the storage layer 4 using the object beam 6 and the reference beam 71, the optical storage material, of which the storage layer 4 of the medium 130 is made, should be excited by the excitation beam 80 which has a wavelength different from that of the object beam 6 and the reference beam 71.

First, with reference to FIG. 43A (top view) and FIG. 43B (sectional view along line "a-b" in FIG. 43A), the holographic storage method of the present embodiment will be explained.

In the present embodiment, all of the object beam 6, reference beam 71, and excitation beam 80 are selectively emitted to only a small area of the storage layer 4, which corresponds to the area 132 among the divided areas 131 of the medium 130, from the upper or lower side of the medium 130, thereby storing data as a hologram. Accordingly, different data can be stored in different small areas of the storage layer 4 which correspond to different areas 131 of the medium 130, thereby improving the storage capacity of the medium 130. In this process, the object beam 6 and the reference beam 71 are set using the same method as that explained in the thirteenth embodiment. Accordingly, also in the present embodiment, similar effects as those obtained by the method related to FIGS. 40A and 40B can be obtained.

In the example of FIG. 43B, the excitation beam 80 independent of the object beam 6 and the reference beam 71 is emitted from the upper or lower side of medium 130. However, as shown in FIG. 44 (sectional view corresponding to FIG. 43B), the excitation beam 80 may be superimposed on one or both of the object beam 6 and the reference beam 71. Also in this case, the same effects can be obtained. In another variation, an excitation beam may be input from an end face of a core layer, so that the excitation beam is incident on the storage layer by using a diffracted beam emitted from a diffraction grating layer. These variations are also applicable to the following relevant embodiments.

Also in the present embodiment, a reflection hologram can be formed by employing a method similar to that explained in the thirteenth embodiment.

Also in the present embodiment, similar to the thirteenth embodiment, a single piece of data may be divided into a plurality of data portions in advance, and each data portion is stored as a hologram in a different small area of the storage layer 4, which corresponds to a different divided area 131 of the medium 130. This variation is also applicable to a relevant embodiment (i.e., having a similar structure) explained below.

In order to selectively emit the object beam 6, the reference beam 71, and the excitation beam 80 only to a small area of the storage layer 4, which corresponds to the area 132 of the medium 130, a spatial optical selector (not shown in the present embodiment) having a suitable opening may be provided for one or all of the object beam 6, the reference beam 71, and the excitation beam 80.

FIFTEENTH EMBODIMENT

Figure 45A:
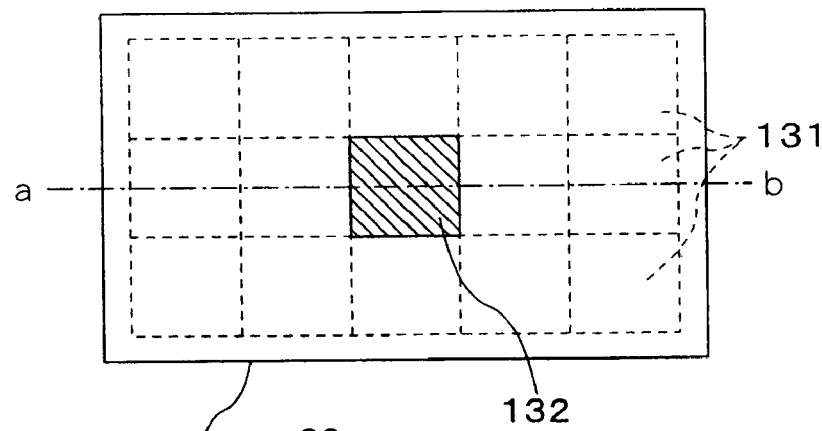
FIGS. 45A and 45B are diagrams for explaining a holographic storage method as the fifteenth embodiment of the present invention.

A holographic storage method as the fifteenth embodiment of the present invention will be explained by referring to FIG. 45A (top view) and FIG. 45B (sectional view along line "a-b" in FIG. 45A). In comparison with the fourteenth embodiment, the present embodiment has a distinctive feature of using a reference beam 72 instead of the reference beam 71 in FIG. 43B. In addition, reference numerals 73 and 74 respectively indicate a transmitted beam through the core layer 1 and a diffracted beam produced from the transmitted beam 73 by the diffraction grating layer 3.

Also in this embodiment, similar to the fourteenth embodiment, the optical storage material, of which the storage layer 4 is made, should be excited by an excitation beam 80 so as to store data in the storage layer 4 by using the object beam 6 and the reference beam 72, where the wavelength of the excitation beam 80 differs from that of the object beam 6 and the reference beam 72.

In the present embodiment, the object beam 6 and the excitation beam 80 are emitted to only a small area of the storage layer 4, which corresponds to a target area 132 among the divided areas 131 of the medium 130, from the upper or lower side of the medium 130, and simultaneously, the reference beam 72 is input from an end face of a core layer 1 so as to transmit a transmitted beam 73 through the core layer 1 and emit a specific diffracted beam 74 produced from the transmitted beam 73 by the diffraction grating layer 3. Accordingly, data is stored as a hologram.

According to the above method, a plurality of different data can be stored in different small areas of the storage layer 4, which correspond to different areas 131 of the medium 130, thereby improving the storage capacity of the medium 130.

In the above process, the object beam 6 is set by the same method as that employed in the thirteenth embodiment; therefore, also in the present embodiment, effects similar to those obtained by the storage method of the thirteenth embodiment can be obtained.

The diffracted beam 74 has any desired wavefront in the storage layer 4 by suitably designing the diffraction grating layer 3. For example, it is possible to produce a diffracted beam having a uniform wavefront with respect to the entire diffraction grating layer 3 (e.g., a parallel. diverging, or converging beam), or to produce a different diffracted beam assigned to a different portion of the diffraction grating layer 3. It is also possible to produce a diffracted beam at a portion of the diffraction grating layer 3 and produce no diffracted beam at the other portion of the diffraction grating layer 3.

If each diffraction grating layer 3 is designed so as to produce a uniform parallel beam from the entire layer in a manner such that each parallel beam has a different emission angle, then holographic storage and retrieval corresponding to a conventional multiple-angle volume holography can be performed.

If each diffraction grating layer 3 is designed so as to produce a single converging beam or a plurality of converging beams which are converged onto different positions, wherein the convergence positions of the beams from the different diffraction grating layers 3 do not overlap with each other. In this case, holographic storage and retrieval corresponding to a conventional multiple-shift volume holography can be performed.

If each diffraction grating layer 3 is designed so as to produce a beam whose wavefront has a phase distribution, in a manner such that the phase distributions of the wavefronts of the beams produced from the diffraction grating layers 3 are perpendicular to each other. In this case, holographic storage and retrieval corresponding to a conventional multiple-phase volume holography can be performed.

In either case, the holographic storage and retrieval method according to the present invention is effective.

Figure 45B:
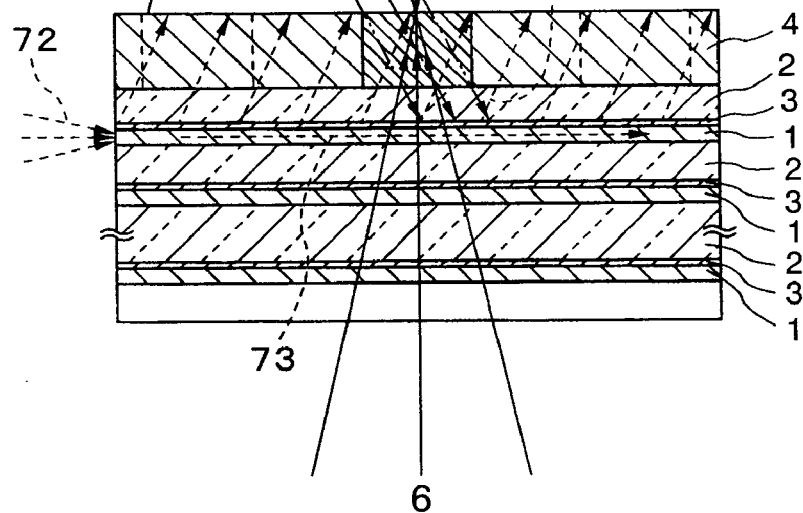

In the example shown in FIG. 45B, the excitation beam 80 is independent of the object beam 6 and the reference beam 72 and is incident from the upper or lower side of the medium 130. However, similar to the example shown in FIG. 44, the excitation beam 80 may be superimposed on the object beam 6, and similar effects can be obtained also in this case.

Also in the example shown in FIG. 45B, the object beam 6 and the diffracted beam 74 are incident from the same side of the storage layer 4 of the medium 130, so as to make a transmission hologram. However, also in the present embodiment, the object beam 6 may be incident from a side (of the medium 130) opposite to the side from which the diffracted beam 74 is incident, so as to make a reflection hologram.

In order to selectively emit the object beam 6 and the excitation beam 80 only to a small area of the storage layer 4, which corresponds to the area 132 of the medium 130, a spatial optical selector (not shown in the present embodiment) having a suitable opening may be provided for one or both of the object beam 6 and the excitation beam 80.

Additionally, in order to reduce effects of reflection which are produced when the diffracted beam 74 (diffracted by the diffraction grating layer 3) is reflected by a surface of the medium 130, it is effective to coat one or both of the upper and lower surfaces of the medium 130 with a nonreflective film. This variation is also effective in another embodiment having a similar structure, which will be explained below.

SIXTEENTH EMBODIMENT

FIGS. 46A to 49C are diagrams for explaining a holographic retrieval method as the sixteenth embodiment of the present invention. In the figures, parts identical to those in FIGS. 40A and after are given identical reference numerals, and explanations thereof are omitted. Reference numeral 14 indicates a spatial optical selector, reference numeral 101 indicates an opening of the spatial optical selector, and reference numeral 9 indicates a retrieved beam.

First, the retrieval method of the present embodiment will be explained with reference to FIGS. 46A to 47. FIGS. 46A and 46B are top views, and FIG. 46C is a sectional view along line "a-b" in FIG. 46B.

In order to retrieve a hologram which is stored in a holographic medium by using any method explained in the thirteenth to fifteenth methods, a method shown by FIG. 46C is used. That is, a reference beam 72 is input from an end face of a core layer 1 so as to transmit a transmitted beam 73 through the core layer, so that a diffracted beam 74, specific to a diffraction grating layer 3 through which the transmitted beam 73 passes, is emitted onto a partial area of the storage layer 4, which corresponds to one or more areas (which include the area 132 where data is stored) among the divided areas 131 of the medium 130.

Therefore, if the data is stored using a method as explained in the fifteenth embodiment, the same diffracted beam 74 used in the storage process is emitted onto the area 132 of the storage layer 4. If data is stored using a method as explained in the thirteenth or fourteenth embodiment, the wavefront of the diffracted beam 74 emitted onto the area 132 in the storage layer 4 is the same as the wavefront (in the storage layer 4) of the reference beam 71 used in the storage process. Therefore, in either case, the hologram is retrieved and a retrieved beam 7 can be obtained.

Figure 47:
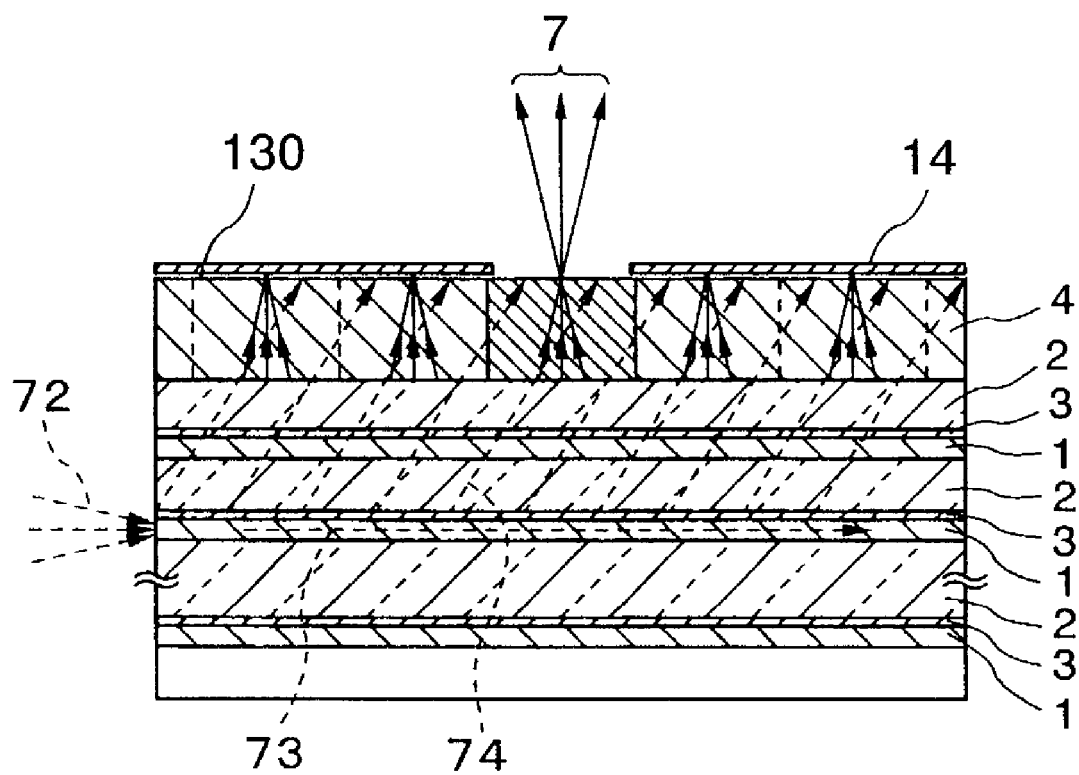
FIG. 47 is a diagram for explaining an example for retrieving a transmission hologram in the sixteenth embodiment.

In addition, if a reference beam 72 is input from another end face of a core layer 1, as shown in FIG. 47 (a sectional view corresponding to FIG. 46C), then a diffracted beam 74, which differs from the above-explained diffracted beam 74, is emitted and another hologram is retrieved, thereby obtaining another retrieved beam 7.

The retrieved beam emitted from the medium 130 consists of superimposed retrieved beam(s) of hologram(s) stored in one or more areas which receive the retrieved beam 74. In order to extract only a desired retrieved beam 7 among the superimposed retrieved beams, a spatial optical selector 14 is provided in the vicinity of the medium 130 (see FIGS. 46A to 47) in a manner such that an opening 101 of the spatial optical selector 14 faces only the target area 132 for data retrieval. Accordingly, only a retrieved beam 7, which carries the data stored in the area 132, can be selectively retrieved.

Figure 48A:
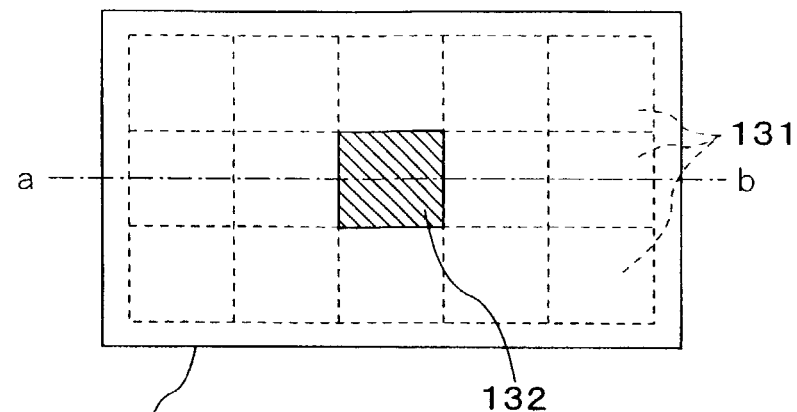
FIGS. 48A to 48C are diagrams for explaining an example for retrieving a reflection hologram in the sixteenth embodiment.
Figure 48B:
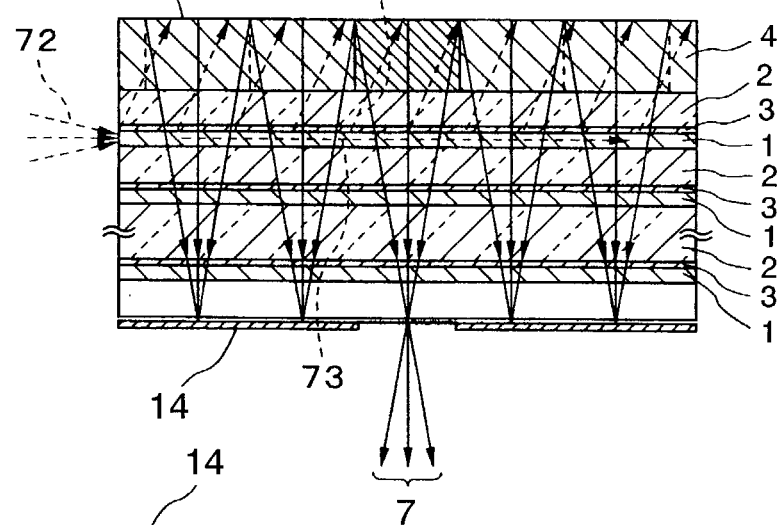
Figure 48C:
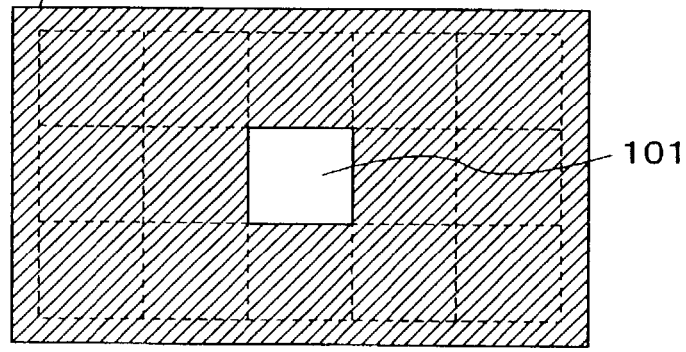

FIGS. 46A to 47 show an example of retrieving a transmission hologram by providing a spatial optical selector 14 at the upper side of the medium 130. However, as shown in FIGS. 48A to 48C (FIG. 48A is a top view, FIG. 48B is a sectional view along line "a-b" in FIG. 48A, and FIG. 48C is a bottom view), a spatial optical selector 14 may be provided at the lower side of the medium 130 so as to make a reflection hologram.

In order to retrieve a piece of data which was divided into a plurality of data portions and stored in a medium (see FIG. 42A), a spatial optical selector 14 is provided in the vicinity of the medium 130 (see FIGS. 49A to 49C which correspond to FIGS. 46A to 46C) in a manner such that openings 101 of the spatial optical selector 14 only face the target areas 133 from which data are retrieved.

The wavefront of the diffracted beam 74 in the storage layer 4 can have any shape by suitably designing the diffraction grating layer 3, and a multiple hologram formed by any method can be stored and retrieved by employing a suitable structure of the diffraction grating layer 3, as explained in the fifteenth embodiment.

Additionally, in order to prevent an unnecessary diffracted beam 74 (other than the diffracted beam 74 emitted onto the target area 132) from being incident on a photodetector for detecting retrieved data, the following structure and method are effective. That is, according to the necessity, a target area in the diffraction grating layer 3, from which a diffracted beam 74 emitted onto the target area 132 of the storage layer 4 is output, may have a peripheral area from which no diffracted beam 74 is emitted, and as for an area adjacent to the area 132 in the storage layer 4, the reference beam 72 is input from a different core layer 1, so as to emit a diffracted beam 74 from another diffraction grating layer 3.

In order to execute the above method, small areas arranged in a stripe-shaped or checkered pattern for emitting diffracted beams 74 are provided in each diffraction grating layer 3, and such a pattern is arranged in a manner such that the relationship between the areas for emitting diffracted beams 74 and the other areas is alternately reversed in a series of the diffraction grating layers 3 in the stacking direction.

The spatial optical selector (14) employable in any embodiment according to the present invention may be a mask having an opening whose position is fixed. Such a mask may be two-dimensionally moved. A mask using a liquid crystal panel may also be used. In this case, the number of openings, the size of each opening, or the position of each opening can be electrically changed.

SEVENTEENTH EMBODIMENT

Figures 50A, 50B, 50C:
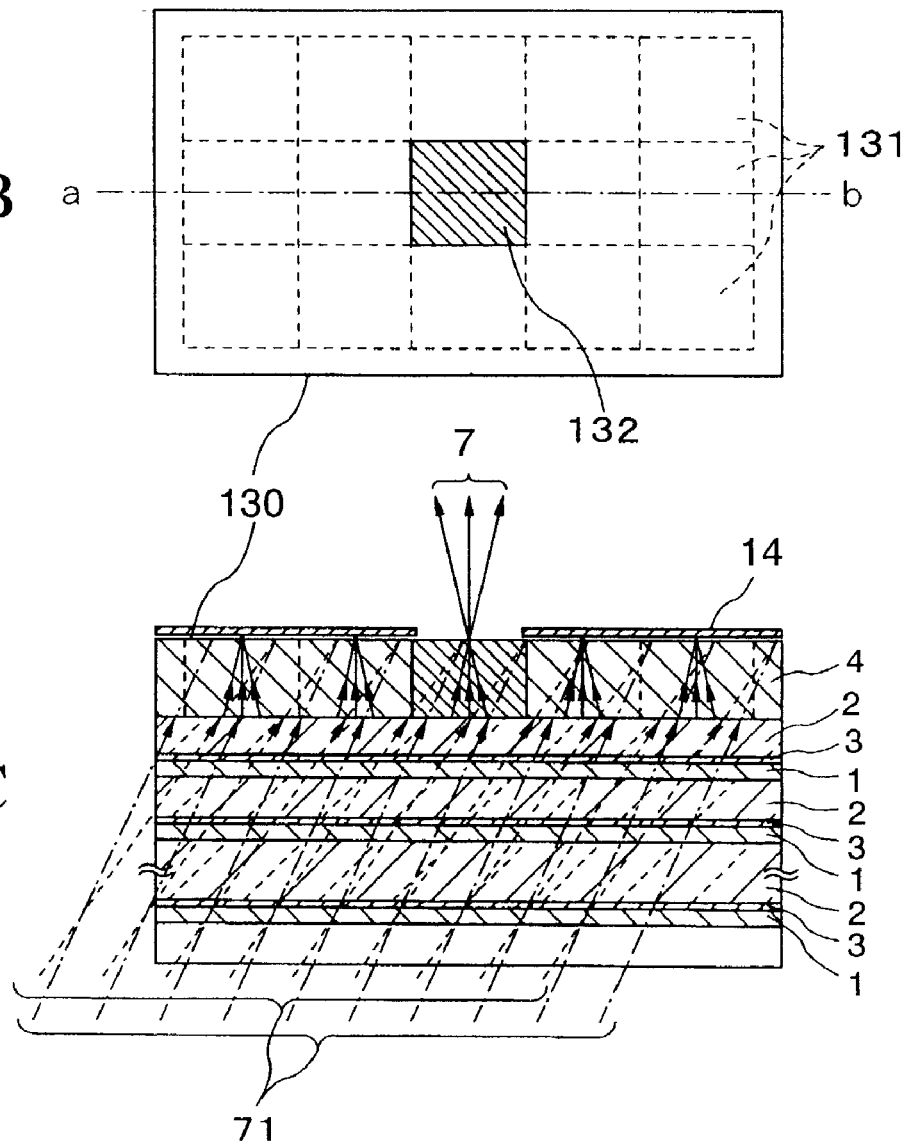
FIGS. 50A to 50C are diagrams for explaining a holographic retrieval method as the seventeenth embodiment of the present invention, which show an example for retrieving non-divided data.

FIGS. 50A to 51C are diagrams for explaining a holographic retrieval method as the seventeenth embodiment of the present invention. In these figures, the distinctive feature in comparison with the sixteenth embodiment is to use a reference beam 71 instead of the reference beam 72 in FIG. 46C. That is, as shown in FIGS. 50A to 50C (which correspond to FIGS. 46A to 46C), the reference beam 71 (instead of the reference beam 72) is emitted onto small target areas of the storage layer 4, which correspond to one or more (including the target area 132) of the divided areas 131 of the medium 130, from the upper or lower side of the medium, so as to retrieve the hologram and obtain a retrieved beam 7. The setting of the reference beam 71 is performed by the same method used in the thirteenth embodiment.

The retrieved beam emitted from the medium 130 consists of superimposed retrieved beams of holograms which are stored in one or more small areas (of the storage layer 4) to which the reference beam is emitted. In order to extract only a desired retrieved beam 7, a spatial optical selector 14 is provided in the vicinity of the medium 130 (see FIGS. 50A to 50C) in a manner such that an opening 101 of the spatial optical selector 14 faces only the target area 132. Accordingly, only a retrieved beam 7 which carries data stored in the area 132 can be selectively retrieved.

In order to retrieve data which are divided into a plurality of data portions and stored in a plurality of small areas (refer to FIG. 42A), a spatial optical selector 14 is provided in the vicinity of the medium 130 (see FIGS. 51A to 51C which correspond to FIGS. 50A to 50C) in a manner such that openings 101 of the spatial optical selector 14 face only the target areas 133 from which the data portions are retrieved.

EIGHTEENTH EMBODIMENT

FIGS. 52A to 53B are diagrams for explaining a holographic retrieval method as the eighteenth embodiment of the present invention. The distinctive feature of the present embodiment in comparison with the seventeenth embodiment is to omit a spatial optical selector 14 and set the reference beam 71 as explained in the thirteenth embodiment.

Figure 52A:
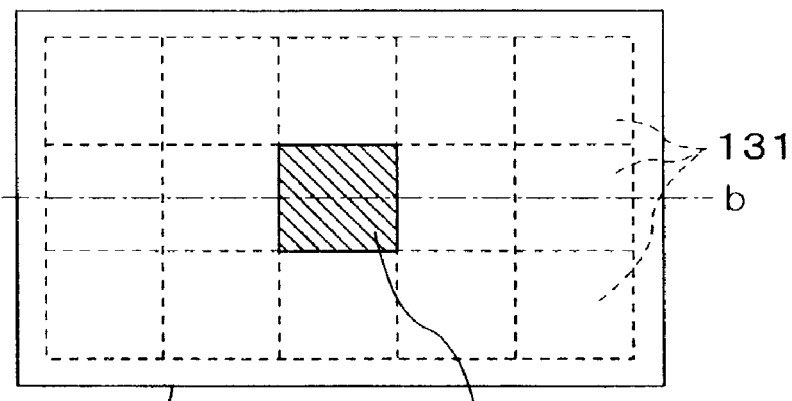
FIGS. 52A and 52B are diagrams for explaining a holographic retrieval method as the eighteenth embodiment of the present invention, which show an example for retrieving non-divided data.

That is, in order to retrieve data which is stored in a holographic medium by any storage method in the thirteenth to fifteenth embodiments, a holographic retrieval method as shown in FIGS. 52A (top view) and 52B (sectional view along line "a-b" in FIG. 52A) is used. That is, a reference beam 71 is emitted from the upper or lower side of the medium, only to small areas in the storage layer 4, which correspond to one or more target areas 132 among the divided areas 131 of the medium 130, so as to retrieve the hologram and obtain a retrieved beam 7 which carries only the data stored in said one or more areas 132.

In the present embodiment, it is not indispensable to provide a spatial optical selector at a side of the medium 130 at which the reference beam 7 is emitted; however, a spatial optical selector 14 having an opening 101 similar to that used in the sixteenth or seventeenth embodiment may be employed also in the present embodiment.

Figure 52B:
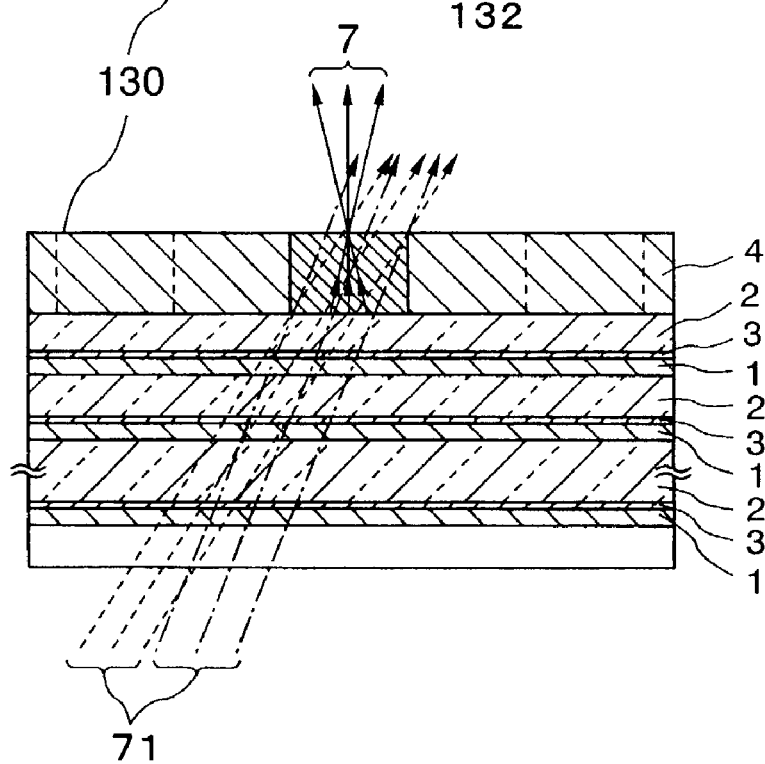
Figure 53A:
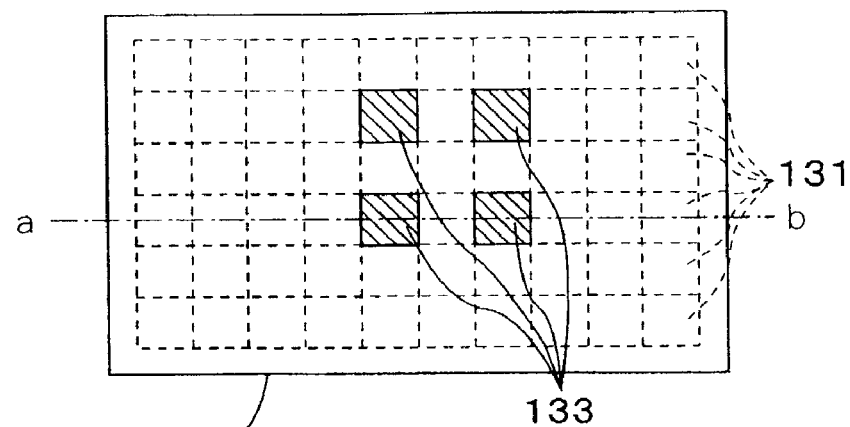
FIGS. 53A and 53B are diagrams for explaining an example for simultaneously retrieving divided data in the eighteenth embodiment.
Figure 53B:
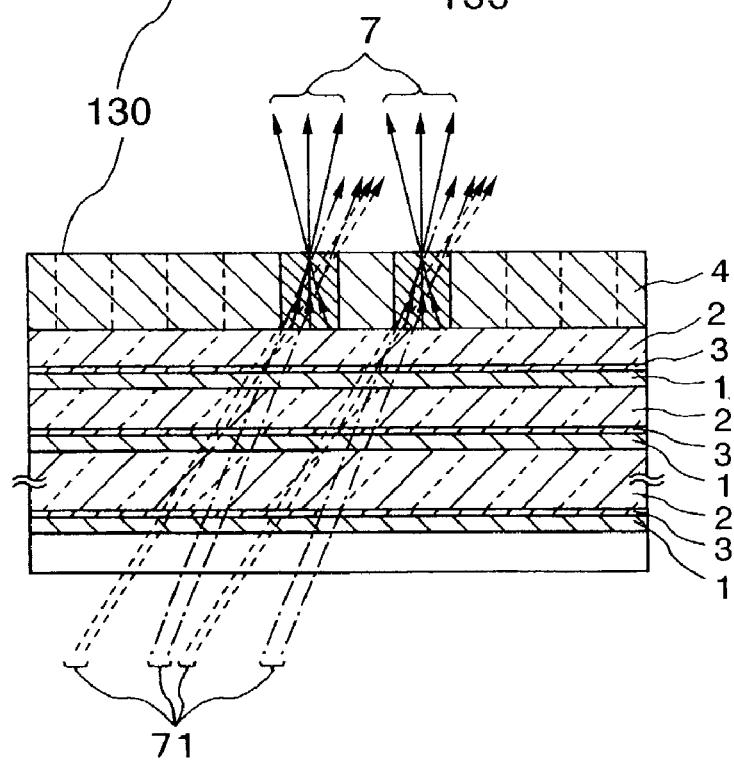

In order to retrieve data which are divided into a plurality of data portions and stored, a method as shown in FIGS. 53A and 53B (which correspond to FIGS. 52A and 52B) is performed, in which a reference beam 71 is emitted from the upper or lower side of the medium to only the target areas 133 from which a desired retrieved beam 71 is retrieved.

Additionally, in order to emit the reference beam 71 to only a small target area of the storage layer 4 which corresponds to the target area 132 of the medium 130, a spatial optical selector having a suitable opening (not shown in the present embodiment) may be provided for the reference beam 71.

The above-explained FIGS. 52B and 53B show examples of retrieving a transmission hologram by emitting the reference beam 71 from the lower side of the storage layer 4 of the medium 130. However, a reflection hologram can also be retrieved by emitting a reference beam 71 from the upper side of the storage layer 4 of the medium 130.

NINETEENTH EMBODIMENT

FIGS. 54 to 57 show examples of the holographic storage system for executing the holographic storage method as explained in the thirteenth embodiment.

In FIGS. 54 to 57, reference numeral 130 indicates a holographic medium 130 having a structure as explained in the thirteenth embodiment, reference numeral 6 indicates an object beam as the first beam, reference numeral 71 indicates a reference beam as the second beam, reference numeral 141 indicates a light source for emitting the object and reference beams, reference numerals 151 and 152 indicate polarization controllers, reference numeral 161 indicates a beam splitter, reference numeral 170 indicates a beam shutter, reference numerals 181 and 182 indicate reflectors, reference numeral 20 indicates a beam expander, reference numeral 21 indicates a spatial light intensity modulator, reference numeral 22 indicates an imaging device, reference numeral 30 indicates a spatial optical phase modulator, and reference numeral 331 indicates a condenser.

Each of the polarization controllers 151 and 152 is a device for rotating the polarization plane of a light beam and may be a half-wave plate or the like.

The beam splitter is a device for splitting a light beam into two beams in different directions and may be a half mirror, any kind of beam splitter, or the like.

The spatial light intensity modulator 21 is a device for displaying data to be stored in the medium 130 and may be a liquid crystal panel, a DMD (digital micromirror device), or the like.

The imaging device 22 has an optical system for imaging the object beam 6 via the medium 130 onto the position of a photodetector used in a retrieval system, that is, onto the imaging plane in each figure, and may be a single lens or a composite lens.

First, with reference to FIG. 54, the holographic storage system according to the present embodiment will be explained.

A light beam output from the light source 141 is split into two beams by the beam splitter 161, and these split beams are respectively controlled by the polarization controllers 151 and 152 so as to have a polarization state suitable for holographic storage. One of the split beams is reflected by the reflector 181 and then expanded by the beam expander 20 so as to obtain a desired beam width. Data to be stored in the medium 130 is then provided to the expanded beam by the spatial light intensity modulator 21, thereby obtaining the object beam 6 via the imaging device 22. The other of the split beams is reflected by the reflector 182 and functions as the reference beam 71.

The object beam 6 can be emitted from the upper or lower side of the medium 130, to only a small area of the storage layer 4, which corresponds to the target area 132 of the medium 130, by controlling the relative position of the medium 130. The reference beam 71 can also be emitted from the upper or lower side of the medium 130, at a desired angle to only a small area of the storage layer 4, which corresponds to the target area 132 of the medium 130, by controlling the angle and position of the reflector 182 and the relative position of the medium 130.

The principle and effects of the holographic storage in the present example and the following relevant embodiments are the same as those explained in the thirteenth embodiment.

Figure 54:
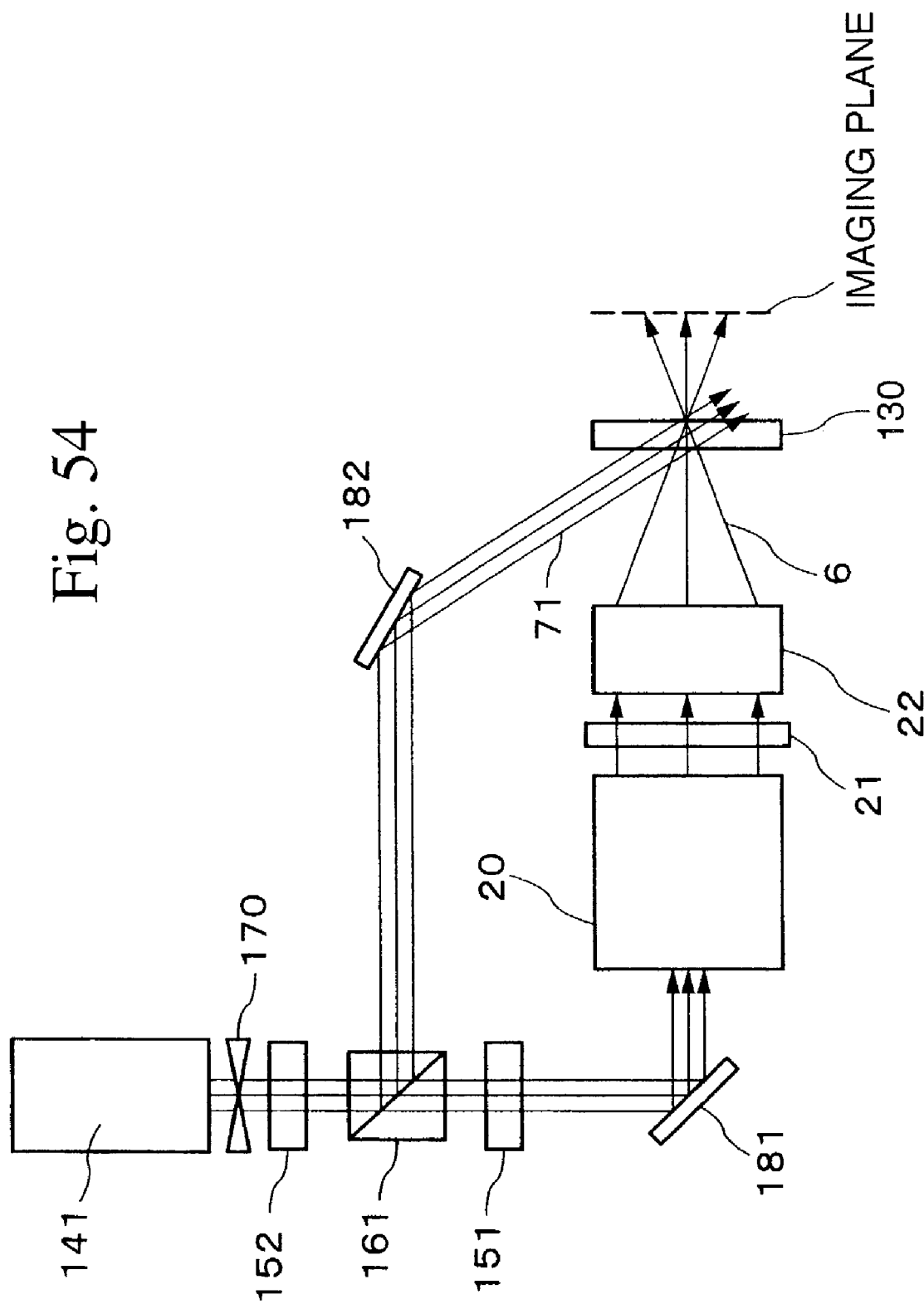
FIG. 54 is a diagram showing a holographic storage system as the nineteenth embodiment of the present invention, which shows an example for storing a transmission hologram.

In FIG. 54, the reference beam 71 is a parallel beam, and the incident angle to the medium 130 can be changed by controlling the angle and position of the reflector 182; thus, holographic storage and retrieval corresponding to the conventional multiple-angle volume holographic method can be performed. Therefore, in the present embodiment, each of the diffraction grating layers 3 in the medium 130 may be designed so as to emit a parallel beam, where each parallel beam from each diffraction grating layer has a different emission angle.

Figure 55:
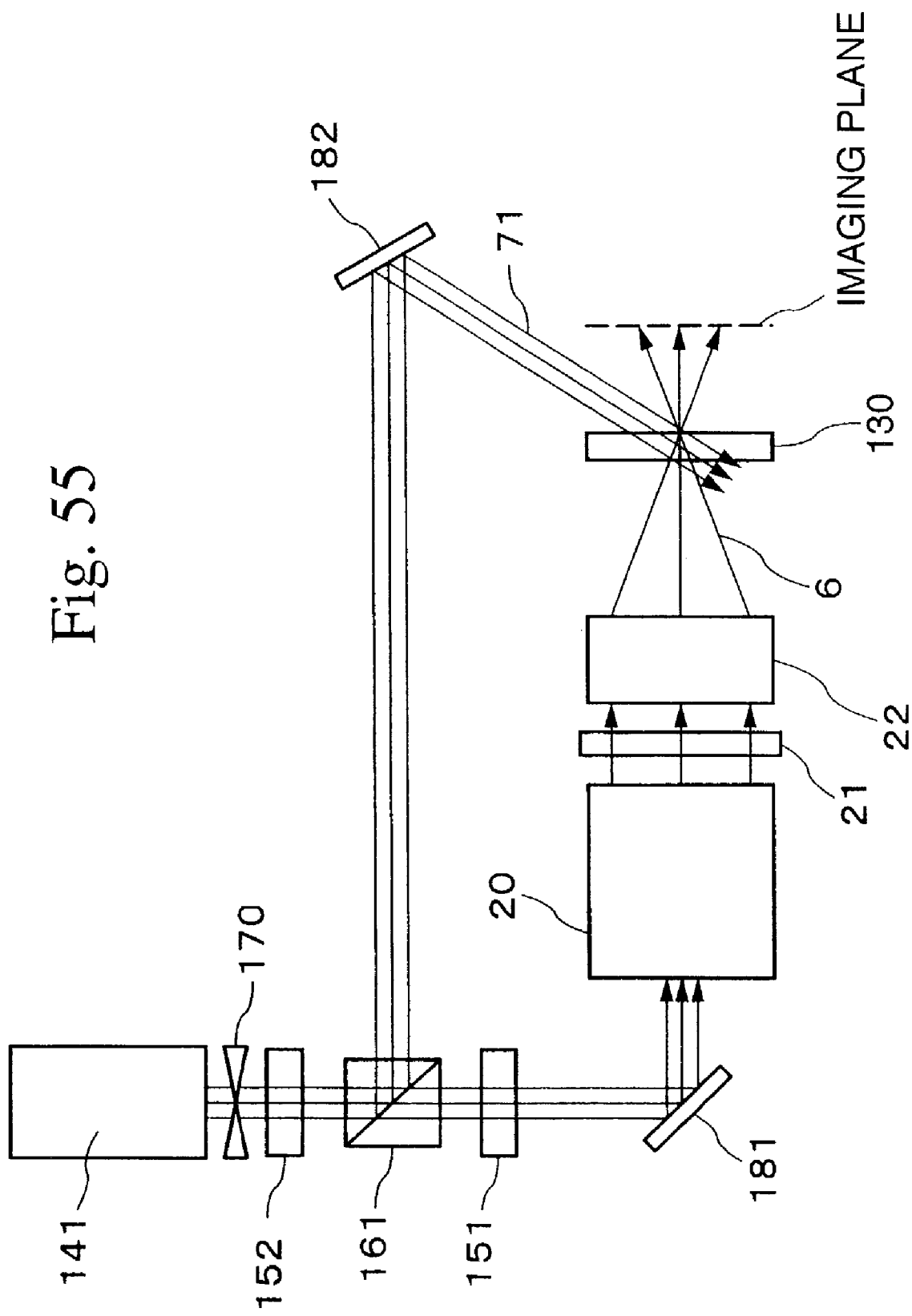
FIG. 55 is a diagram showing an example structure for storing a reflection hologram in the nineteenth embodiment.

FIG. 54 shows an example for storing a transmission hologram by emitting the object beam 6 from the same side (of the storage layer 4 of the medium 130) as that of the reference beam 71. However, as shown in FIG. 55, a reflection hologram can be stored by emitting the object beam 6 from the side (of the storage layer 4 of the medium 130) opposite to the side from which the reference beam 71 is emitted.

Next, another example of the holographic storage system will be explained with reference to FIG. 56.

This example has the same structure as that shown in FIG. 54, except for (i) converting the wavefront of the reference beam 71 by using a condenser 331, and (ii) making the object beam 6 and the reference beam 71 emittable to a desirable area (inside the target area 132 of the medium 130) of the storage layer 4. The condenser 331 is a device for transforming the reference beam 71 into a converging beam and is a single lens, a composite lens, or the like.

In this example, it is possible to perform holographic storage and retrieval corresponding to the conventional multiple-shift volume holography. Therefore, the diffraction grating layer 3 in the medium 130 in the present example may be designed in a manner such that a single converging beam or a plurality of converging beams which converge on different positions are emitted from each diffraction grating layer 3, wherein the convergence positions of the beams from the different diffraction grating layers 3 do not overlap with each other.

Further, another example of the holographic storage system will be explained with reference to FIG. 57. This example has the same structure as that shown in FIG. 54, except for converging the wavefront of the reference beam 71 by using a spatial optical phase modulator 30. The spatial optical phase modulator 30 is a device for modulating the reference beam 71 so as to obtain a wavefront having a specific phase distribution. This device is a liquid crystal panel, a phase plate using a transparent dielectric, or the like. Also in this example, the principle and effects of the storage process are the same as those of the thirteenth embodiment.

When an electric signal, an optical signal, or the like is applied from an external device to the liquid crystal panel, the phase distribution of the wavefront of a beam transmitted through or reflected by the panel can be actively modulated.

The phase plate is obtained by providing a fine concavo-convex pattern by etching, vacuum evaporation, or the like, on a surface of a transparent dielectric plate made of glass or the like. The wavefront of a beam transmitted through the phase plate has a phase distribution depending on the pattern. Therefore, in order to change the phase distribution of the wavefront of the transmitted beam in various ways, a plurality of phase plates having different patterns are prepared in advance, and they are used in turn. If a phase plate having different patterns at different positions is used, the phase plate is shifted so as to change the position through which the beam is transmitted, thereby changing the phase distribution of the wavefront of the transmitted beam in various ways.

Figure 58:
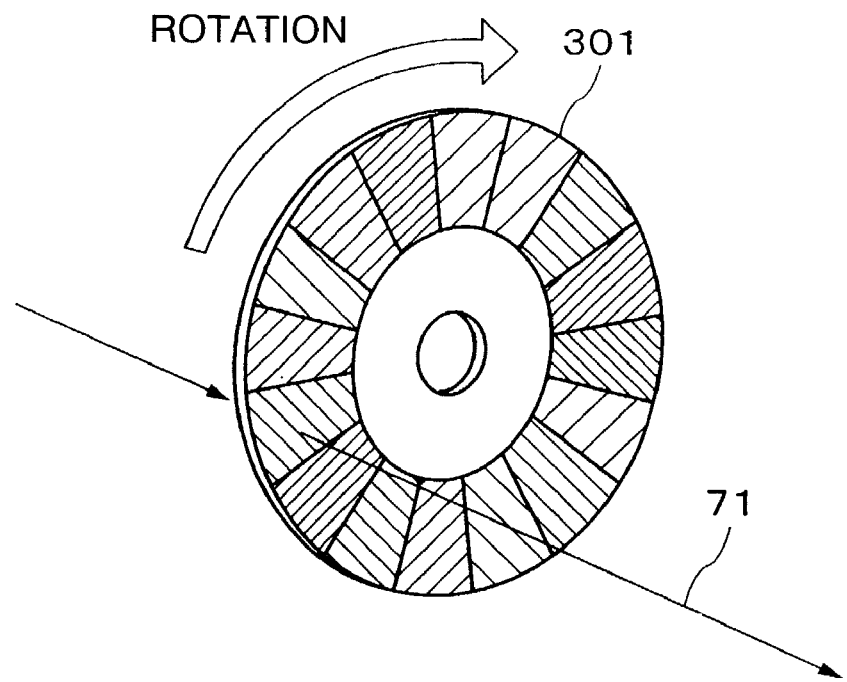
FIG. 58 is a diagram for explaining an example of a spatial optical phase modulator using a phase plate.

FIG. 58 shows an example of the spatial optical phase modulator using a phase plate. The shown phase plate 301 has different patterns on a circular transparent dielectric plate. The phase distribution of the wavefront of a beam transmitted through the phase plate 301 can be changed in various ways by rotating the phase plate 301. According to this structure, a very high-speed spatial optical phase modulator can be easily realized by rotating the phase plate at high speed.

Figure 59:
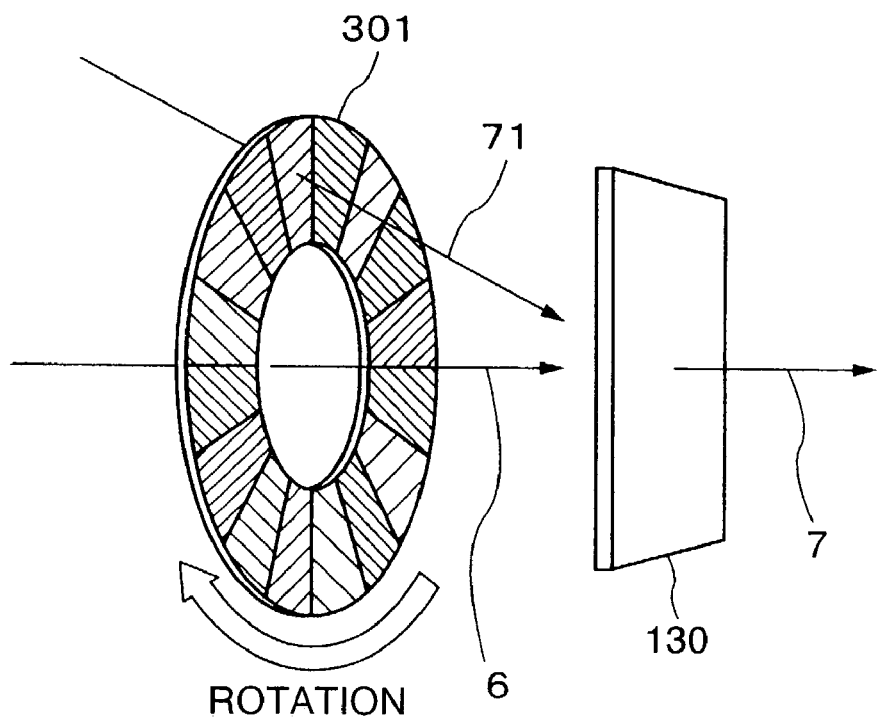
FIG. 59 is a diagram for explaining an example of the system structure employing a spatial optical phase modulator which uses a phase plate.

FIG. 59 shows a partial structure of a system using a phase plate as shown in FIG. 58. According to such a structure in which the phase plate 301 is rotated around the object beam 6, the system size can be reduced.

According to the present example, it is possible to perform holographic storage and retrieval corresponding to the conventional multiple-phase volume holography. Therefore, each diffraction grating layer 3 in the medium 130 of this example may be designed so as to produce a light beam having a phase distribution, wherein the phase distributions of the wavefronts of the beams produced from the diffraction grating layers 3 of the medium are perpendicular to each other.

Figure 56:
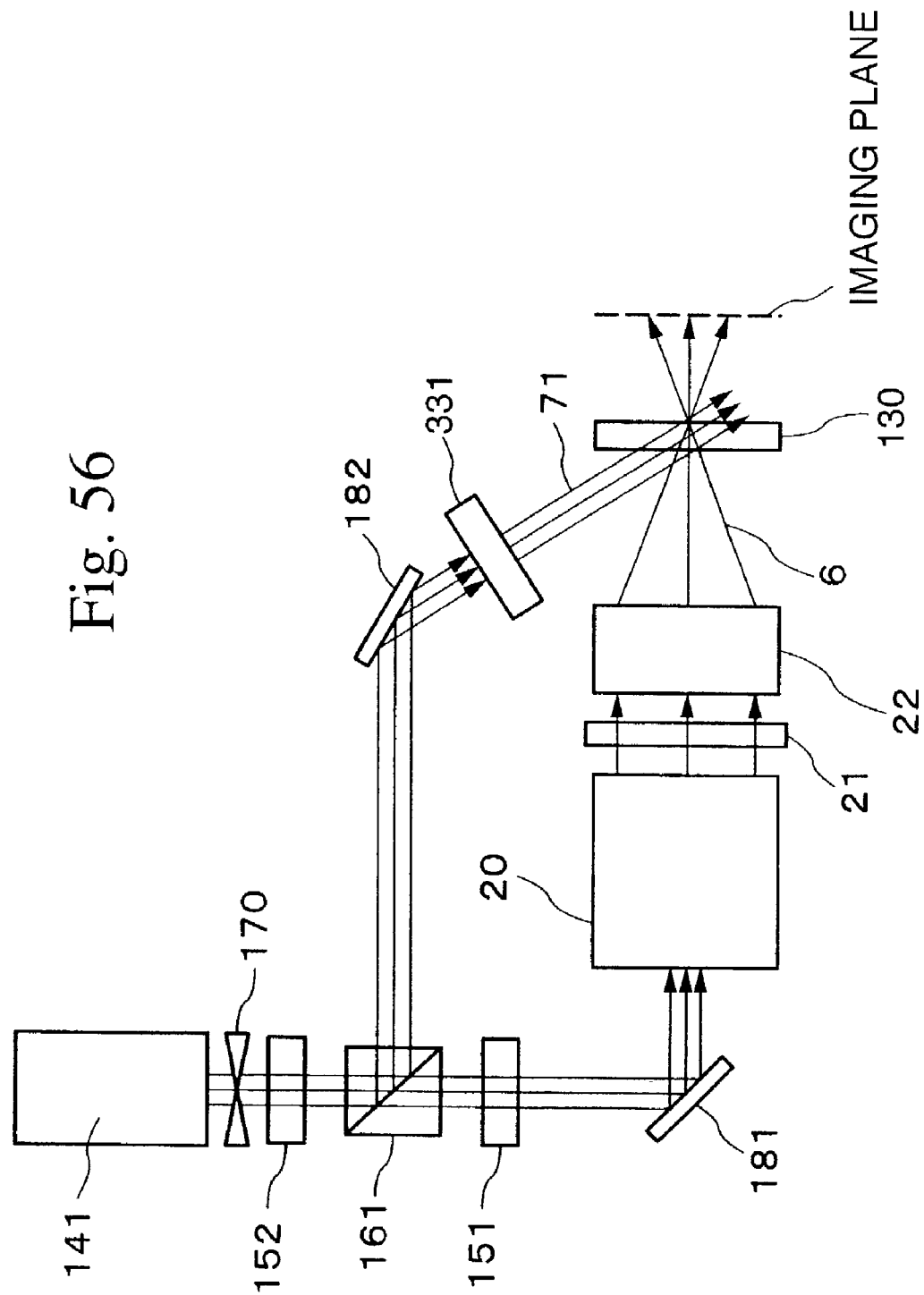
FIG. 56 is a diagram showing an example structure for performing multiple-shift storage in the nineteenth embodiment.
Figure 57:
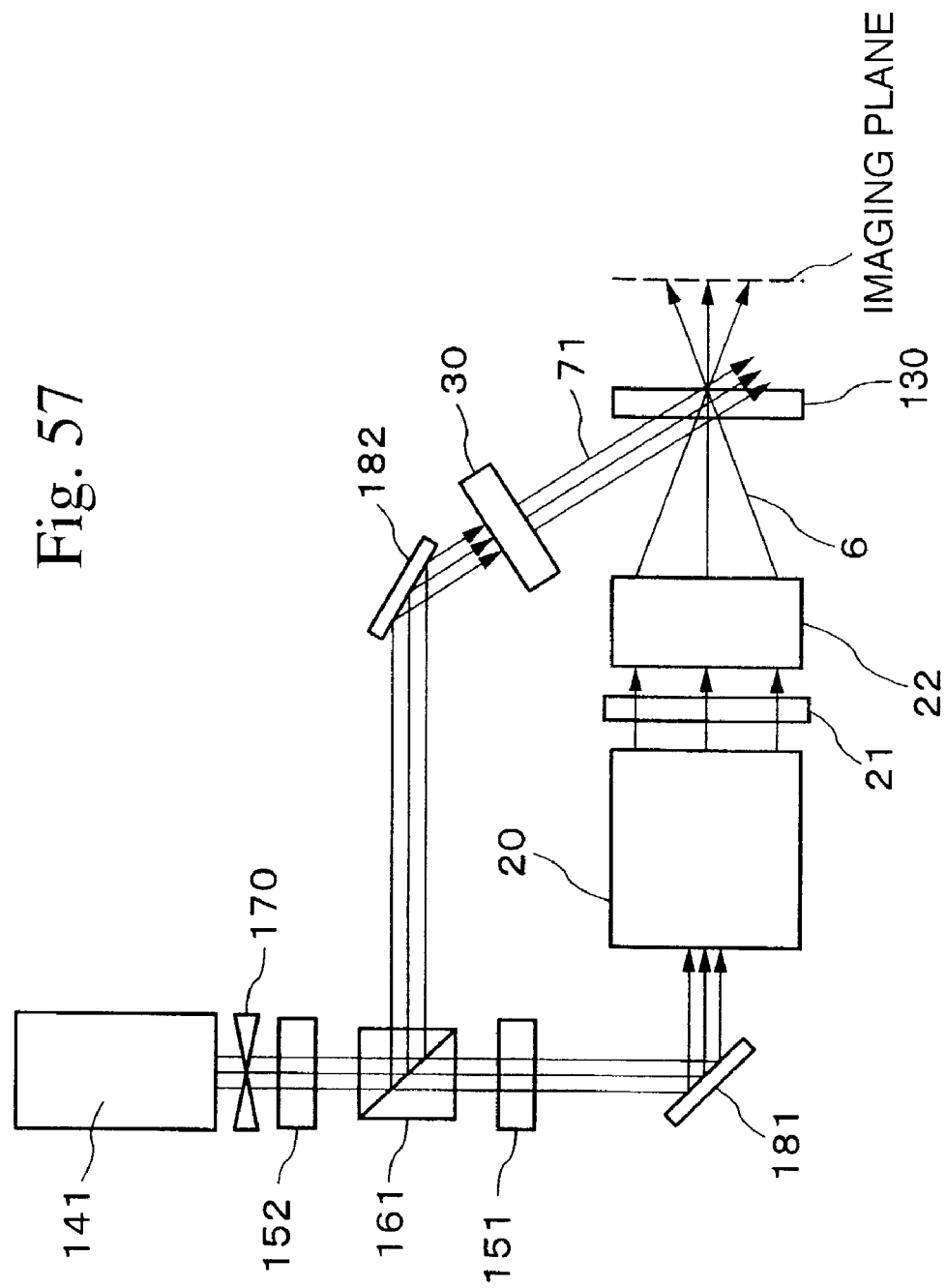
FIG. 57 is a diagram showing an example structure for performing multiple-phase storage in the nineteenth embodiment.

As for the structures shown in FIGS. 56 and 57, the storage of a reflection hologram can be performed by a similar method explained by referring to FIGS. 54 and 55. A similar method can also be applied to the following embodiments having a relevant structure.

Additionally, in the present and following embodiments (which have a relevant structure), it is possible to divide a single piece of data into a plurality of data portions in advance and to respectively store these data portions as holograms in different small areas of the storage layer 4, among the divided areas 131 of the medium 130 (i.e., similar to the thirteenth embodiment).

In order to emit the object beam 6 and the reference beam 71 to only the target area 132 of the storage layer 4, a spatial optical selector (not shown in the present embodiment) having a suitable opening may be provided to one or both of the object beam 6 and the reference beam 71.

As a concrete example, the medium 130 may have a card, chip, disk, tape, or drum shape or the like. In either shape, the method according to the present invention can be applied and similar effects can be obtained.

The above variations of the present embodiment can also be applied to the following embodiments having a similar structure.

TWENTIETH EMBODIMENT

FIG. 60 shows the second example of the storage system, which is provided for implementing the storage method explained in the thirteenth embodiment.

This example has the same structure as that shown in FIG. 54, except for imaging the medium 130 onto the position of a photodetector used in a retrieval system via an imaging device 23, that is, onto the imaging plane in FIG. 60.

The imaging device 23 is a single lens, a composite lens, or the like. In storage-only devices which have no photodetector, no imaging device 23 is necessary. However, in FIG. 60, the imaging device 23 is shown for convenience of explanations.

In this example, the object beam 6 is focused or partly restricted so as to be emitted onto the medium 130, and the object beam after being transmitted through the medium 130 is expanded to be imaged on the imaging plane in FIG. 60. These functions are realized by two imaging devices 22 and 23. Therefore, in comparison with the case in which the above functions are realized using a single imaging device 22, the design of the optical system is easier.

Similar to the arrangement shown in FIG. 54, the present example can also be applied to holographic storage and retrieval corresponding to the multiple-angle volume holography. However, as explained in the nineteenth embodiment, a spatial optical phase modulator 30 or a condenser 331 may be added to the system, and the system is arranged to make the object beam 6 and the reference beam 71 emittable to a desired position in a target area of the medium 130, so that holographic storage and retrieval corresponding to multiple-phase or multiple-shift volume holography can be performed. This variation can also be applied to the following twenty-first embodiment.

TWENTY-FIRST EMBODIMENT

FIGS. 61 and 62 show the third example of the storage system, which is provided for implementing the storage method explained in the thirteenth embodiment.

This example has the same structure as that shown in FIG. 54, except for using a spatial optical phase modulator 221 as the imaging device 22. The spatial optical phase modulator 221 is a device for modulating the object beam 6 so as to provide a specific phase distribution to the wavefront of the object beam. The spatial optical phase modulator 221 may be a liquid crystal panel.

In FIG. 61, the spatial light intensity modulator 21 and the spatial optical phase modulator 221 are arranged closely together; thus, any intensity and any phase distribution can be provided to the wavefront of the object beam 6. Therefore, in comparison with the general case using a single lens or a composite lens as the imaging device 22, in the present example, the object beam 6 can be very flexibly emitted onto the medium 130 while being focused or partially restricted.

If the spatial light intensity modulator 21 and the spatial optical phase modulator 221 cannot be arranged closely together due to a limitation of the device size or the like, then as shown in FIG. 63, a so-called 4f lens system 222 may be provided between these devices so as to optically couple the devices. The 4f lens system 222 consists of two lenses having the same focal length "f", where the lenses are combined at a spacing d=2f. Each of the two lenses may be a single lens or a composite lens. Accordingly, an effect similar to that obtained when the spatial light intensity modulator 21 and the spatial optical phase modulator 221 are arranged closely together can be obtained.

Next, with reference to FIG. 62, the holographic storage system of the present example will be explained. This example has the same structure as that shown in FIG. 54, except for using a combination of the spatial optical phase modulator 221 and an imaging lens 223. The imaging lens 223 is an optical system for supporting (or assisting) the imaging function of the spatial optical phase modulator 221 and is a single lens, a composite lens, or the like.

In FIG. 62, the spatial light intensity modulator 21 and the spatial optical phase modulator 221 are arranged closely together as shown in FIG. 61, or the 4f lens system 222 is provided between the spatial light intensity modulator 21 and the spatial optical phase modulator 221 as shown in FIG. 63. Therefore, in comparison with the case using a single or composite lens as the imaging device 22, in the present example, the object beam 6 can be very flexibly emitted onto the medium 130 while being focused or partially restricted, and additionally, the imaging function of the spatial optical phase modulator 221 can be supported by the imaging lens 223. Therefore, the optical system can be easily designed.

Accordingly, in the present embodiment, the state of emission of the object beam 6 onto the medium 130 can be very flexibly defined. Therefore, it is possible to simultaneously emit object beams 6 to different areas 132 among the target areas 133 (for holographic storage) of the medium 130. Consequently, the number of repetitions of the storage operation performed for a single piece of data can be reduced, thereby increasing the storage speed.

The present embodiment shows a structure in which a single imaging device 22 is used for (i) focusing or partially restricting the object beam 6 to be emitted onto the medium 130 and (ii) expanding the object beam after transmitting the medium 130 and imaging the object beam on the imaging plane (see FIGS. 61 and 62). However, in order to easily design the optical system, an imaging device 23 may be added, as explained in the twentieth embodiment. This variation can also be applied to the following embodiments having a relevant structure.

TWENTY-SECOND EMBODIMENT

Figure 64:
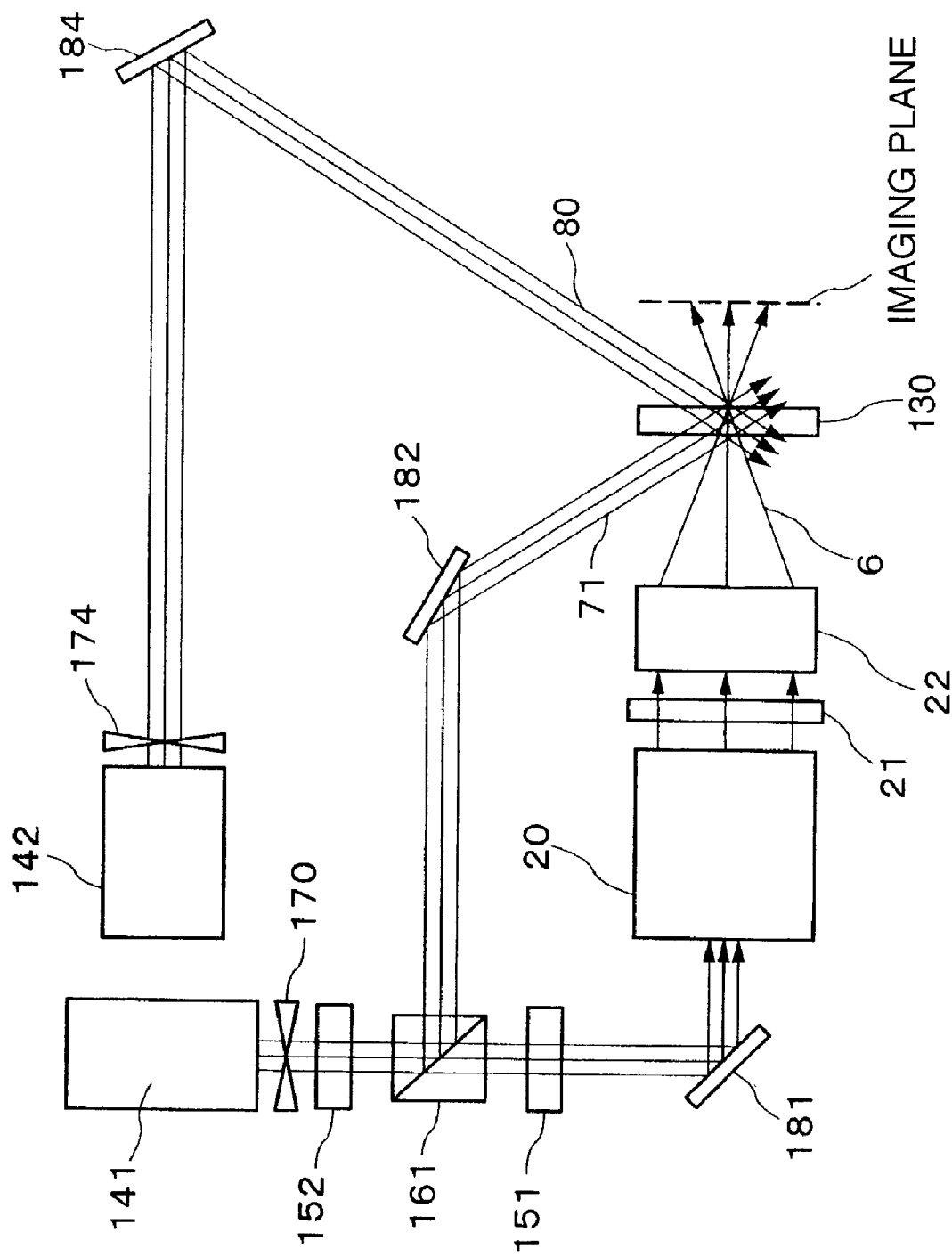
FIG. 64 is a diagram showing the structure of a holographic storage system as the twenty-second embodiment of the present invention, which shows an example for independently emitting an excitation beam.
Figure 65:
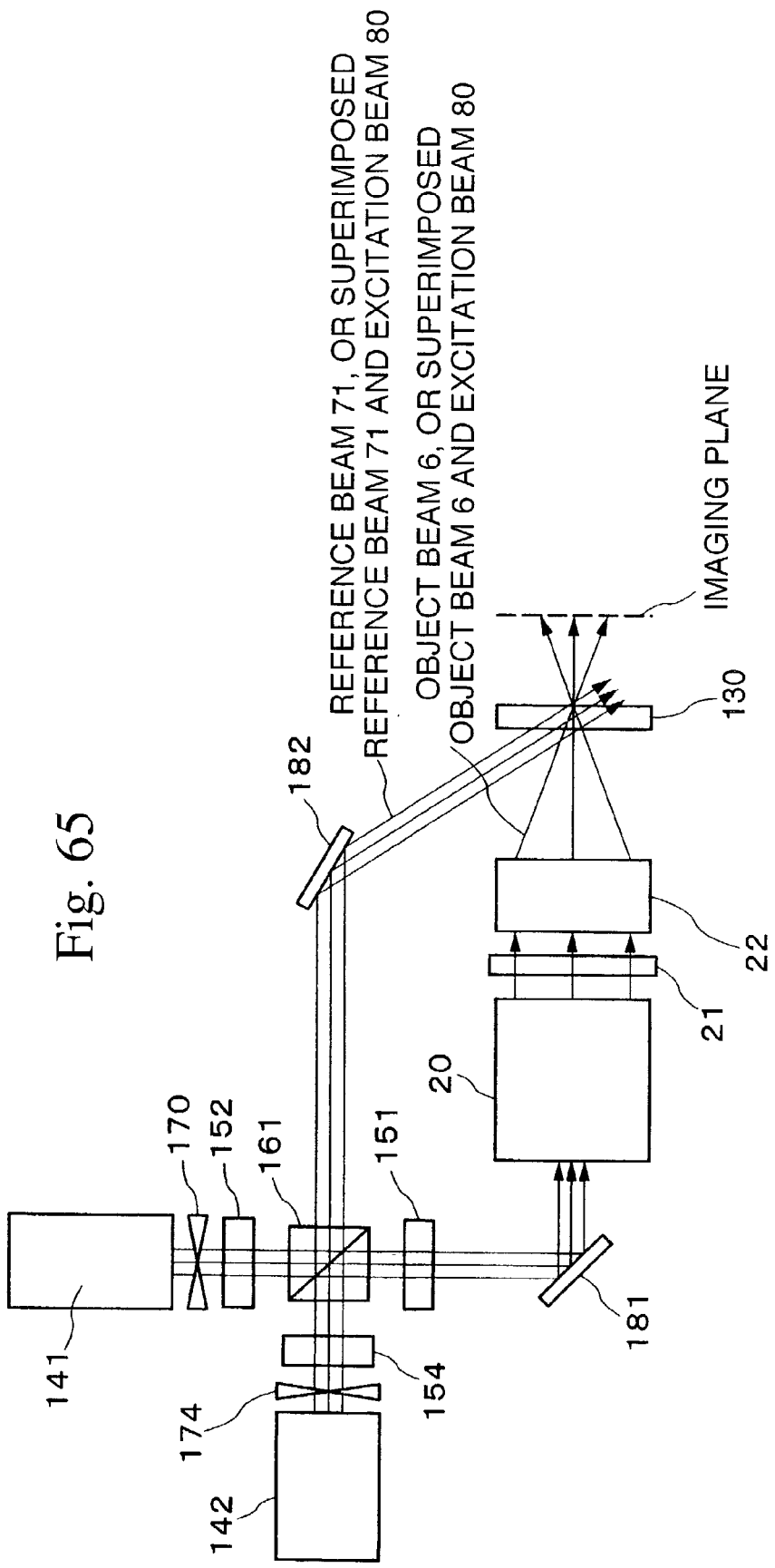
FIG. 65 is a diagram showing an example structure for emitting an excitation beam superimposed on the object beam or the reference beam in the twenty-second embodiment.

FIGS. 64 and 65 show the fourth example of the storage system, which is provided for implementing the storage method explained in the fourteenth embodiment. In the present embodiment, when data is stored, excitation using an excitation beam 80 is necessary for the optical storage material of which the storage layer 4 is made.

First, with reference to FIG. 64, the storage system of the present example will be explained. This example has the same structure as that shown in FIG. 54 except for (i) a light beam emitted from a light source 142 is reflected via a beam shutter 174 by a reflector 184 so as to produce an excitation beam 80, and (ii) the excitation beam 80 can be emitted from the upper or lower side of the medium 130 to only a small area of the storage layer 4, which corresponds to a target area 132 of the medium 130, by controlling the angle and position of the reflector 184 and the relative position of the medium 130. The principle and the effects of the storage process are similar to those of the fourteenth embodiment.

The example system in FIG. 65 has the same structure as that shown in FIG. 54, except that a light beam from a light source 142 is emitted via a beam shutter 174 and a polarization controller 154 on a beam splitter 161.

The polarization controller 154 is a device for rotating the polarization plane and may be a half-wave plate. The principle and effects of this example are also the same as those of the fourteenth embodiment.

If a polarization beam splitter is used as the beam splitter 161, the polarization plane of the beam output from the light source 142 is controlled using the polarization controller 154, so that the excitation beam 80 can be superimposed on one or both of the object beam 6 and the reference beam 71.

Similar to FIG. 54, the present embodiment shows a system arrangement for performing holographic storage and retrieval corresponding to the multiple-angle volume holography. However, as explained in the nineteenth embodiment, a spatial optical phase modulator 30 or a condenser 331 may be added and the system is arranged to make the object beam 6, the reference beam 71, and the excitation beam 80 emittable to a desired position in a target area of the medium 130. Accordingly, it is possible to perform holographic storage and retrieval corresponding to multiple-phase or multiple-shift volume holography.

Also in the present embodiment, a single or composite lens is used as the imaging device 22. However, as explained in the twenty-first embodiment, a spatial optical phase modulator 221 may be used, or a combination of a spatial optical phase modulator 221 and a 4f lens system 222 or an imaging lens 223 may be employed.

In order to emit the object beam 6, the reference beam 71, and the excitation beam 80 to only the target area 132 of the storage layer 4 of the medium 130, a spatial optical selector (not shown in the present embodiment) having a suitable opening may be provided to one or all of the object beam 6, the reference beam 71, and the excitation beam 80.

TWENTY-THIRD EMBODIMENT

Figure 66:
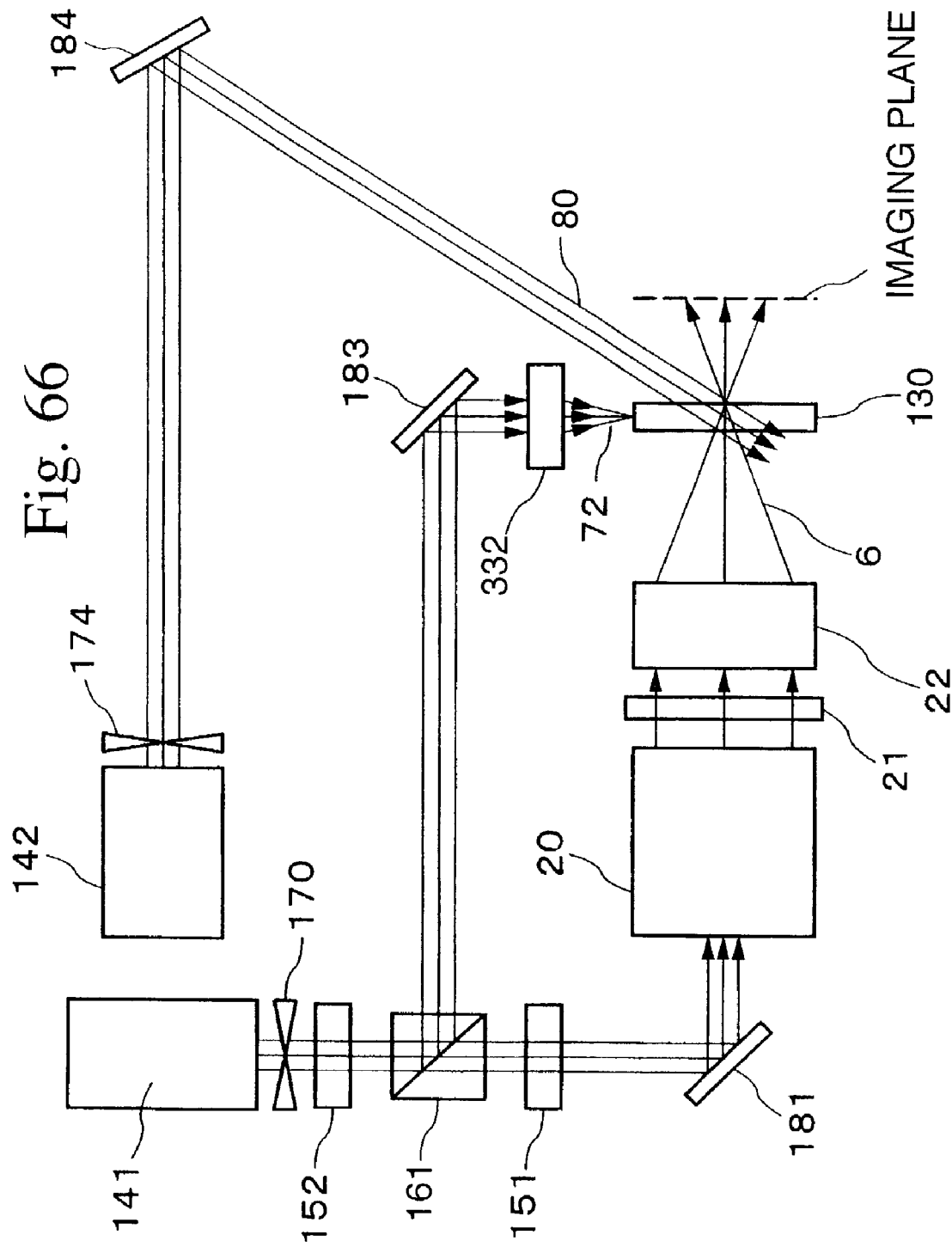
FIG. 66 is a diagram showing the structure of a holographic storage system as the twenty-third embodiment of the present invention.

FIG. 66 shows the fifth example of the storage system, which is provided for implementing the storage method explained in the fifteenth embodiment. In the structure shown in FIG. 66, a reflector 183 and a condenser 332 are provided instead of the reflector 182 in FIG. 64 of the twenty-second embodiment.

The condenser 332 is a device for inputting a reference beam 72 into a specific core layer 1 of the medium 130 and may be a cylindrical lens.

One of the split beams split by the beam splitter 161 is reflected by the reflector 183 and then focused so that the reference beam 72 is produced.

The reference beam 72 can be input into a target core layer 1 of the medium 130 by controlling the position of one or both of the reflector 183 and the condenser 332.

The principle and effects of the storage process of the present embodiment are the same as those of the fifteenth embodiment.

In FIG. 66, the excitation beam 80, independent of the object beam 6 and the reference beam 72, is emitted onto the medium 130 from the upper or lower side of the medium 130. However, similar to FIG. 65, the excitation beam 80 may be superimposed on the object beam 6, and similar effects can be also obtained in this case.

In the present embodiment, a reflection hologram can also be stored using a method as explained referring to FIGS. 54 and 55.

Also in the present embodiment, a single or composite lens is used as the imaging device 22. However, as explained in the twenty-first embodiment, a spatial optical phase modulator 221 may be used, or a combination of a spatial optical phase modulator 221 and a 4f lens system 222 or an imaging lens 223 may be employed.

In order to emit the object beam 6 and the excitation beam 80 to only the target area 132 of the storage layer 4 of the medium 130, a spatial optical selector (not shown in the present embodiment) having a suitable opening may be provided to one or both of the object beam 6 and the excitation beam 80.

TWENTY-FOURTH EMBODIMENT

Figure 67:
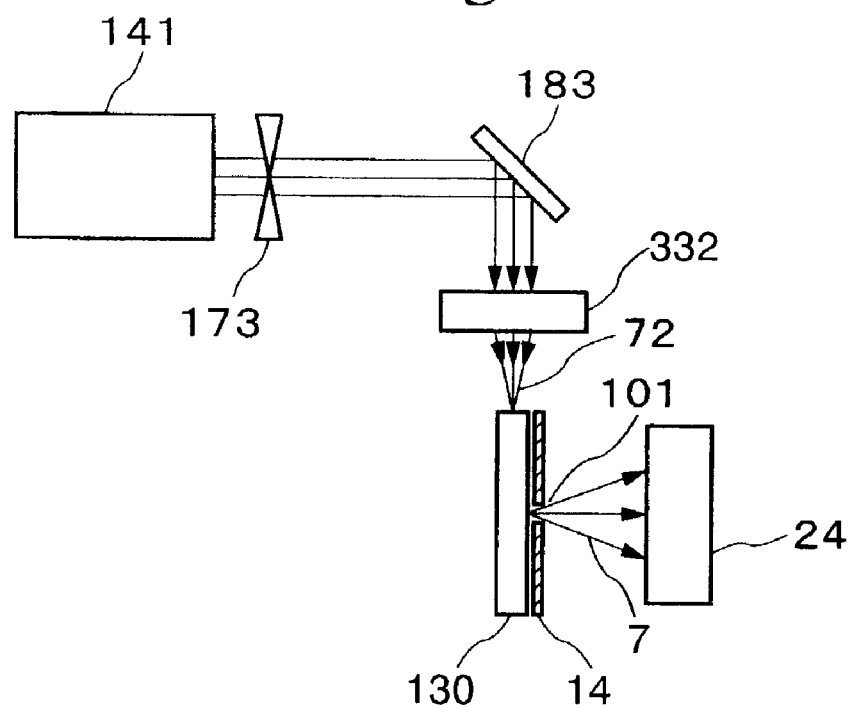
FIG. 67 is a diagram showing the structure of a holographic retrieval system as the twenty-fourth embodiment of the present invention, which shows an example for retrieving non-divided data.
Figure 68:
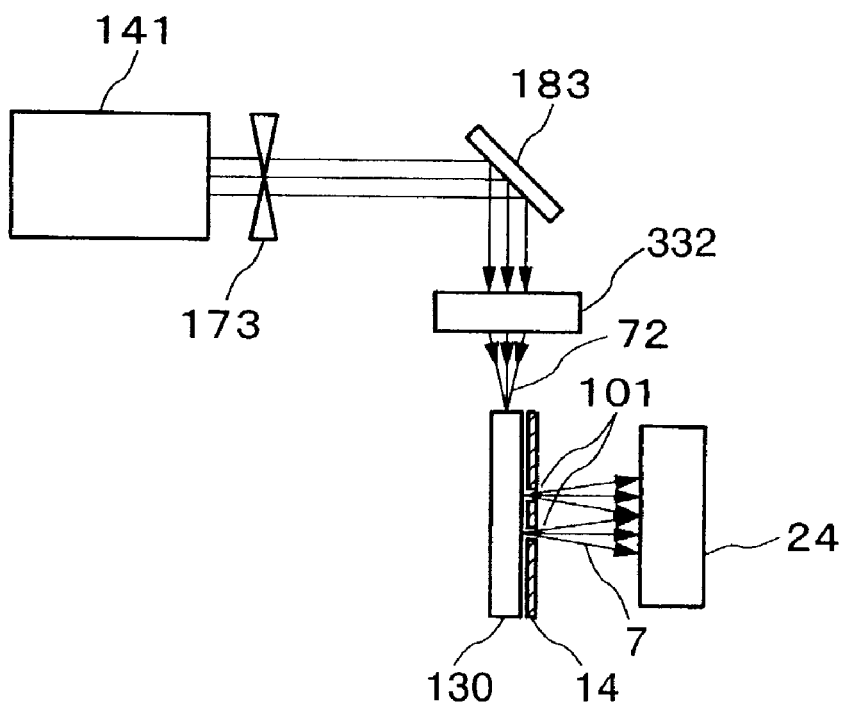
FIG. 68 is a diagram showing an example structure for simultaneously retrieving divided data in the twenty-fourth embodiment.

FIGS. 67 and 68 show the first example of the holographic retrieval system, provided for implementing the holographic retrieval method explained in the sixteenth embodiment.

In the figures, reference numeral 141 indicates a light source for supplying a reference beam, reference numeral 173 indicates a shutter, and reference numeral 24 indicates a photodetector. The photodetector 24 is a device for detecting a retrieved beam 7. As an example of the photodetector, one of a dot sensor, a line sensor, or an area sensor, which includes one or more photodiodes, CCDs, CMOS devices, may be one, two, or three-dimensionally driven so as to detect the retrieved beam (i.e., an retrieved image).

The photodetector may be realized by arranging a plurality of such dot, line, or area sensors. In addition, a composite of the above examples may be employed for preparing the photodetector.

If a plurality of dot, line, or area sensors are used, the sensors may be selectively used in turn by performing electrical switching control. In this case, power consumption can be reduced.

The above-explained concrete examples for the photodetector can also be applied to other embodiments explained above which employ a photodetector.

First, with reference to FIG. 67, the retrieval system of the present example will be explained. The light beam output from the light source 141 is reflected by the reflector 183 and then focused by the condenser 332, thereby producing a reference beam 72.

The reference beam 72 can be input into a target core layer 1 of the medium 130 by controlling one or both of the positions of the reflector 183 and the condenser 332.

The principle and effects of the retrieval process of the present example are similar to those explained in the sixteenth embodiment.

In order to retrieve data which is divided into data portions and stored in different areas of the medium, a spatial optical selector 14 (see FIG. 68) having openings 101 which face only the target areas 133 (for retrieval) may be placed in the vicinity of the medium 130. This method can also be applied to the following embodiments having a relevant structure.

TWENTY-FIFTH EMBODIMENT

Figure 69:
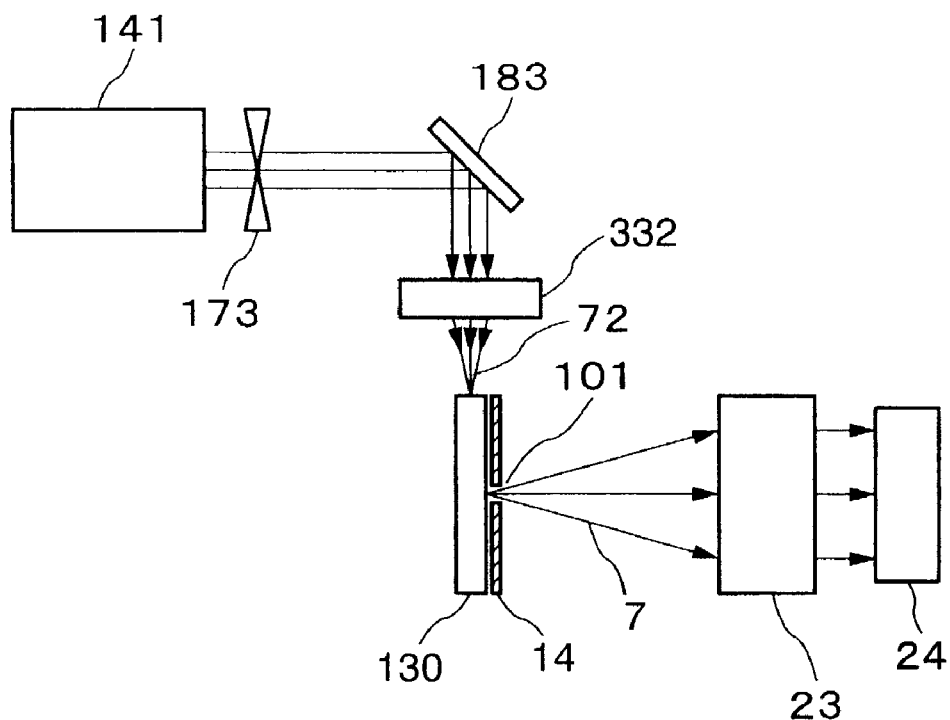
FIG. 69 is a diagram showing the structure of a holographic retrieval system as the twenty-fifth embodiment of the present invention.

FIG. 69 shows the second example of the holographic retrieval system, provided for implementing the holographic retrieval method explained in the sixteenth embodiment.

In order to retrieve data stored in a medium by using the holographic storage system explained in the twentieth embodiment, the structure of the present example is the same as that shown in FIG. 67 except for imaging the retrieved beam 7 onto the photodetector 24 by using an imaging device 23. The imaging device 23 is an optical system for imaging the retrieved beam 7 onto the photodetector 24 and may be a single or composite lens. Also in this embodiment, the principle and effects of the retrieval process are similar to those explained in the sixteenth embodiment.

TWENTY-SIXTH EMBODIMENT

Figure 70:
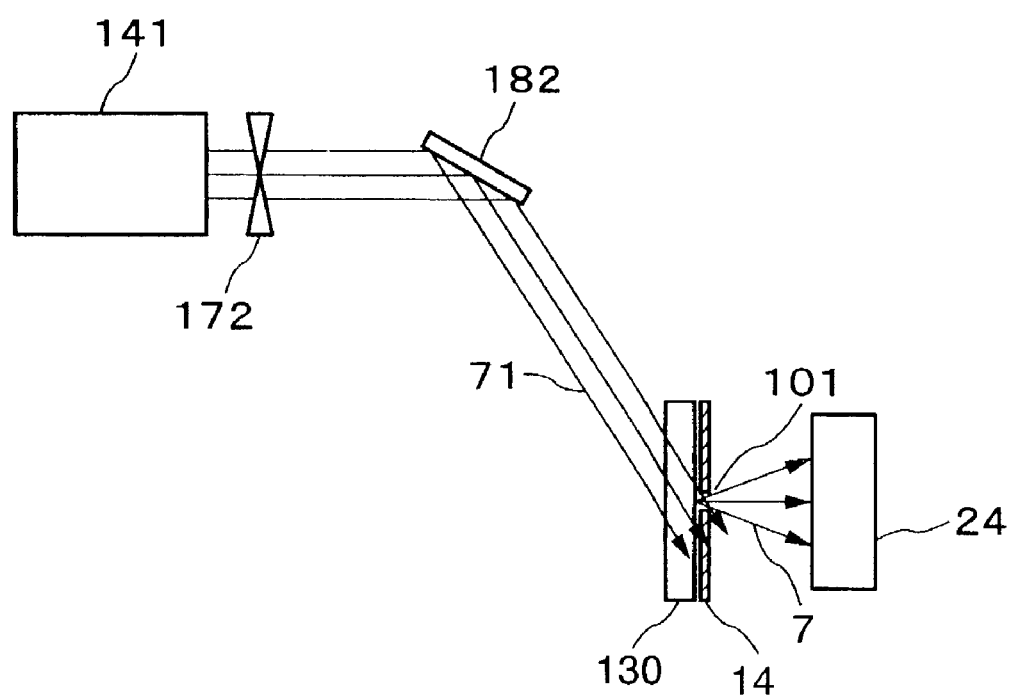
FIG. 70 is a diagram showing the structure of a holographic retrieval system as the twenty-sixth embodiment of the present invention.
Figure 71:
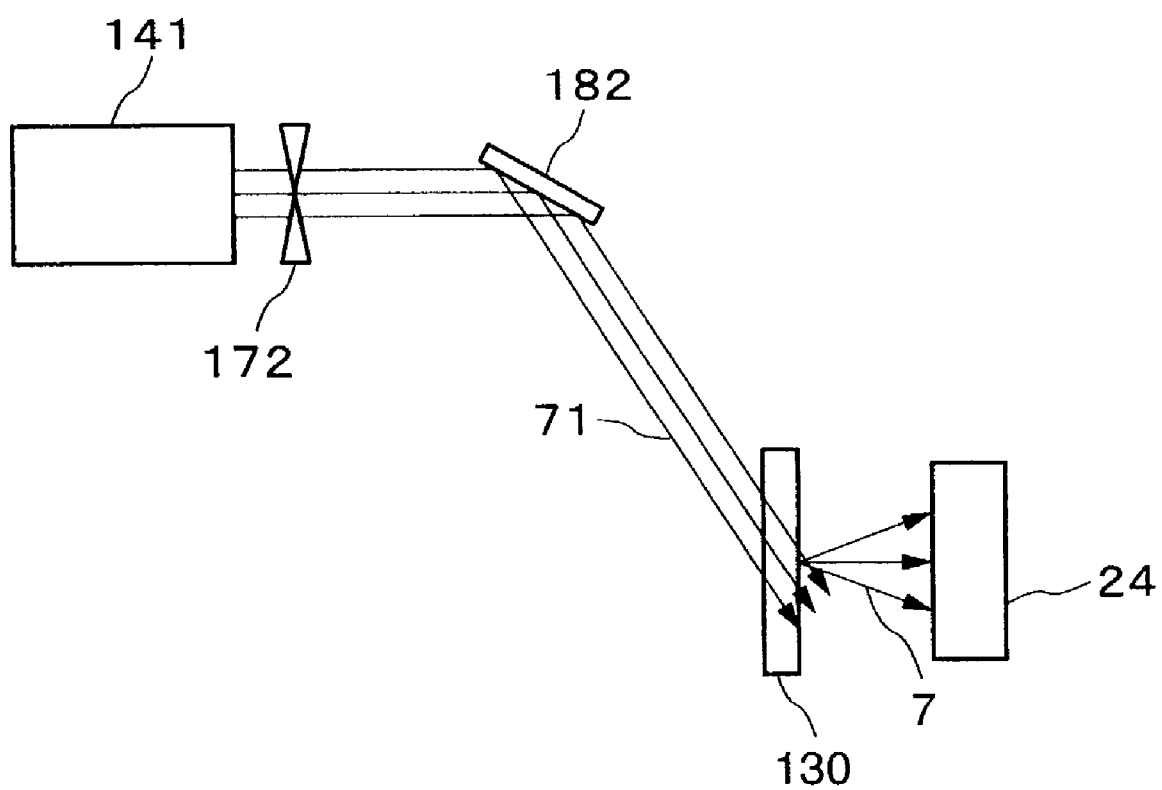
FIG. 71 is a diagram showing the structure of a holographic retrieval system as the twenty-seventh embodiment of the present invention.

FIG. 70 shows the third example of the holographic retrieval system, provided for implementing the holographic retrieval method explained in the seventeenth embodiment. In the structure shown in FIG. 70, a beam shutter 172 and a reflector 182 are provided instead of the beam shutter 173, the reflector 183, and the condenser 332.

A light beam output from the light source 141 is reflected by the reflector 182 so that a reference beam 71 is obtained. The reference beam 71 can be incident at a desired incident angle from the upper or lower side of the medium 130 onto one or more small areas of the storage layer 4, which include a target area 132 of the medium 130, by controlling the angle and position of the reflector 182 and the relative position of the medium 130.

The principle and effects of the retrieval process of the present example are similar to those of the seventeenth embodiment.

In the present embodiment, the retrieved beam 7 output from the medium 130 is directly imaged on the photodetector 24 without passing through an optical system such as a lens. However, as explained in the twenty-fifth embodiment, an imaging device 23 may be added.

Similar to the structure shown in FIG. 54, the present embodiment provides a retrieval process corresponding to the multiple-angle volume holography. However, as explained in the nineteenth embodiment, a spatial optical phase modulator 30 or a condenser 331 may be added and the reference beam 71 is set so as to be emittable onto a target area of the medium 130, so that a retrieval process corresponding to the multiple-phase or multiple-shift volume holography can be performed. This variation can also be applied to the following twenty-seventh embodiment.

TWENTY-SEVENTH EMBODIMENT

FIG. 70 shows the fourth example of the holographic retrieval system, provided for implementing the holographic retrieval method explained in the eighteenth embodiment.

This example has the same structure as that shown in FIG. 70, except that the spatial optical selector 14 is omitted and that the reference beam 71 is set to be emittable only to a target area 132 of the storage layer 4 of the medium 130. The principle and effects of the present example are similar to those explained in the eighteenth embodiment.

In the present embodiment, it is unnecessary to provide a spatial optical selector at a side of the medium 130 at which the retrieved beam 7 is output. However, a spatial optical selector 14 similar to that used in the twenty-fourth or twenty-sixth embodiment may be provided.

In order to emit the reference beam 71 to only the target area 132 of the storage layer 4, a spatial optical selector (not shown in the present embodiment) having a suitable opening may be provided to the reference beam 71.

FIGS. 52B and 53B show examples in which the reference beam 71 is emitted onto the storage layer 4 of the medium 130 from a side (of the medium) opposite to that including the photodetector 24, so that a transmission hologram can be retrieved. However, as shown in FIG. 41, a reflection hologram can also be retrieved by emitting a reference beam 71 from the side (of medium 130) at which a photodetector is provided.

Also in the present embodiment, the retrieved beam 7 output from the medium 130 is directly imaged on the photodetector 24 without passing through an optical system such as a lens. However, in order to retrieve data stored in the medium by using a storage system as explained in the twentieth embodiment, an imaging device 23 may be added as explained in the twenty-fifth embodiment.

TWENTY-EIGHTH EMBODIMENT

Figure 72:
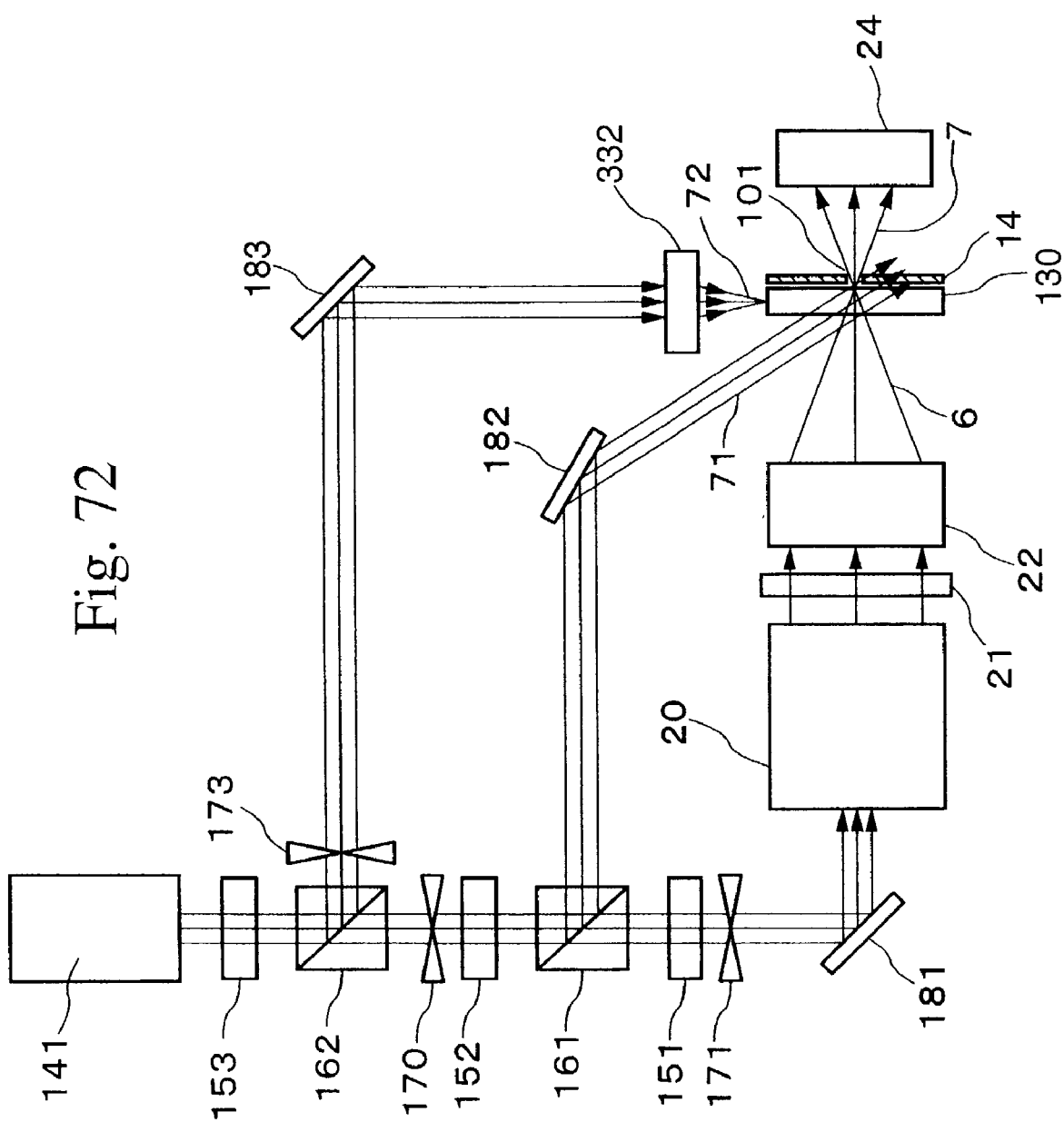
FIG. 72 is a diagram showing the structure of a holographic storage and retrieval system as the twenty-eighth embodiment of the present invention.
Figure 73:
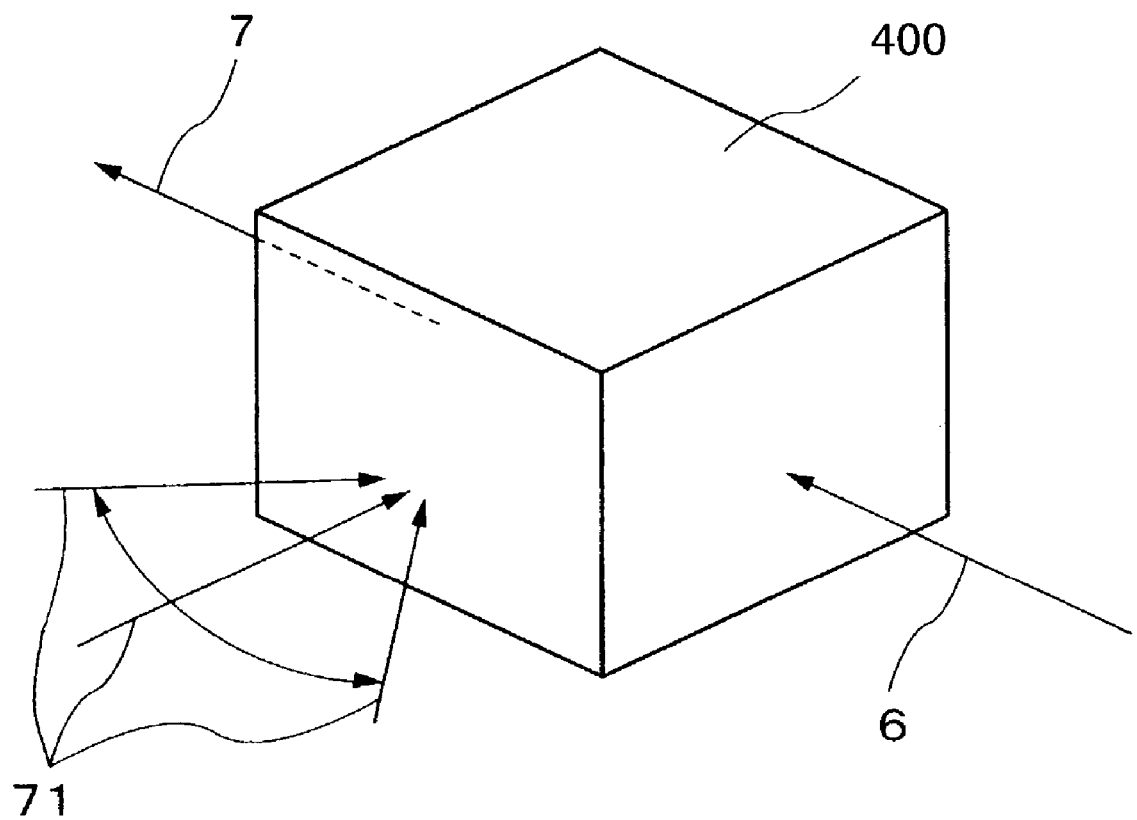
FIG. 73 is a diagram for explaining an example of a conventional volume holographic storage and retrieval method.
Figure 74:
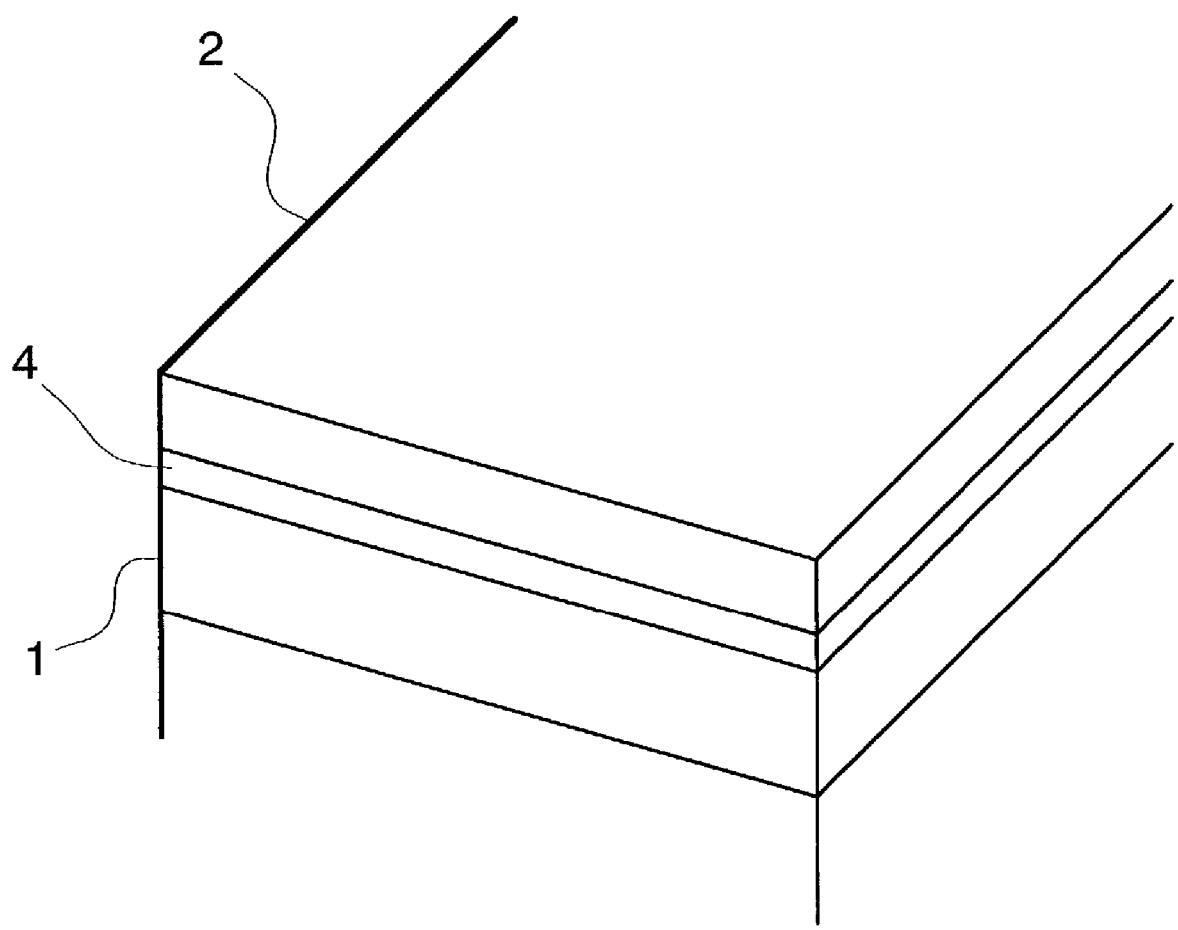
FIG. 74 is a diagram showing an example structure of a conventional optical waveguide holographic medium.
Figure 75:
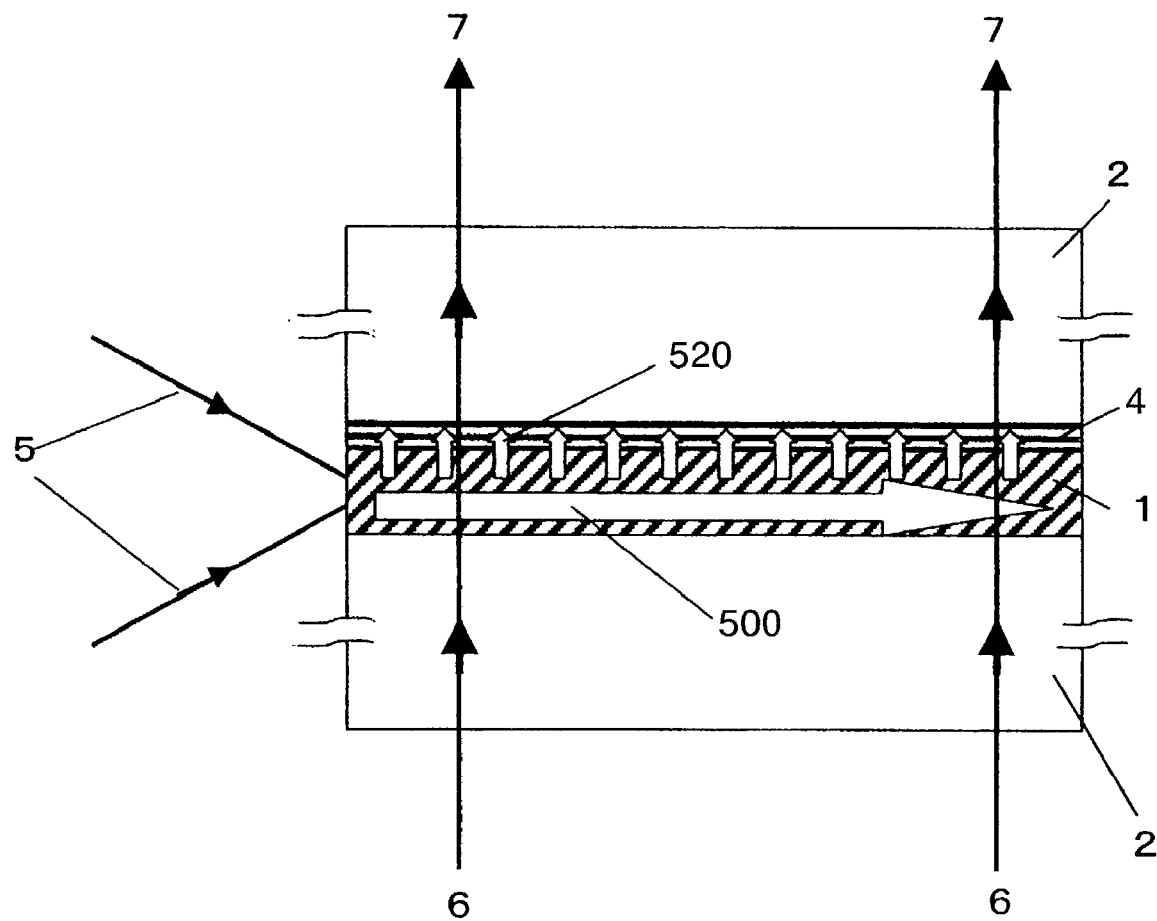
FIG. 75 is also a diagram showing a conventional optical waveguide holographic medium.
Figure 76:
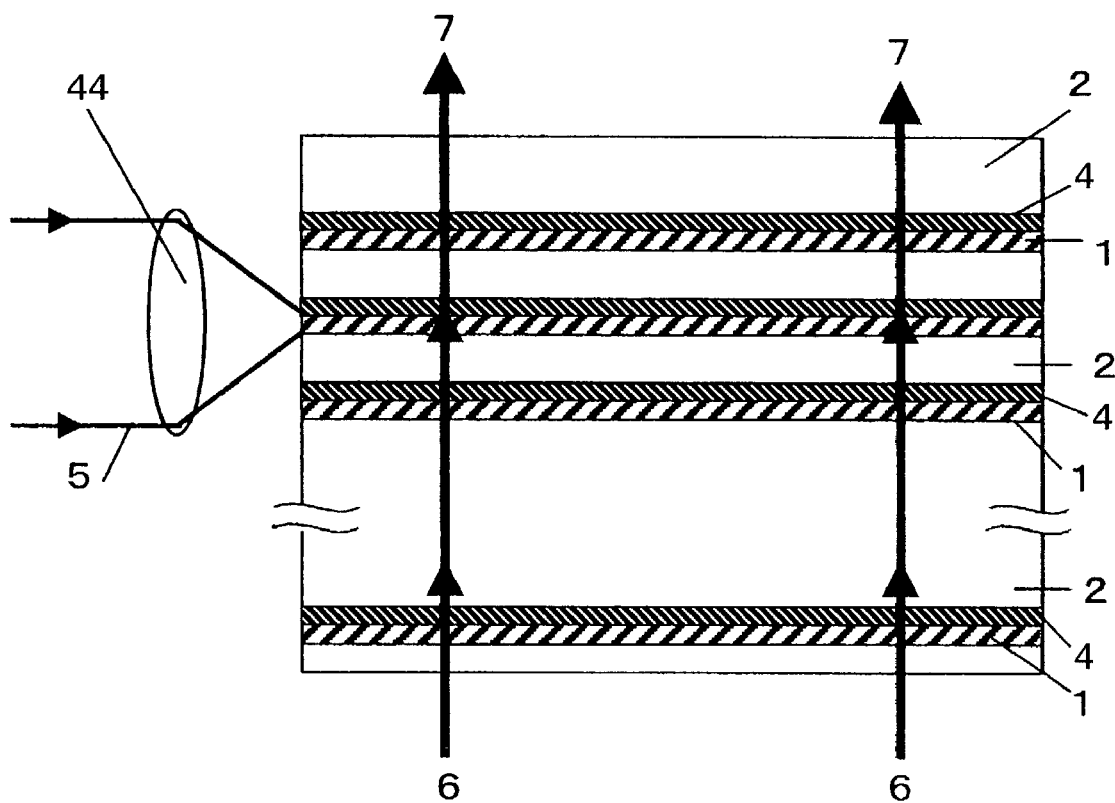
FIG. 76 is a diagram showing an example structure of a conventional multilayered optical waveguide holographic medium.
Figure 77:
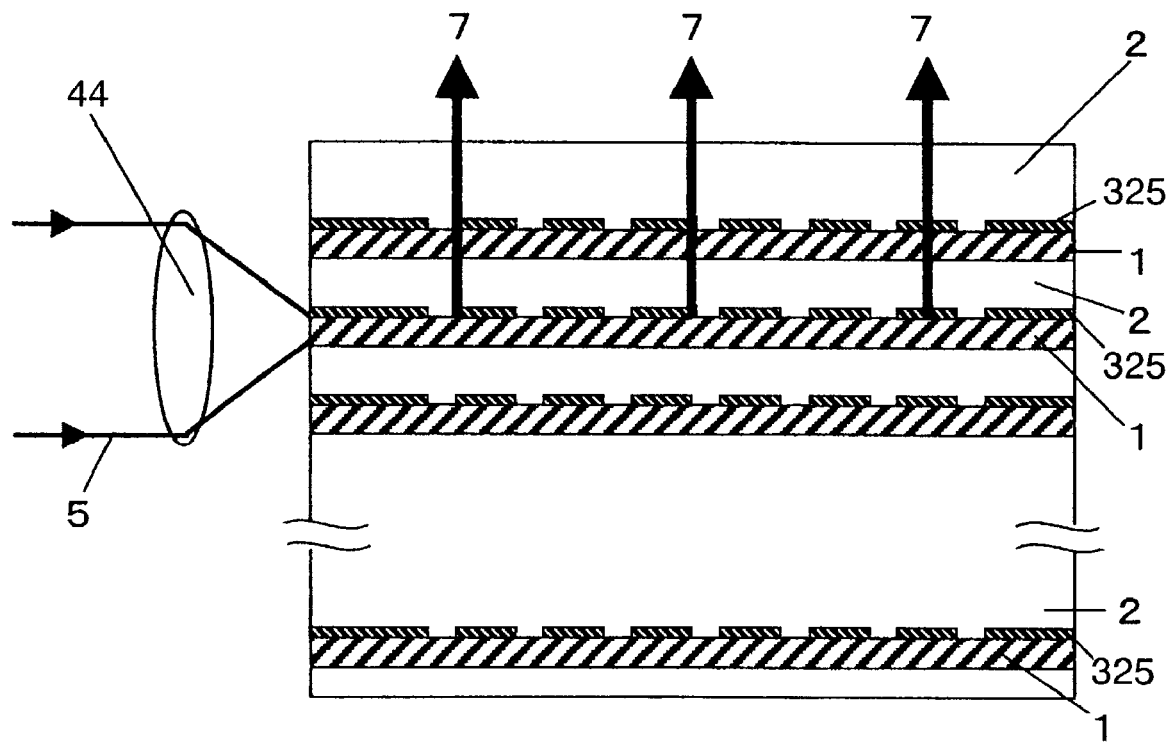
FIG. 77 is a diagram showing an example structure of a conventional retrieval-only multiple storage holographic medium having multilayered optical waveguides which have scattering factors.
Figure 78:
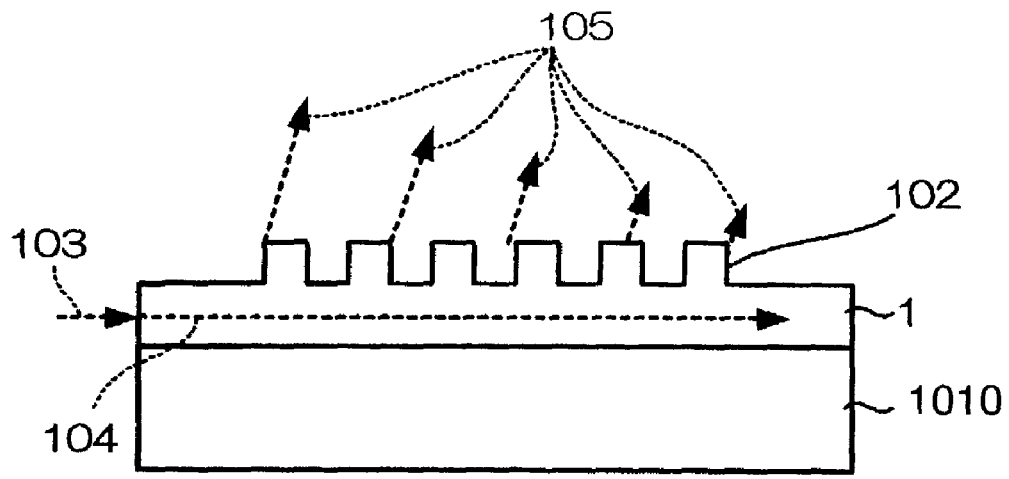
FIG. 78 is a sectional view showing the structure of a conventional optical waveguide.

FIG. 72 shows an example of a holographic storage and retrieval system for implementing a holographic storage method as explained in the thirteenth embodiment and a holographic retrieval method as explained in the sixteenth to eighteenth embodiments.

This example has a combination structure of the holographic storage system shown in FIG. 54 and the holographic retrieval system shown in FIG. 67 while a polarization controller 153, a beam splitter 162, and a beam shutter 171 are further added.

The polarization controller 153 is a device for rotating the polarization plane of a light beam and may be a half-wave plate. The beam splitter 162 is a device for splitting a light beam into two beams in different directions and may be a half mirror or any kind of beam splitter.

A light beam output from the light source 141 is split into three beams via the beam splitters 161 and 162, and these beams are respectively controlled by the polarization controllers 151, 152, and 153, so that each beam has a polarization state suitable for holographic storage. One of the split beams is reflected by the reflector 181 and is then expanded by the beam expander 20 so as to obtain a desired beam width. Data to be stored in medium 130 is provided to the above expanded beam by the spatial light intensity modulator 21, so that an object beam 6 is obtained via the imaging device 22.

Another one of the three split beams is reflected by the reflector 182 so that a reference beam 71 is obtained. The remaining one of the three split beams is reflected by the reflector 183 and then focused by the condenser 32 so that a reference beam 72 is obtained.

The object beam 6 can be emitted from the upper or lower side of the medium 130 only to a target area 132 of the storage layer 4 of the medium 130, by controlling the relative position of the medium 130. The reference beam 71 can be emitted at a desired incident angle from the upper or lower side of the medium 130 only to a target area 132 of the storage layer 4 of the medium 130, by controlling the angle and position of the reflector 182 and the relative position of the medium 130.

In addition, the reference beam 72 can be input into an end face of a desired core layer 1 of the medium 130 by controlling the position of one or both of the reflector 183 and the condenser 332.

In the present example, first, the beam shutters 170 and 171 are opened while the beam shutter 173 is closed, thereby performing the storage process. The principle and effects of the storage process of the present example are similar to those explained in the thirteenth embodiment.

On the other hand, when the beam shutters 170 and 171 are closed and the beam shutter 173 is opened, the retrieval process using the reference beam 72 can be performed. The principle and effects of the retrieval process of the present example are similar to those explained in the sixteenth embodiment.

When the beam shutter 170 is opened and the beam shutters 171 and 173 are closed, the retrieval process using the reference beam 71 can be performed. The principle and effects of the retrieval process of this case are similar to those explained in the seventeenth and eighteenth embodiments.

In the portions of the present system which respectively correspond to the holographic storage system in FIG. 54 and the holographic retrieval system in FIG. 67, the functions realized by these systems can also be realized, thereby obtaining similar effects.

Additionally, as shown in FIGS. 64 to 66, a light source 142 for outputting an excitation beam 80, a polarization controller 154, a beam shutter 174, a reflector 184, and the like may be added so as to perform the storage method as explained in the fourteenth and fifteenth embodiment.

TWENTY-NINTH EMBODIMENT

As an embodiment for improving the storage density, a holographic multiple storage method using a plurality of object beams will be explained, where each object beam is focused or partially restricted as explained in the thirteenth embodiment and the positions of the object beams are shifted in turn.

Figure 80A:
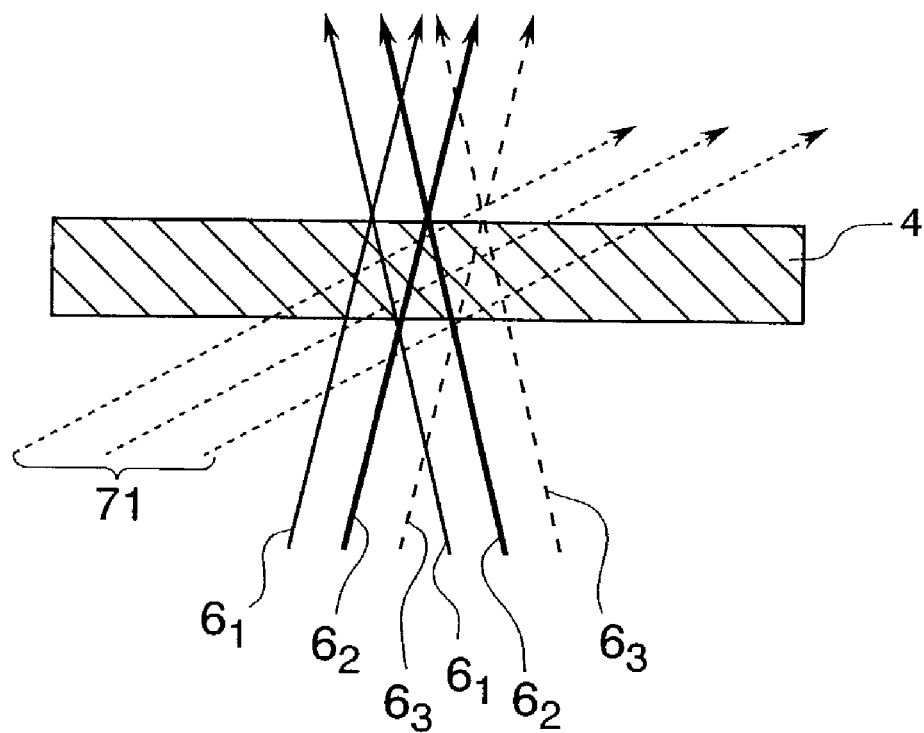
FIGS. 80A and 80B are diagrams for explaining a holographic storage and retrieval method as the twenty-ninth embodiment of the present invention

FIG. 80A shows an example which uses three object beams $6_1$ to $6_3$. The object beams $6_1$ to $6_3$ are superimposed and emitted in a manner such that the positions of the beams are slightly shifted in turn for a reference beam 71, thereby performing the holographic storage.

In FIG. 80, only the storage layer 4 is shown. That is, in the present embodiment, a novel holographic storage and retrieval method applied to a conventional holographic medium is realized by using a reference beam which has a plane wave and by shifting the object beam. This method can also be applied to the above-explained structure including a storage layer 4 and an optical waveguide, and in this case, a diffracted beam obtained by inputting a reference beam from an end face of a core layer may be emitted onto the storage layer.

Figure 80B:
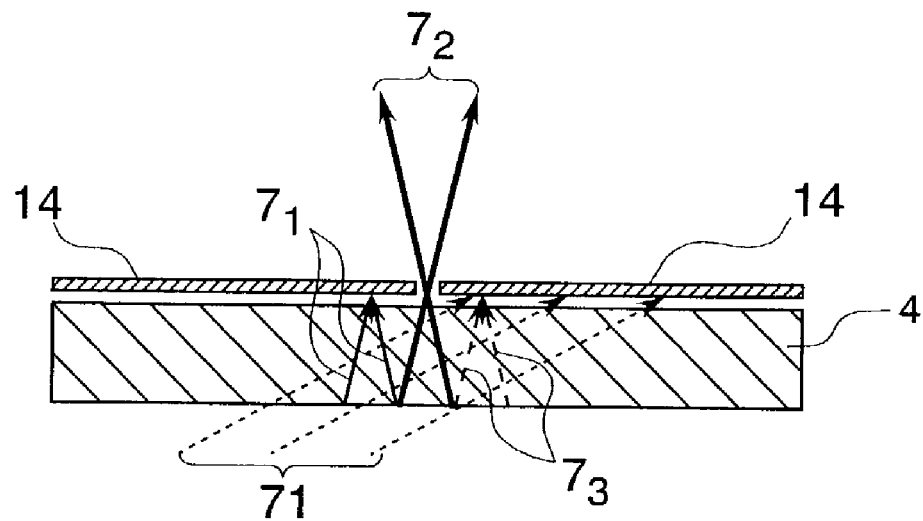

In order to retrieve a multiple hologram stored in an area, the same reference beam 71 as that in the storage process is emitted to the storage layer 4 as shown in FIG. 80B, so that retrieved beams $7_1$ to $7_3$ which correspond to the object beams $6_1$ to $6_3$ are simultaneously retrieved.

In order to retrieve only a target retrieved beam among these retrieved beams, a spatial optical selector 14 may be provided at the side (of the medium 130) at which the retrieved beam is emitted, in a manner such that the target retrieved beam can pass through an opening of the spatial optical selector towards the upper side and the other retrieved beams are blocked.

According to the present method, multiple data can be stored in a single area, thereby improving the storage density. In addition, the reference beam can be a parallel beam emitted at a fixed angle; thus, it is unnecessary to perform angle control which is necessary for performing the multiple-angle holographic storage. Additionally, it is unnecessary to focus the reference beam (so as to obtain a spherical wave), which is necessary for performing the multiple-shift holographic storage. It is also unnecessary to change the phase of the reference beam, which is necessary for performing the multiple-phase holographic storage.

The method of the present embodiment may be suitably combined with the above-explained multiple-angle, multiple-shift, or multiple-phase method so as to change the angle, the wavefront, or the phase of the reference beam, thereby further improving the storage density.

In the present method, an excitation beam may be used, and each of the reference beam, the object beam, and the excitation beam can be incident on the medium 130 by using a suitable method explained in any embodiment (explained above) relating to the holographic retrieval.

In addition, the spatial optical selector may have not only a single opening but also a plurality of openings if necessary.

What is claimed is:

1. A holographic medium comprising:
   an optical waveguide having:
   at least two core layers for transmitting light, each core layer being sandwiched by a pair of materials having a refractive index lower than that of the core layer; and
   at least two diffraction grating layers formed at a boundary between the core layer and the material or in the core layer, the core layers and diffraction grating layers forming a multilayered structure; and
   at least one storage layer positioned outside the optical waveguide to permit a reference beam for holographic storage and retrieval to enter through the optical waveguide.

2. A holographic medium as claimed in claim 1, wherein the material covering at least a portion of the core layer having a lower refractive index includes at least one cladding layer on the core layer.

3. A holographic medium as claimed in claim 2 wherein the material covering at least a portion of the core layer having a lower index of refraction includes a cladding layer on each of opposite sides of the core layer.

4. A holographic medium as claimed in claim 1, wherein the diffraction grating layer is formed by varying the refractive index of the core layer.

5. A holographic medium as claimed in claim 1, wherein the diffraction grating layer has a concavo-convex shape.

6. A holographic medium as claimed in claim 1, wherein an object beam is input into the storage layer through the optical waveguide.

7. A holographic medium as claimed in claim 1, wherein an object beam is input into the storage layer not through the optical waveguide.

8. A holographic medium as claimed in claim 1, wherein a third reference beam is input to an end face of the core layer to be transmitted through the core layer.

9. A holographic medium as claimed in claim 1, wherein the storage layer stores, as hologram information, an interference fringe pattern caused by interference of an object beam and a beam as diffracted by the diffraction grating layer based on a first reference beam input into an end face of the core layer of the optical waveguide, or caused by interference of the object beam and a second reference beam input into a surface of the optical waveguide having the same wavefront as that of the diffracted beam, and wherein in retrieving the stored information a third reference beam is input into the optical waveguide to generate the diffracted beam that is emitted outside the core layer and transmitted through the storage layer, where the object beam is retrieved as a retrieved beam.

10. A holographic medium as claimed in claim 1, wherein the storage layer stores, as hologram information, an interference fringe pattern caused by interference of an object beam input into the optical waveguide and a beam as diffracted by the diffraction grating layer based on a first reference beam input into the optical waveguide, or caused by interference of the object beam input into the optical waveguide and a second reference beam input into the optical waveguide having the same wavefront as that of the diffracted beam, and wherein in retrieving the stored information, a third reference beam is input into the optical waveguide to generate the diffracted beam that is emitted outside the core layer and transmitted through the storage layer, where the object beam is retrieved as a retrieved beam.

11. A holographic medium as claimed in claim 1, wherein the storage layer is positioned normal to a waveguide plane of the optical waveguide, wherein upon storing information in the storage layer a reference beam and an object beam are input into the optical waveguide and in retrieving stored information the reference beam is emitted to an end face of the core layer and transmitted through the core layer to be transformed into a diffracted beam in a diffraction grating layer, emitted outside the core layer and transmitted through the storage layer, where the object beam is retrieved as a retrieved beam.

12. A holographic medium as claimed in claim 1, wherein the storage layer is provided in a manner such that a reference beam for holographic storage and retrieval is emittable onto the storage layer via the optical waveguide.

* * * * *